US012387130B1

(12) United States Patent
Alam et al.

(10) Patent No.: US 12,387,130 B1
(45) Date of Patent: Aug. 12, 2025

(54) AUTOMATED SYNTHESIZING AND COMPILATION OF QUANTUM PROGRAMS

(71) Applicant: Rigetti & Co, LLC, Berkeley, CA (US)

(72) Inventors: Muhammad Sohaib Alam, Emeryville, CA (US); Erik Joseph Davis, Berkeley, CA (US); Eric Christopher Peterson, Saint Helena, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 1012 days.

(21) Appl. No.: 16/988,298

(22) Filed: Aug. 7, 2020

Related U.S. Application Data

(60) Provisional application No. 62/947,365, filed on Dec. 12, 2019, provisional application No. 62/884,272, filed on Aug. 8, 2019.

(51) Int. Cl.
| | |
|---|---|
| *G06N 10/80* | (2022.01) |
| *G06F 8/30* | (2018.01) |
| *G06F 8/41* | (2018.01) |
| *G06N 3/08* | (2023.01) |
| *G06N 7/01* | (2023.01) |

(52) U.S. Cl.
CPC ............. *G06N 10/80* (2022.01); *G06F 8/30* (2013.01); *G06F 8/41* (2013.01); *G06N 3/08* (2013.01); *G06N 7/01* (2023.01)

(58) Field of Classification Search
CPC ........... G06N 10/00; G06N 10/80; G06N 7/01
See application file for complete search history.

(56) References Cited

U.S. PATENT DOCUMENTS

| | | |
|---|---|---|
| 2015/0032994 A1 | 1/2015 | Chudak et al. |
| 2017/0177534 A1 | 6/2017 | Mohseni et al. |

(Continued)

FOREIGN PATENT DOCUMENTS

| | | |
|---|---|---|
| WO | 2018223037 | 12/2018 |
| WO | 2019152020 | 8/2019 |

OTHER PUBLICATIONS

Kliuchnikov, Vadym, et al. "A framework for approximating qubit unitaries." arXiv preprint arXiv:1510.03888 (2015). (Year: 2015).*

(Continued)

*Primary Examiner* — Markus A. Vasquez
(74) *Attorney, Agent, or Firm* — Henry Patent Law Firm PLLC

(57) ABSTRACT

In a general aspect, a quantum program can be automatically synthesized or compiled. In some implementations, a discretized state space is obtained. The discretized state space includes a plurality of states for one or more qubits of a quantum processor. A discrete action space is obtained. The discrete action space includes a plurality of unitary operations for the one or more qubits of the quantum processor. A policy that uses the discretized state space and the discrete action space to generate quantum programs for quantum state preparation is defined. A dynamic programming process is used to improve the policy. An initial state and a target state of the one or more qubits is identified. The policy is used to generate a quantum program to produce the target state from the initial state. The quantum program include a subset of the unitary operations in the discrete action space.

11 Claims, 21 Drawing Sheets

(56) References Cited

U.S. PATENT DOCUMENTS

| | | | |
|---|---|---|---|
| 2019/0042974 A1 | 2/2019 | Daraeizadeh et al. | |
| 2019/0044542 A1 | 2/2019 | Hogaboam et al. | |
| 2020/0410343 A1* | 12/2020 | Niu | G06N 10/00 |
| 2023/0143652 A1 | 5/2023 | McKiernan et al. | |

OTHER PUBLICATIONS

Grice, Jon R., and David A. Meyer. "Discrete Quantum Control-State Preparation." arXiv preprint arXiv:1204.6379 (2012). (Year: 2012).*

An, Zheng, and D. L. Zhou. "Deep Reinforcement Learning for Quantum Gate Control." arXiv preprint arXiv:1902.08418v2 (2019). (Year: 2019).*

Niu, et al., "Universal quantum control through deep reinforcement learning", AIAA Scitech 2019 Forum; 2019-0954, https://doi.org/10.2514/6.2019-0954, Apr. 23, 2019, 8 pgs.

Olmo, et al., "Swarm-based metaheuristics in automatic programming: a survey", WIREs Data Mining Knowledge Discovery 4:445-469, 2014, 25 pgs.

Schulman, et al., "Proximal Policy Optimization Algorithms", arXiv:1707.06347v2, Aug. 28, 2017, 12 pgs.

Smith, R. S., et al., "A Practical Quantum Instruction Set Architecture", arXiv:1608.03355v2 [quant-ph], Feb. 17, 2017, 15 pages.

Smith, "Neural Networks for Combinatorial Optimization: A Review of More Than a Decade of Research", INFORMS Journal on Computing, 1999, 20 pgs.

Steven, et al., "Can we teach a computer quantum mechanics? (Part II)", downloaded Jan. 8, 2020, from https://towardsdatascience.com/can-we-tecah-a-computer-quantum-mechanics-part-ii-5e90ac96ef3a, Jul. 9, 2019, 9 pgs.

Sutton, et al., "Reinforcement Learning: An Introduction", The MIT Press, 2018, 548 pgs.

Vinyals, et al., "Pointer Networks", Advances in Neural Information Processing Systems, proceedings from Neural Information Processing Systems conference, 2015, 49 pgs.

Zhang, et al., "When reinforcement learning stands out in quantum control? A comparative study on state preparation", arXiv:1902.02157v1, Feb. 6, 2019, 10 pgs.

KIPO, International Search Report and Written Opinion mailed Jun. 22, 2020, in PCT/US2020/018228, 10 pgs.

Proximal Policy Optimization, downloaded from https://openai.com/blog/openai-baselines-ppo/, dated Jul. 20, 2017, 7 pgs.

"A toolkit for developing and comparing reinforcement learning algorithms", available at https://github.com/openai/gym at least as early as Feb. 14, 2019, 7 pgs.

"Classic control: Control theory problems from the classic RL literature", available from https://gym.openai.com/envs/ at least as early as Feb. 13, 2019, 3 pgs.

"OpenAI Baselines: high quality implementations of reinforcement learning algorithms", available at https://github.com/openai/baselines/ at least as early as Feb. 14, 2019, 5 pgs.

"PyTorch", Wikipedia, last edited Feb. 13, 2019, https://en.wikipedia.org/w/index.php?title=PyTorch&oldid=883095788, 3 pgs.

"Stable-baselines: A fork of OpenAI Baselines, implementations of reinforcement learning algorithms", accessed on Feb. 13, 2019, from https://github.com/hill-a/stable-baselines, 5 pgs.

"TensorFlow", retrieved at least as early as Feb. 13, 2019, from https://en.wikipedia.org/w/index.php?title=TensorFlow&oldid=883095661, 4 pgs.

Albarran-Arriagada, et al., "Measurement-based adaptation protocol with quantum reinforcement learning", Physical Review A 98, 042315, Oct. 11, 2018, 7 pgs.

Albarran-Arriagada, et al., "Reinforcement learning for semi-autonomous approximate quantum eigensolver", arXiv:1906.06702v2 [quant-ph], Jun. 19, 2019, 10 pgs.

An, et al., "Deep Reinforcement Learning for Quantum Gate Control", arXiv:1902.08418v2, Jul. 23, 2019, 7 pgs.

Arora, "On Non-Approximability for Quadratic Programs", Proceedings of the 2005 46th Annual IEEE Symposium on Foundations of Computer Science (FOCS'05), 2005, 10 pgs.

Arora, et al., "Proof Verification and the Hardness of Approximation Problems", Journal of the ACM, Sep. 2001, 55 pgs.

August, et al., "Taking Gradients Through Experiments: LSTMs and Memory Proximal Policy Optimization for Black-Box Quantum Control", International Conference on High Performance Computing; Springer, 2018, 23 pgs.

Bello, et al., "Neural Combinatorial Optimization with Reinforcement Learning", arXiv:1611.09940v2, Dec. 11, 2016, 14 pgs.

Bengio, et al., "Machine Learning for Combinatorial Optimization: a Methodological Tour d'Horizon", arXiv:1811.06128v1, Nov. 15, 2018, 34 pgs.

Boussaid, et al., "A survey on optimization metaheuristics", Information Sciences 237, Mar. 7, 2013, 36 pages.

Brockman, et al., "OpenAI Gym", arXiv:1606.01540v1, Jun. 5, 2016, 4 pgs.

Bukov, "Reinforcement learning for autonomous preparation of Floquet-engineered states: Inverting the quantum Kapitza oscillator", arXiv:1808.08910v2, Dec. 17, 2018, 20 pgs.

Bukov, et al., "Reinforcement Learning in Different Phases of Quantum Control", Physical Review X 8, 031086, Sep. 27, 2018, 15 pgs.

Caldwell, et al., "Parametrically Activated Entangling Gates Using Transmon Qubits", Physical Review Applied 10, 034050, Sep. 24, 2018, 8 pgs.

Charikar, et al., "Maximizing quadratic programs: extending Grothendieck's inequality", Proceedings of the 45th Annual IEEE Symposium on Foundations of Computer Science (FOCS'04), 2004, 7 pgs.

Chen, et al., "Variational Quantum Circuits and Deep Reinforcement Learning", arXiv:1907.00397v1, Jun. 30, 2019, 8 pgs.

Chen, et al., "Variational Quantum Circuits for Deep Reinforcement Learning", arXiv:1907.00397v2 [cs.LG], Aug. 17, 2019, 12 pgs.

chuheng, "Generating 3 Qubit Quantum Circuits with Neural Networks", Journal Club, Apr. 20, 2017, 24 pgs.

Das, et al., "Quantum Annealing and Related Optimization Methods", vol. 679, Springer Science & Business Media, 2005, 382.

Didier, et al., "AC flux sweet spots in parametrically-modulated superconducting qubits", arXiv:1807.01310v1, Jul. 3, 2018.

Dunning, et al., "What Works Best When? A Systematic Evaluation of Heuristics for Max-Cut and QUBO", INFORMS Journal on Computing, 2018, 42 pgs.

Farhi, E., et al., "A Quantum Approximate Optimization Algorithm", arXiv:1411.4028v1 [quant-ph], Nov. 14, 2014, 16 pages.

Fösel, et al., "Reinforcement Learning with Neural Networks for Quantum Feedback", PhysRevX 8, 031084, Sep. 27, 2018, 15 pgs.

Goemans, et al., "Improved Approximation Algorithms for Maximum Cut and Satisfiability Problems Using Semidefinite Programming", Journal of the ACM 42.6, pp. 1115-1145, Nov. 1995, 31 pgs.

Hadfield, et al., "From the quantum approximate optimization algorithm to a quantum alternating operator ansatz", Algorithms 12.2, p. 34, Feb. 12, 2019, 45 pgs.

Kant, "Recent advances in neural program synthesis", arXiv:1802.02353, Feb. 7, 2018, 18 pgs.

Karp, "Reducibility Among Combinatorial Problems", Complexity of Computer Computations, 1972, 19 pgs.

Kelsen, "A gym implementation of our Qiskit quantum circuit environment", Jul. 5, 2019, from https://github.com/MaxKelsen/quantumcircuit_gym, 2 pgs.

Khairy, et al., "Learning to Optimize Variational Quantum Circuits to Solve Combinatorial Problems", arXiv:1911.11071v1 [cs.LG], Nov. 25, 2019, 10 pgs.

Khairy, et al., "Reinforcement-Learning-Based Variational Quantum Circuits Optimization for Combinatorial Problems", arXiv:1911.04574v1 [cs.LG], Nov. 11, 2019, 7 pgs.

Khalil, et al., "Learning combinatorial optimization algorithms over graphs", Advances in Neural Information Processing Systems, 2017, 13 pgs.

(56) References Cited

OTHER PUBLICATIONS

Khot, et al., "Optimal Inapproximability Results for Max-Cut and Other 2-Variable CSPs?", SIAM Journal on Computing 37.1, May 14, 2007, 39 pgs.

Kochenberger, et al., "The unconstrained binary quadratic programming problem: a survey", J. Combinatorial Optimization 28, Apr. 18, 2014, 24 pgs.

Leopardi, "A partition of the unit sphere into regions of equal area and small diameter", Electronic Transactions on Numerical Analysis; CiteSeer, Mar. 23, 2006, 21 pgs.

McClean, Jarrod R., et al., "The theory of variational hybrid quantum-classical algorithms", arXiv:1509.04279v1 [quant-ph], Sep. 14, 2015, 20 pages.

McKiernan, et al., "Automated Quantum Programming via Reinforcement Learning for Combinatorial Optimization", arXiv:1908.08054v1, Aug. 21, 2019, 15 pages.

Megretski, "Relaxations of Quadratic Programs in Operator Theory and System Analysis", Systems, Approximation, Singular Integral Operators, and Related Topics, Birkhauser Verlag 2001, 2001, 28 pgs.

Moody, et al., "Discretization of SU(2) and the orthogonal group using icosahedral symmetries and the golden numbers", arXiv:1705.04910v2, Aug. 23, 2017, 27 pgs.

Nazari, et al., "Reinforcement Learning for Solving the Vehicle Routing Problem", Advances in Neural Information Processing Systems, pp. 9839-9849, Oct. 27, 2018, 13 pgs.

Nemirovski, et al., "On maximization of quadratic form over intersection of ellipsoids with common center", Mathematical Programming 86.3, pp. 463-473, Sep. 1999, 12 pgs.

Nersisyan, et al., "Manufacturing low dissipation superconducting quantum processors", arXiv:1901.08042v1, Jan. 23, 2019, 9 pgs.

Nesterov, "Global Quadratic Optimization via Conic Relaxation", CORE Discussion Papers 1998060, Université catholique de Louvain, Center for Operations Research and Econometrics (CORE)., Feb. 21, 1998, 23 pgs.

Nielsen, et al., "Quantum Computation and Quantum Information", Cambridge Univ. Press, 2010, 704 pgs.

Zaheer, et al., "Deep Sets", 31st Conf. on Neural Information Processing Systems (NIPS 2017), 2017, 11 pgs.

USPTO, Non-Final Office Action issued in U.S. Appl. No. 17/399,560 on Feb. 18, 2025, 65 pages.

Guerreschi, et al., "Practical optimization for hybrid quantum-classical algorithms", arXiv:1701.01450v1, Jan. 5, 2017, 25 pages.

\* cited by examiner

| $n$ | Gate sequence |
|---|---|
| $10^2$ | HTHTHTHTT |
| $10^3$ | HTTTHTHTTT |
| $10^4$ | HTH |
| $10^5$ | HTH |
| $10^6$ | HTHTTTH |
| $10^7$ | HTTTHTHTHTTTTTH |
| $10^8$ | I |
| $10^9$ | I |
| $10^{10}$ | HTHTHTHTTTH |

FIG. 13D

| $q^*$ | MDP Gate Sequence | Brute-Force Gate Sequence | $\|q_{MDP} - q^*\|$ | $\|q_{BF} - q^*\|$ |
|---|---|---|---|---|
| -0.54951 0.38852 0.41540 0.62972 | THTTH | THTTH | 0.19996 | 0.19996 |
| -0.76688 0.32823 -0.37129 0.4078 | HTTT | THTHT | 0.2483 | 0.2483 |
| -0.52514 -0.38217 0.72416 0.23187 | HTTTHHHH | HTTTHHHH | 0.18812 | 0.18812 |
| -0.94899 0.13088 0.25424 -0.13886 | THHHTHTH | THHHTHTH | 0.22144 | 0.22043 |
| -0.66437 -0.47897 0.45344 0.35219 | HTTTHHHH | TTHTHHHT | 0.29977 | 0.26914 |
| -0.08302 -0.04759 -0.14279 -0.32426 | THHHHHHH | THHHHHHH | 0.25982 | 0.24801 |
| -0.06813 -0.20031 0.97526 -0.06406 | TTHTHTHT | TTHTHTTH | 0.22244 | 0.22244 |
| -0.52828 0.68335 -0.26856 0.47109 | HTHT | HTHT | 0.23627 | 0.23627 |
| -0.62701 0.42767 -0.1176 0.64041 | HTTH | HTTH | 0.22121 | 0.22121 |
| -0.27418 0.40672 -0.46718 0.73563 | HTTHHH | HTTHHH | 0.24486 | 0.24486 |
| -0.09875 0.75277 0.50256 -0.41854 | TTTHT | TTTHT | 0.25736 | 0.28736 |
| -0.04894 -0.00402 -0.83205 0.65252 | HTTTTH | HTTTTH | 0.20474 | 0.20474 |
| -0.68691 0.36726 0.04274 -0.02566 | THTTT | TTTHTHTH | 0.25131 | 0.25131 |
| -0.86072 0.76411 -0.12676 -0.62989 | TTTTH | TTTTH | 0.27854 | 0.27854 |
| -0.62191 -0.0639 -0.76511 0.1541 | TTTH | HH | 0.19609 | 0.19609 |
| -0.98674 0.06886 -0.1264 0.07303 | HH | HH | 0.16286 | 0.16286 |
| -0.86814 0.26898 0.38036 0.17075 | HTTHTHHHT | HTHTHHHHT | 0.22221 | 0.09319 |
| -0.2836 -0.03982 0.95045 -0.12088 | TTTTHHHH | TTTHHHHH | 0.07442 | 0.07442 |
| -0.45815 -0.66513 -0.62792 0.17215 | HTHTHT | HTHTHT | 0.2187 | 0.19569 |
| -0.68091 -0.54151 0.58108 0.08367 | TTHTHT | HTHTHHTH | 0.18617 | 0.16617 |
| -0.3671 -0.15162 -0.40285 0.8246 | HTHTHT | HTHTHT | 0.15013 | 0.15013 |
| -0.33288 0.42797 0.28725 0.78963 | THTH | THTH | 0.29693 | 0.29693 |
| -0.84802 -0.1492 0.02132 0.50808 | HH | HH | 0.21022 | 0.21022 |
| -0.88329 -0.28327 -0.28898 0.2427 | THTH | THTH | 0.21036 | 0.21036 |
| -0.3026 -0.75829 0.34643 -0.38838 | HTHTHTH | THTHTHTH | 0.26302 | 0.22761 |
| -0.65775 0.2746 0.42074 -0.10883 | HTHTHHTH | HTHTHHTH | 0.12494 | 0.12494 |
| -0.27497 0.25412 0.0121 0.06666 0.61195 | TTTH | THTH | 0.0623 | 0.0623 |
| -0.47217 0.0121 0.23258 0.85018 | HTTH | HTTH | 0.26015 | 0.26015 |
| -0.67931 -0.40494 -0.38843 0.4432 | HTHTHHHH | HTHTHHHH | 0.27136 | 0.27136 |

FIG. 15A

AUTOMATED SYNTHESIZING AND COMPILATION OF QUANTUM PROGRAMS

CROSS REFERENCE TO RELATED APPLICATIONS

This application claims priority to U.S. Provisional Patent Application No. 62/884,272, filed Aug. 8, 2019, entitled "Automated Synthesizing of Quantum Programs;" and U.S. Provisional Patent Application No. 62/947,365, filed Dec. 12, 2019, entitled "Automated Synthesizing of Quantum Programs." All of the above-referenced priority documents are incorporated herein by reference in their entirety.

BACKGROUND

The following description relates to automated synthesizing and compilation of quantum programs.

Quantum computers can perform computational tasks by executing quantum algorithms. A quantum algorithm can be represented, for example, as a quantum Hamiltonian, a sequence of quantum logic operations, a set of quantum machine instructions, or otherwise. A variety of physical systems have been proposed as quantum computing systems. Examples include superconducting circuits, trapped ions, spin systems and others.

DESCRIPTION OF DRAWINGS

FIG. 13D is a table showing gate sequences to produce states $(HT)^n|0\rangle$ up to ~99% fidelity at different n values.

FIG. 15A is a table showing compilation gate sequences determined using a Markov Decision Process and a brute-force search with $\in=0:3$.

DETAILED DESCRIPTION

Figure 1:
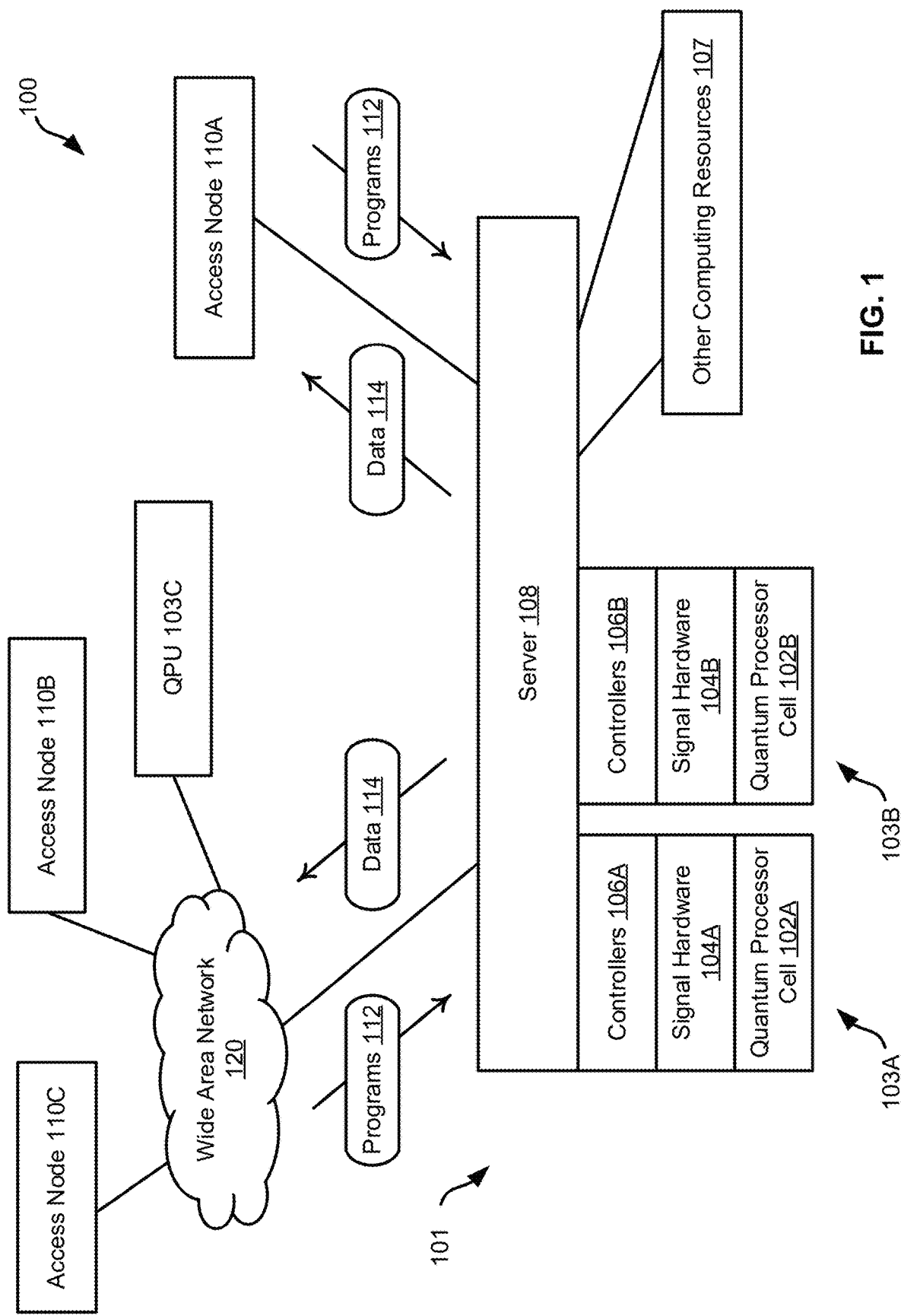
FIG. 1 is a block diagram of an example computing system.

In some aspects of what is described here, classical artificial intelligence (AI) systems are used to generate quantum programs that can be executed on quantum computers. For example, a problem or a class of problems to be solved by a quantum program (e.g., an optimization problem or another type of problem) can be formulated and provided as an input to the AI-based quantum program synthesis process. In some cases, a statistical model is developed through a training process, and the statistical model can be used to synthesize quantum programs for specific problems (e.g., specific problems in a class of problems that the statistical model has trained on).

Classical artificial intelligence systems generally use computational models developed through training to make decisions. Some example classical artificial intelligence systems use neural networks, support vector machines, classifiers, decision trees, or other types of statistical models to make decisions, and learning algorithms may be used to train the statistical models. For instance, statistical models can be trained by transfer learning algorithms, reinforcement learning algorithms, deep learning algorithms, asynchronous reinforcement learning algorithms, deep reinforcement learning algorithms or other types of learning algorithm. These and other types of classical artificial intelligence systems and associated learning algorithms may be used to generate an algorithm to run on a quantum computer.

In some implementations, neural networks are used to generate quantum programs. For instance, a training process can be used to train the neural network (e.g., using deep reinforcement learning or another type of machine learning process), and then the neural network can be sampled to construct quantum programs configured to generate solutions to specific problems.

In some instances, a quantum program is synthesized by iteratively adding quantum logic gates to a quantum logic circuit, and a statistical model is used to select the quantum logic gate to be added to the quantum logic circuit on each iteration. For instance, a neural network may provide a distribution of values for a set of allowed quantum logic gates, such that the distribution indicates each gate's relative likelihood of improving the quantum program. The neural network may produce the distribution based on data obtained from executing a current version of the quantum program on a quantum resource (e.g., on one or more quantum processor units, one or more quantum virtual machines, etc.). For instance, information characterizing the quantum state produced by the current version of the quantum program, a figure of merit for the current version of the quantum program (e.g., a "reward" or an equivalent cost function defined by an environment), and a problem to be solved by the quantum program may be provided as inputs to the neural network.

In some implementations, the techniques and systems described here provide technical advantages and improvements over existing approaches. For example, the quantum program synthesis techniques described here can provide an automated process for generating quantum programs to find solutions to specific problems (e.g., optimization problems or other types of problems). In some cases, the quantum program synthesis process constructs a quantum logic circuit using a library of quantum logic gates that are available to a specific type or class of quantum processors. The quantum logic gates may include parametric gates that can be further optimized for an individual quantum resource. In some cases, the quantum program synthesis techniques described here can be parallelized across many classical, quantum or hybrid (classical/quantum) resources in a computing system. And in some cases, multiple levels of optimization can be applied to utilize classical and quantum resources efficiently for solving optimization problems. Accordingly, in some cases, the techniques described here can improve the speed, efficiency and accuracy with which quantum resources are used to solve optimization problems.

FIG. 1 is a block diagram of an example computing system 100. The example computing system 100 shown in FIG. 1 includes a computing environment 101 and access nodes 110A, 110B, 110C. A computing system may include additional or different features, and the components of a computing system may operate as described with respect to FIG. 1 or in another manner.

The example computing environment 101 includes computing resources and exposes their functionality to the access nodes 110A, 110B, 110C (referred to collectively as "access nodes 110"). The computing environment 101 shown in FIG. 1 includes a server 108, quantum processor units 103A, 103B and other computing resources 107. The computing environment 101 may also include one or more of the access nodes (e.g., the example access node 110A) and other features and components. A computing environment may include additional or different features, and the components of a computing environment may operate as described with respect to FIG. 1 or in another manner.

The example computing environment 101 can provide services to the access nodes 110, for example, as a cloud-based or remote-accessed computer, as a distributed computing resource, as a supercomputer or another type of high-performance computing resource, or in another manner. The computing environment 101 or the access nodes 110 may also have access to one or more remote QPUs (e.g., QPU 103C). As shown in FIG. 1, to access computing resources of the computing environment 101, the access nodes 110 send programs 112 to the server 108 and in response, the access nodes 110 receive data 114 from the server 108. The access nodes 110 may access services of the computing environment 101 in another manner, and the server 108 or other components of the computing environment 101 may expose computing resources in another manner.

Any of the access nodes 110 can operate local to, or remote from, the server 108 or other components of the computing environment 101. In the example shown in FIG. 1, the access node 110A has a local data connection to the server 108 and communicates directly with the server 108 through the local data connection. The local data connection can be implemented, for instance, as a wireless Local Area Network, an Ethernet connection, or another type of wired or wireless connection. Or in some cases, a local access node can be integrated with the server 108 or other components of the computing environment 101. Generally, the computing system 100 can include any number of local access nodes.

In the example shown in FIG. 1, the access nodes 110B, 110C and the QPU 103C each have a remote data connection to the server 108, and each communicates with the server 108 through the remote data connection. The remote data connection in FIG. 1 is provided by a wide area network 120, such as, for example, the Internet or another type of wide area communication network. In some cases, remote access nodes use another type of remote data connection (e.g., satellite-based connections, a cellular network, a private network, etc.) to access the server 108. Generally, the computing system 100 can include any number of remote access nodes.

The example server 108 shown in FIG. 1 communicates with the access nodes 110 and the computing resources in the computing environment 101. For example, the server 108 can delegate computational tasks to the quantum processor units 103A, 103B and the other computing resources 107, and the server 108 can receive the output data from the computational tasks performed by the quantum processor units 103A, 103B and the other computing resources 107. In some implementations, the server 108 includes a personal computing device, a computer cluster, one or more servers, databases, networks, or other types of classical or quantum computing equipment. The server 108 may include additional or different features, and may operate as described with respect to FIG. 1 or in another manner.

Each of the example quantum processor units 103A, 103B operates as a quantum computing resource in the computing environment 101. The other computing resources 107 may include additional quantum computing resources (e.g., quantum processor units, quantum virtual machines (QVMs) or quantum simulators) as well as classical (non-quantum) computing resources such as, for example, digital microprocessors, specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the server 108 generates computing jobs, identifies an appropriate computing resource (e.g., a QPU or QVM) in the computing environment 101 to execute the computing job, and sends the computing job to the identified resource for execution. For example, the server 108 may send a computing job to the quantum processor unit 103A, the quantum processor unit 103B or any of the other computing resources 107. A computing job can be formatted, for example, as a computer program, function, code, or other type of computer instruction set. Each computing job includes instructions that, when executed by an appropriate computing resource, perform a computational task, and generate output data based on input data. For example, a computing job can include instructions formatted for a quantum processor unit, a quantum virtual machine, a digital microprocessor, co-processor or other classical data processing apparatus, or another type of computing resource.

In some implementations, the server 108 operates as a host system for the computing environment 101. For example, the access nodes 110 may send programs 112 to server 108 for execution in the computing environment 101. The server 108 can store the programs 112 in a program queue, generate one or more computing jobs for executing the programs 112, generate a schedule for the computing jobs, allocate computing resources in the computing environment 101 according to the schedule, and delegate the computing jobs to the allocated computing resources. The server 108 can receive, from each computing resource, output data from the execution of each computing job. Based on the output data, the server 108 may generate additional computing jobs, generate data 114 that is provided back to an access node 110, or perform another type of action.

In some implementations, all or part of the computing environment 101 operates as a cloud-based quantum computing (QC) environment, and the server 108 operates as a host system for the cloud-based QC environment. For example, the programs 112 can be formatted as quantum computing programs for execution by one or more quantum processor units. The server 108 can allocate quantum computing resources (e.g., one or more QPUs, one or more quantum virtual machines, etc.) in the cloud-based QC environment according to the schedule, and delegate quantum computing jobs to the allocated quantum computing resources for execution.

In some implementations, all or part of the computing environment 101 operates as a hybrid computing environment, and the server 108 operates as a host system for the hybrid environment. For example, the programs 112 can be formatted as hybrid computing programs, which include instructions for execution by one or more quantum processor units and instructions that can be executed by another type of computing resource. The server 108 can allocate quantum computing resources (e.g., one or more QPUs, one or more quantum virtual machines, etc.) and other computing resources in the hybrid computing environment according to the schedule, and delegate computing jobs to the allocated computing resources for execution. The other (non-quantum) computing resources in the hybrid environment may include, for example, one or more digital microprocessors, one or more specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), or other types of computing modules.

In some cases, the server 108 can select the type of computing resource (e.g., quantum or otherwise) to execute an individual computing job in the computing environment 101. For example, the server 108 may select a particular quantum processor unit (QPU) or other computing resource based on availability of the resource, speed of the resource, information or state capacity of the resource, a performance metric (e.g., process fidelity) of the resource, or based on a combination of these and other factors. In some cases, the server 108 can perform load balancing, resource testing and calibration, and other types of operations to improve or optimize computing performance.

The example server 108 shown in FIG. 1 may include a quantum machine instruction library or other resources that the server 108 uses to produce quantum computing jobs to be executed by quantum computing resources in the computing environment 101 (e.g., by the quantum processor unit 103). The quantum machine instruction library may include, for example, calibration procedures, hardware tests, quantum algorithms, quantum gates, etc. The quantum machine instruction library can include a file structure, naming convention, or other system that allows the resources in the quantum machine instruction library to be invoked by the programs 112. For instance, the server 108 or the computing environment 101 can expose the quantum machine instruction library to the access nodes 110 through a set of application programming interfaces (APIs). Accordingly, the programs 112 that are produced by the access nodes 110 and delivered to the server 108 may include information that invokes a quantum machine instruction library stored at the server 108. In some implementations, one or more of the access nodes 110 includes a local version of a quantum machine instruction library. Accordingly, the programs 112 that are produced by the access node 110B and delivered to the server 108 may include instruction sets from a quantum machine instruction library.

Each of the example quantum processor units 103A, 103B shown in FIG. 1 can perform quantum computational tasks by executing quantum machine instructions. In some implementations, a quantum processor unit can perform quantum computation by storing and manipulating information within quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, a quantum processor unit (e.g., QPU 103A or QPU 103B) can operate using gate-based models for quantum computing. For example, the qubits can be initialized in an initial state, and a quantum logic circuit comprised of a series of quantum logic gates can be applied to transform the qubits and extract measurements representing the output of the quantum computation. In some implementations, a quantum processor unit (e.g., QPU 103A or QPU 103B) can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, quantum error correcting schemes can be deployed to achieve fault-tolerant quantum computation, or other computational regimes may be used. Pairs of qubits can be addressed, for example, with two-qubit logic operations that are capable of generating entanglement, independent of other pairs of qubits. In some implementations, more than two qubits can be addressed, for example, with multi-qubit quantum logic operations capable of generating multi-qubit entanglement. In some implementations, the quantum processor unit 103A is constructed and operated according to a scalable quantum computing architecture. For example, in some cases, the architecture can be scaled to a large number of qubits to achieve large-scale general-purpose coherent quantum computing.

The example quantum processor unit 103A shown in FIG. 1 includes controllers 106A, signal hardware 104A, and a quantum processor cell 102A; similarly, the example quantum processor unit 103B shown in FIG. 1 includes controllers 106B, signal hardware 104B, and a quantum processor cell 102B. A quantum processor unit may include additional or different features, and the components of a quantum processor unit may operate as described with respect to FIG. 1 or in another manner.

In some instances, all or part of the quantum processor cell 102A functions as a quantum processor, a quantum memory, or another type of subsystem. In some examples, the quantum processor cell 102A includes a quantum circuit system. The quantum circuit system may include qubit devices, resonator devices and possibly other devices that are used to store and process quantum information. In some cases, the quantum processor cell 102A includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor cell 102A. In some cases, the quantum processor cell 102A includes an ion trap system, and the qubit devices are implemented as trapped ions controlled by optical signals delivered to the quantum processor cell 102A. In some cases, the quantum processor cell 102A includes a spin system, and the qubit devices are implemented as nuclear or electron spins controlled by microwave or radio-frequency signals delivered to the quantum processor cell 102A. The quantum processor cell 102A may be implemented based on another physical modality of quantum computing.

In some cases, a single quantum processor unit can include multiple quantum processor cells. For example, the QPU 103A can be a dual-QPU that includes multiple independent quantum processor cells in a shared environment. For instance, the dual-QPU may include two independently operated superconducting quantum processor circuits in the same cryogenic environment, on the same chip or substrate, or in another type of shared circuit environment. In some cases, the QPU 103A includes two, three, four or more quantum processor cells that can operate in parallel based on interactions with the controllers 106A.

In some implementations, the example quantum processor cell 102A can process quantum information by applying control signals to the qubits in the quantum processor cell 102A. The control signals can be configured to encode information in the qubits, to process the information by performing quantum logic gates or other types of operations, or to extract information from the qubits. In some examples, the operations can be expressed as single-qubit logic gates, two-qubit logic gates, or other types of quantum logic gates that operate on one or more qubits. A sequence of quantum logic operations can be applied to the qubits to perform a quantum algorithm. The quantum algorithm may correspond to a computational task, a hardware test, a quantum error correction procedure, a quantum state distillation procedure, or a combination of these and other types of operations.

The example signal hardware 104A includes components that communicate with the quantum processor cell 102A. The signal hardware 104A may include, for example, waveform generators, amplifiers, digitizers, high-frequency sources, DC sources, AC sources and other type of components. The signal hardware may include additional or different features and components. In the example shown, components of the signal hardware 104A are adapted to interact with the quantum processor cell 102A. For example, the signal hardware 104A can be configured to operate in a particular frequency range, configured to generate and process signals in a particular format, or the hardware may be adapted in another manner.

In some instances, one or more components of the signal hardware 104A generate control signals, for example, based on control information from the controllers 106A. The control signals can be delivered to the quantum processor cell 102A to operate the quantum processor unit 103A. For instance, the signal hardware 104A may generate signals to implement quantum logic operations, readout operations or other types of operations. As an example, the signal hardware 104A may include arbitrary waveform generators (AWGs) that generate electromagnetic waveforms (e.g., microwave or radio-frequency) or laser systems that generate optical waveforms. The waveforms or other types of signals generated by the signal hardware 104A can be delivered to devices in the quantum processor cell 102A to operate qubit devices, readout devices, bias devices, coupler devices or other types of components in the quantum processor cell 102A.

I In some instances, the signal hardware 104A receives and processes signals from the quantum processor cell 102A. The received signals can be generated by operation of the quantum processor unit 103A. For instance, the signal hardware 104A may receive signals from the devices in the quantum processor cell 102A in response to readout or other operations performed by the quantum processor cell 102A. Signals received from the quantum processor cell 102A can be mixed, digitized, filtered, or otherwise processed by the signal hardware 104A to extract information, and the information extracted can be provided to the controllers 106A or handled in another manner. In some examples, the signal hardware 104A may include a digitizer that digitizes electromagnetic waveforms (e.g., microwave or radio-frequency) or optical signals, and a digitized waveform can be delivered to the controllers 106A or to other signal hardware components. In some instances, the controllers 106A process the information from the signal hardware 104A and provide feedback to the signal hardware 104A; based on the feedback, the signal hardware 104A can in turn generate new control signals that are delivered to the quantum processor cell 102A.

In some implementations, the signal hardware 104A includes signal delivery hardware that interface with the quantum processor cell 102A. For example, the signal hardware 104A may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processor cell 102A. In some instances, signal delivery hardware performs preprocessing, signal conditioning or other operations on readout signals received from the quantum processor cell 102A.

The example controllers 106A communicate with the signal hardware 104A to control operation of the quantum processor unit 103A. The controllers 106A may include digital computing hardware that directly interface with components of the signal hardware 104A. The example controllers 106A may include processors, memory, clocks and other types of systems or subsystems. The processors may include one or more single- or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory, a digital or quantum memory, or another type of computer storage medium. The controllers 106A may include additional or different features and components.

In some implementations, the controllers 106A include memory or other components that store quantum state information, for example, based on qubit readout operations performed by the quantum processor unit 103A. For instance, the states of one or more qubits in the quantum processor cell 102A can be measured by qubit readout operations, and the measured state information can be stored in a cache or other type of memory system in or more of the controllers 106A. In some cases, the measured state information is used in the execution of a quantum algorithm, a quantum error correction procedure, a quantum processor unit (QPU) calibration or testing procedure, or another type of quantum process.

In some implementations, the controllers 106A include memory or other components that store quantum machine instructions, for example, representing a quantum program for execution by the quantum processor unit 103A. In some cases, the quantum machine instructions are received from the server 108 in a hardware-independent format. For example, quantum machine instructions may be provided in a quantum instruction language such as Quil, described in the publication "A Practical Quantum Instruction Set Architecture," arXiv:1608.03355v2, dated Feb. 17, 2017, or another quantum instruction language. For instance, the quantum machine instructions may be written in a format that can be executed by a broad range of quantum processor units or quantum virtual machines.

In some instances, the controllers 106A can interpret the quantum machine instructions and generate a hardware-specific control sequences configured to execute the operations proscribed by the quantum machine instructions. For example, the controllers 106A may generate control information that is delivered to the signal hardware 104A and converted to control signals that control the quantum processor cell 102A.

In some implementations, the controllers 106A include one or more clocks that control the timing of operations. For example, operations performed by the controllers 106A may be scheduled for execution over a series of clock cycles, and clock signals from one or more clocks can be used to control the relative timing of each operation or groups of operations. In some cases, the controllers 106A schedule control operations according to quantum machine instructions in a quantum computing program, and the control information is delivered to the signal hardware 104A according to the schedule in response to clock signals from a clock or other timing system.

In some implementations, the controllers 106A include processors or other components that execute computer program instructions (e.g., instructions formatted as software, firmware, or otherwise). For example, the controllers 106A may execute a quantum processor unit (QPU) driver software, which may include machine code compiled from any type of programming language (e.g., Python, C++, etc.) or instructions in another format. In some cases, QPU driver software receives quantum machine instructions (e.g., based on information from the server 108) and quantum state information (e.g., based on information from the signal hardware 104A), and generates control sequences for the quantum processor unit 103A based on the quantum machine instructions and quantum state information.

In some instances, the controllers 106A generate control information (e.g., a digital waveform) that is delivered to the signal hardware 104A and converted to control signals (e.g., analog waveforms) for delivery to the quantum processor cell 102A. The digital control information can be generated based on quantum machine instructions, for example, to execute quantum logic operations, readout operations, or other types of control.

In some instances, the controllers 106A extract qubit state information from qubit readout signals, for example, to identify the quantum states of qubits in the quantum processor cell 102A or for other purposes. For example, the controllers may receive the qubit readout signals (e.g., in the form of analog waveforms) from the signal hardware 104A, digitize the qubit readout signals, and extract qubit state information from the digitized signals.

The other QPU 103B and its components (e.g., the quantum processor cell 102B, the signal hardware 104B and controllers 106B) can be implemented, and in some instances operate, as described above with respect to the QPU 103A; in some cases, the QPU 103B and its components may be implemented or may operate in another manner. Similarly, the remote QPU 103C and its components can be implemented, and in some instances operate, in analogous manner.

Figure 2:
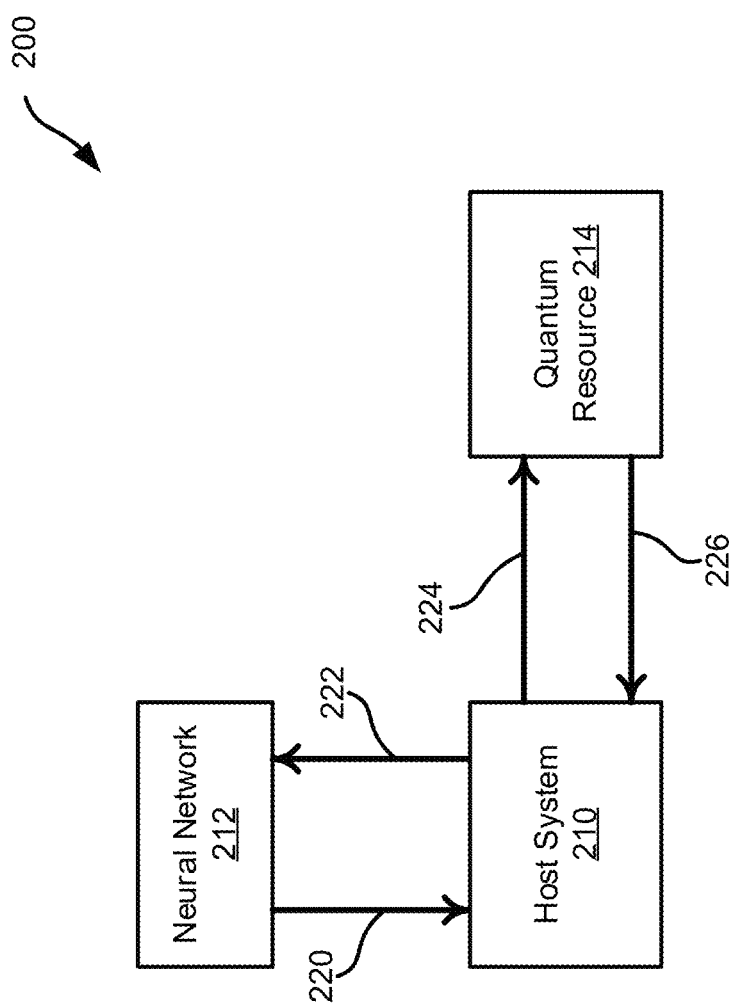
FIG. 2 is a schematic diagram of example modules in a computing system.

FIG. 2 is a schematic diagram showing resources in an example computing system 200. The example computing system 200 shown in FIG. 2 includes a host system 210, a neural network 212 and a quantum resource 214. The computing system 200 may include additional or different resources and components.

Figure 8:
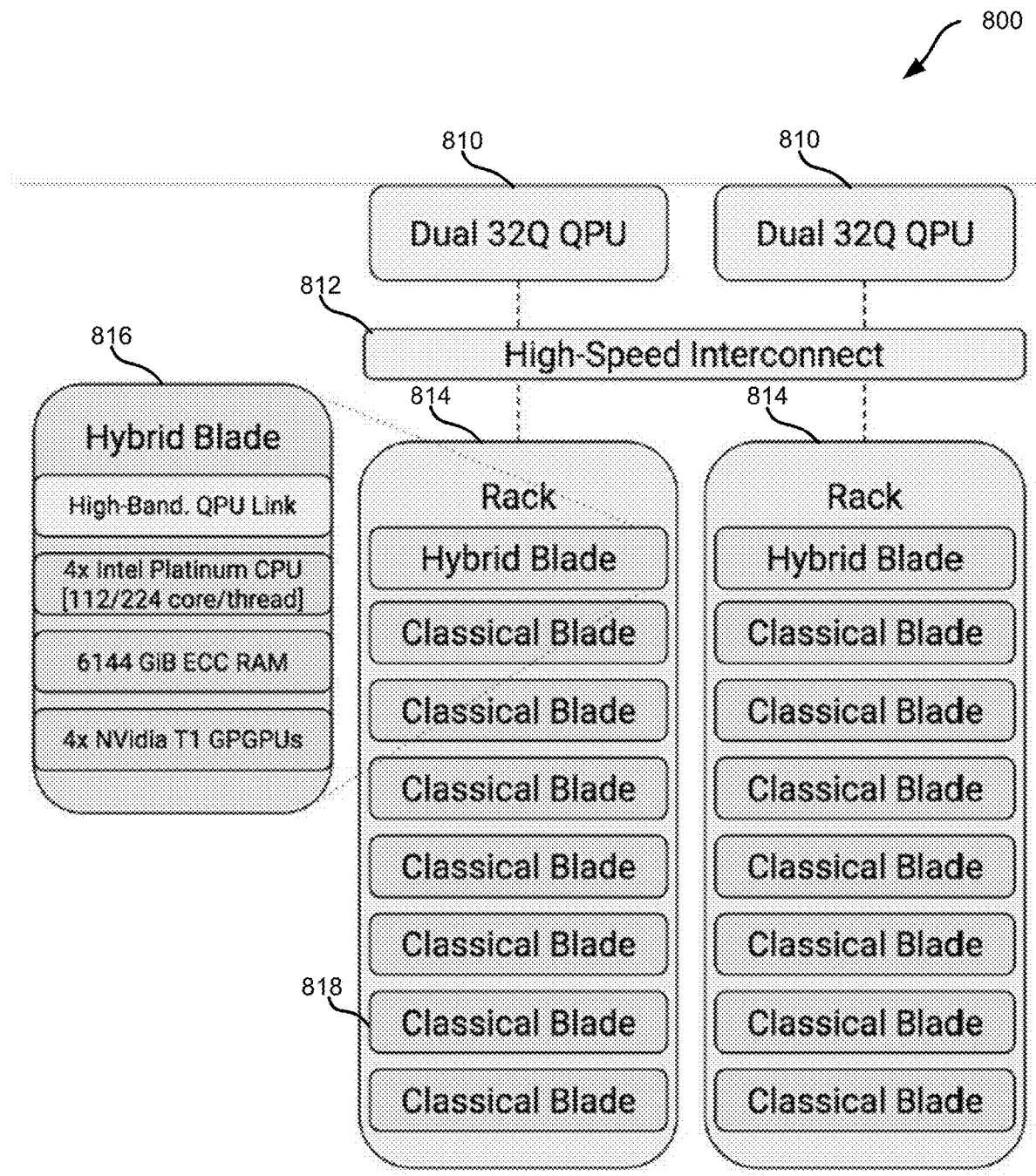
FIG. 8 is a diagram of hardware elements in an example computing system.

In some examples, the host system 210 and the neural network 212 can be implemented on a classical computing system, and the quantum resource 214 can be implemented as a quantum processor unit (QPU) or a quantum virtual machine (QVM). For instance, in the computing environment shown in FIG. 1, the host system 210 and the neural network may be implemented by one or more CPUs and GPUs included in the controllers 106A, and the quantum resource 214 may be implemented by the quantum processor unit 103A. The example resources shown in FIG. 2 can be implemented in another manner and in other types of computing environments. For instance, the host system 210 and neural network 212 may be implemented by the server 108 or the other computing resources 107, and the quantum resource 214 may be implemented by one or both of the quantum processor units 103A, 103B. In addition, FIG. 8 shows additional examples of hardware resources that may be used to implement the resources and operations shown in FIG. 2.

The example resources shown in FIG. 2 provide an example framework for utilizing a classical statistical model such as a neural network to generate quantum algorithms for solving problems on quantum computers. A problem to be solved can be formulated and provided as an input, and the neural network 212 can learn how to program the quantum computer to solve the problem. In some implementations, the problem to be solved by the quantum program is initially encoded. For example, the problem may be encoded into an equivalent problem that has a form or structure that can be represented on the quantum computer. In some cases, encoding is not necessary, for example, when the initial form or structure of the problem can be directly or trivially represented on the quantum computer. In some cases, an encoding process is needed to transform the problem from a natural problem space to a quantum computational problem space. For instance, electron configurations can be encoded using a technique such as the Bravyi-Kitaev algorithm. In some examples, encoding schemes may be configured to make more economic use of qubits or other attributes of quantum resources. Other types of encoding schemes may be used.

In the example shown in FIG. 2, the neural network 212 is constructed and trained using a machine learning algorithm. For instance, the neural network 212 can be trained by a transfer learning algorithm, a reinforcement learning algorithm, a deep learning algorithm, an asynchronous reinforcement learning algorithm, a deep reinforcement learning algorithm or another types of machine learning algorithm. In some embodiments, transfer learning algorithms train a smaller neural network to solve smaller problems, and the results of the smaller neural network are fed to a larger neural network. In some embodiments, transfer learning is immediately applicable to extending models across "domains"—for example, a model can be trained for Max-Cut, then this model can be used to efficiently train a model for the Traveling Salesperson Problem. Asynchronous reinforcement learning algorithms typically train multiple smaller neural networks (e.g., in parallel) and combine the smaller neural networks to form a larger neural network. Reinforcement learning algorithms map a (state, reward) to an action, for example, through a look-up table. Deep reinforcement learning algorithms use a neural network to map a (state, reward) to an action.

Table 1 below provides example elements of a deep reinforcement learning algorithm that can be used by the computer system 200 to synthesize quantum programs. In this example, the elements shown in the table define an agent and a learning environment for a deep reinforcement learning process. In particular, the action, reward, state, and solved elements shown in Table 1 represent the learning environment, while the policy shown in Table 1 represents the agent. The policy provides the model by which the agent chooses to take a particular action, given a state, reward pair.

TABLE 1

| | Quantum Program Synthesis |
|---|---|
| Action | Apply a gate |
| Reward | Hamiltonian expectation value |
| State | State probabilities, graph |
| Solved | Hamiltonian expectation value is maximized |
| Policy | Neural network |

As shown in the right column of Table 1, in an example deep reinforcement learning process for quantum program synthesis, an action of an agent corresponds to applying a quantum logic gate to a quantum logic circuit; the reward corresponds to a Hamiltonian expectation value; the state corresponds to state probabilities and a graph; the solved criterion corresponds to the Hamiltonian expectation value being maximized, and the policy of the agent corresponds to a neural network. In some cases, the elements of a deep reinforcement learning process may be used in another manner for quantum program synthesis.

A publication entitled "Automated quantum programming via reinforcement learning for combinatorial optimization" (by Keri A. McKiernan, Erik Davis, M. Sohaib Alam, and Chad Rigetti; submitted to arXiv.org on Aug. 21, 2019; available at https://arxiv.org/abs/1908.08054v1; referred to hereafter as "Arxiv 1908.08054v1"), which is hereby incorporated by reference, describes example implementations of deep reinforcement learning for quantum program synthesis and example methodologies for incentive-based programming of hybrid quantum computing systems. The example methodologies provided in Arxiv 1908.08054v1 are applied to solve combinatorial optimization problems (COPs) via hybrid quantum computing systems, and the methodologies may also be applied to solve other types of problems and to build other types of quantum programs.

To apply reinforcement learning to solve a combinatorial optimization problem (COP) using quantum resources, Arxiv 1908.08054v1 provides an example of the state and action spaces, the reward, as well as the learning agent. In the case of COPs, the reward can be specified as the cost Hamiltonian's expectation value, $\langle \psi | H_C | \psi \rangle$. The action space $\mathcal{A}$ can be specified as a finite set of quantum gates, such as a discretized set of RZ and RY rotation gates. Other types of state and action spaces, and another type of reward may be used in some instances. The example provided in Arxiv 1908.08054v1 focuses on the PPO (Proximal Policy Optimization) algorithm applied to a shared actor-critic agent. Using these identifications, the ability of PPO to solve a variety of COPs is demonstrated as an example.

A reinforcement learning problem is typically specified as a Markov Decision Process (MDP), in which the goal of the learning agent is to find the optimal policy. The optimal policy can be described as the conditional probability $\pi^*(a|s)$ of applying a particular quantum gate (action a) given a particular representation of the qubit register (state s) that would maximize the expected (discounted) return, which may be expressed as $$\mathbb{E}_\pi \left[ \sum_{k=0}^{\infty} \gamma^k R_{k+1} \right],$$

without necessarily having a model of the environment p(s',r|s,a). In the expression of the expected return above, the expression $\mathbb{E}_\pi$ denotes the mathematical expectation over all possible probabilistic outcomes (as determined by the policy); the discount factor $\gamma$ may be any number between 0 and 1, and causes the agent to prefer higher rewards earlier rather than later. The variable $R_{k+1}$ represents the reward observed in stage k+1 of the decision process. The model p(s',r|s,a) refers to the conditional probability of observing state s' and receiving reward r given that the agent performs action a in the state s. Defining the value of a state s under a policy $\pi$ as $$V_\pi(s) = \mathbb{E}_\pi \left[ \sum_{k=0}^{\infty} \gamma^k R_{t+k+1} \middle| S_t = s \right] \quad (1)$$

the optimal policy can be identified more concretely as $\pi^*$ such that $V_{\pi^*}(s) >= V_\pi(s)$ for all states s and all policies n. In practice PPO will find some approximation to the theoretical optimum as a function of some parameters $\pi^*(a|s;\theta) \approx \pi^*(a|s)$ which it will tune towards the optimum during the learning process.

The process of training an agent based on measurements from a quantum process can, in some cases, be modeled as a partially observed Markov Decision Process (POMDP), when quantum states are not themselves directly observable, and only their measurement outcomes are. While the action (quantum gate) that PPO chooses to carry out deterministically evolves the quantum state (in the absence of noise), the observation it receives from the measurement samples are in general not deterministic. For a single COP instance, the observations that PPO receives from the environment are some function of the sampled bitstrings from the measured quantum circuit. This function of the sampled bitstrings can be specified as the $2^n$ Born probabilities $|\alpha_i|^2$, subject to the normalization condition $$\sum_{i=0}^{2^n-1} |\alpha_i|^2 = 1$$

$$s_{Born} : |\psi\rangle \rightarrow \left[|\alpha_0|^2, \ldots, |\alpha_{2^n-1}|^2\right] \quad (2)$$

which involves a specification of $2^n-1$ real numbers. For this example representation of the observation space, which is equivalent to the space of probabilistic bits, the optimal policy should disregard any phase information. For example, if the goal was to maximize $\langle\psi|X|\psi\rangle$, it is sufficient to produce any of the states $(1/\sqrt{2})(|0\rangle+e^{i\theta}|1\rangle)$, whichever one is cheapest to produce given a particular gateset. In cases where the Hamiltonians are diagonal in the computational basis, their solutions can be specified as some bitstring, which is equivalent to some computational basis element, and not necessarily a linear combination of such basis elements.

To extract quantum circuits from the trained agent on unseen problem instances of a COP, the state space can be augmented with a representation of the COP problem instance itself. For example, in the case of MAXCUT, the state description can include the graph whose maximum cut is sought. The RL agent can be trained over a collection of several such COP instances, forming the training set, and its predictions can be tested against a collection of similar but different COP instances that the agent has not seen before.

Three example COPs are considered in the examples described in the reference Arxiv 1908.08054v1: MAXCUT, MAXQP, and QUBO (or UQBP). These problems can be described with respect to a weighted graph $G=(V, E)$ on vertices V and edges E. The vertices may be numbered $V=\{1, \ldots, n\}$, with weights specified by a n×n real symmetric matrix w.

For the MAXCUT problem, the weights are non-negative values $w_{ij} \geq 0$, and $w_{ij}$ is nonzero if there is an edge between vertices i and j. The maximum cut problem seeks a partition of V into two subsets such that the total edge weight between them is maximized. Formally, $$MAXCUT \max_{z\in\{-1,1\}^n} \frac{1}{2}\sum_{i,j} w_{ij} \frac{1-z_i z_j}{2}.$$

This problem is known to be NP-hard, although a number of polynomial-time approximation algorithms exist.

In some instances, solving the MAXCUT problem is equivalent to maximizing the expression $\Sigma_{i<j}(-w_{ij})z_i z_j$, where the coefficients $(-w_{ij})$ are always negative. The MAXQP problem can be considered a generalization of the MAXCUT problem, obtained by allowing the weights $w_{ij}$ to have mixed signs. The resulting MAXQP problem, also NP-hard, is $$MAXQP \max_{z\in\{-1,1\}^n} \sum_{i,j} w_{ij} z_i z_j$$

where w is a real symmetric matrix with null diagonal entries.

And the QUBO problem can be considered a generalization of the MAXQP problem, obtained by augmenting the quadratic expression $\Sigma_{i,j} w_{ij} z_i z_j$ in the definition of MAXQP with an affine term (i.e. a term involving only single powers of z). The resulting QUBO ("quadratic unconstrained binary optimization") problem can be given by $$QUBO \max_{x\in\{0,1\}^n} \sum_{i,j} w_{ij} x_i x_j$$

where w is a real symmetric n×n matrix. The difference between $x_i x_j$ above (in MAXQP) and $z_i z_j$ (in MAXCUT) is the domain of the corresponding variables: $\{0,1\}$ for $x_i$ and $\{-1,1\}$ for $z_i$. The above formulation of the QUBO problem is sometimes abbreviated as UQBP ("unconstrained quadratic binary program"). Under a transformation $x_i=(1-z_i)/2$, instances of the MAXCUT and MAXQP problem may be embedded as instances of the QUBO problem.

In the following discussion, $C_{MaxCut}$ ($C_{MaxQP}$, $C_{QUBO}$ respectively) denote the objective functional in the MAXCUT problem (MAXQO, QUBO respectively) when expressed in terms of 0-1 binary variables and the weight matrix w. Using this notation, the maximum cut of a graph with weight matrix w is represented as $\max_{x\in\{0,1\}^n} C_{MaxCut}(x,w)$.

In the examples described in the reference (arXiv: 1908.08054), for each of these three example optimization problems (MAXCUT, MAXQO, QUBO), 16,000 random instances were generated; of these, 8,000 were used for training, 4,000 for validation, and 4,000 held out for testing. However, other sizes and types of problem sets may be used to train, validate and test a system. Also in the examples described in the reference (arXiv: 1908.08054), the number of variables is fixed at n=10, and the number of shots is fixed at m=10. However, in general any integer number of variables and shots may be used.

These example optimization problems (MAXCUT, MAXQO, QUBO) can be naturally mapped to quantum hardware, in the sense that a one-to-one correspondence between binary problem variables and qubits may be obtained. Thus for a problem of n variables, each basis vector of a n-qubit system may be expressed in ket notation as $|b_1 \ldots b_n\rangle$ where $b_i \in \{0,1\}$, and hence a single measurement of this system in the standard basis yields a candidate solution to the optimization problem.

In some cases, it is possible that the theoretical limit of the optimal program would be a series of X gates because the solution to these three example COPs is a bitstring (representing a computational basis element), and the gates I and X are sufficient to produce such states starting from the $|0\rangle^{\otimes N}$ state. For these and other Hamiltonians consisting of diagonal terms such as $Z_i Z_j$, the shortest sequence of gates to produce the solution bitstring is a series of X gates on the appropriate qubits. A rotation of any angle other than $\pi$ about the x-axis would produce a less than optimal value for the $Z_i Z_j$ Hamiltonian, and therefore the reward, so that the policy improvement theorem can be used to improve upon this policy.

In some implementations, the action space may be defined with the following example actions:

X, Y, and Z rotations on each qubit, with discrete angles $2\pi k/8$.

Controlled-not (CNOT) gates on each pair of distinct qubits.

Thus, in this example there are 3*10*8=240 single qubit actions, and 45 two qubit actions. The action space may be defined in another manner. For example, the action space may include additional or different single-qubt quantum logic gates (e.g., rotations about different axes, a different discretization, continuous rotations, etc.), additional or different two-qubit quantum logic gates (e.g., discretized or continuous controlled-phase (CZ) gates, Bell-Rabi gates, etc.), or combinations of these and other types of quantum logic gates.

In some implementations, each of the actions in the action space (each quantum logic gate) can be expressed in the Quil Instruction Set Architecture (Quil ISA), and a sequence of actions (a quantum logic circuit) may be expressed as a Quil program. Other instruction set architectures and programming languages may be used. When a sequence of actions is executed on a quantum device, a corresponding quantum state is prepared. A measurement of this state with respect to the standard computational basis results in a bitstring $b=b_1 b_2 \ldots b_n$, where $b_i$ was the measured state of qubit i. This process of preparation and measurement may be repeated for some number of times (the "number of shots"), resulting in a sequence of bitstrings. After number of shots m, the resulting observation of the quantum state is an m×n binary array $B=[b^{(1)}; \ldots; b^{(m)}]$. For example, if m=100 and n=10, the resulting observation of the quantum state is a 100×10 binary array $B=[b^{(1)}; \ldots; b^{(100)}]$.

In some implementations, a problem instance may be specified by a specific choice of weights w. For MaxCut and MaxQP, the $\binom{n}{2}$ off-diagonal upper triangular entries of the weight matrix w suffice to fully describe the problem instance. For QUBO, the $\binom{n}{2}$+n upper triangular entries are used. These may be concisely expressed as a numeric vector w̃, representing an observation of the problem instance. The observation made by the agent may include the joint quantum and problem observations obs:=(B,w̃).

In some implementations, the reward may be defined with respect to the joint quantum and problem observations. For instance, with respect to a given problem of the form $\max_{x \in \{0,1\}^n} C(x)$, the reward associated with the observation obs can be given by $$r(obs) = \frac{1}{m} \sum_{i=1}^{m} C(b^{(i)}).$$

This may be seen to be an estimate of the expectation of the corresponding problem Hamiltonian. The reward may be defined in another manner in some cases.

Because the quantum and problem observations are of a distinct nature, the policy architecture may treat them differently. With respect to the quantum observation, the bitstrings $\{b^{(i)}\}_{i=1}^{m}$, form an exchangeable sequence. To capture this permutation-invariance of measurement statistics, an initial layer may be considered using the framework of "Deep Sets." A neural network typically represents a sequence of mathematical transformations, mapping an input (e.g., an input vector) to an output (e.g., an output vector). These transformations (often referred to as layers) are typically parameterized by (1) weights that characterize a linear portion of the transformation and and (2) activation functions that are typically nonlinear and have the effect of making the composition of layers nontrivial. In this context, the initial layer is the first transformation applied to the measured bitstrings $\{b^{(i)}\}_{i=1}^{m}$. The framework of "Deep Sets" (see Manzil Zaheer et al., "Deep sets," *Advances in neural information processing systems*, 2017, pp. 3391-3401) suggests a form for what the initial layer should look like in the case where the input has certain symmetries. As a special case, in some examples, the initial input layer v can be defined by $$v(obs; \Theta) := \rho\left(\frac{1}{m} \sum_{i=1}^{m} \Theta b^{(i)}\right),$$

where θ is a l×n matrix of weights for the first layer of the neural network, and ρ is a nonlinear activation function (e.g., ρ=tan h). In this example, v is able to capture first-order statistics of the observed bitstrings via the trainable weights θ. In some cases, the linear term in the above expression for v can be extended with higher terms, corresponding to higher-order statistics of the underlying Born probabilities.

In some implementations, the initial observation (B,w̃) is transformed to (v(obs;θ),w̃), which is then concatenated to a single vector and subsequently passed through a neural network, and the output of the neural network is a vector of action scores. In some cases, the number of weights in the full neural network may scale as some small polynomial in the number of problem variables n. For learning, an actor-critic PPO may be used. In some implementations, a single neural network serves as a shared actor and critic network, and the weights for both the dense layers (i.e., those layers other than the initial layer v) as well as those for measurement statistics (i.e., the weights for the initial layer v, which serve to translate a set of measured bitstrings to some reduced form) can be trained. Actor-critic algorithms represent a class of reinforcement learning algorithms that involve the estimation of both an optimal policy function (the "actor") as well as an optimal value function (the "critic"). Typically both of these functions are represented via neural-networks, and in the case of shared actor-critic methods these neural networks may have some subset of their weights shared in common.

The examples described above and in the reference (arXiv:1908.08054) can be applied to more programming tasks, deeper investigation of input and observation featurization techniques, larger or continuous action spaces, modifications of the reward, training different agent types, analysis of output sequences and other variations. For instance, the input problems can be represented via their "weight matrices" as described above, or another representation may be used, for example, any of the many vectorized representations commonly used in the literature on "Graph Neural Networks," which may affect end-to-end performance. Examples of other agents and learning algorithms that may be used include "Deep Q Networks," "Deep Deterministic Policy Gradient," and "Trust Region Policy Optimization" among others.

For example, applying the methodology to other problems (problems other than the three example COPs described above), such as those found in quantum simulation settings where Hamiltonians are in general non-diagonal in the computational basis, would yield theoretically optimal policies that use non-Clifford operations. By changing the reward structure, the methodology can be further optimized not just for shortest sequence of gates from some given gateset, but also to preferentially utilize quantum resources over classical ones. Moreover, the choice of observation space and policy architecture can be modified for more general problems (e.g. as may arise in quantum chemistry). For example, it may be useful or even necessary for the observation to include measurements with respect to several bases; and the policy in such cases should be modified accordingly.

In the example shown in FIG. 2, the host system 210 acts as the agent and the neural network 212 acts as the policy. At 220, the host system 210 performs an action (applies gates to the quantum circuit) according to its policy (the neural network 212). For example, the host 210 may receive neural network output data from the neural network 212, which may include an identification of a particular quantum logic gate that has been selected, or a distribution of values that the host 210 can use to select a particular quantum logic gate. The selected quantum logic gate can then be appended to an existing quantum logic circuit.

At 224, the host system 210 provides the current version of the quantum logic circuit to the quantum resource 214 to be executed. At 226, the host system 210 receives quantum processor output data from the quantum resource 214 based on the quantum resource's execution of the current version of the quantum logic circuit. The host system 210 may compute the reward (expectation value of the Hamiltonian of interest) and state (state probabilities and graph of interest) based on the quantum processor output data. At 222, the host system uses the state and the reward to update the parameters of the neural network 212, to define inputs to the neural network 212, or both.

The example operations (220, 224, 226, 222) shown in FIG. 2 may be iterated until a terminating condition is reached. For example, the deep reinforcement learning process may be configured to iterate until the performance of the agent ceases to improve (according to the "solved" criterion), until the quantum program reaches a certain length, until a certain number of iterations have been performed, etc. In some examples, the agent is given no information regarding quantum computing or quantum gates, and the agent learns a sequence of gates strictly through experience.

The example resources and operations shown in FIG. 2 can be used to solve a variety of optimization problem types. In some cases, the resources and operations shown in FIG. 2 can be applied to a variety of combinatorial optimization problems (COPs), for example, those that are reducible to Maximum Cut ("MaxCut"), including any of the twenty-one example COPs, known as "Karp's 21 problems," which are described in the publication entitled "Reducibility among Combinatorial Problems" (by Richard M. Karp, in *Complexity of Computer Computations*, edited by R. E. Miller and J. W. Thatcher (New York: Plenum, 1972) pp. 85-103): (1) the satisfiability problem, (2) the 0-1 integer programming problem, (3) the clique problem, (4) the set packing problem, (5) the node cover problem, (6) the set covering problem, (7) the feedback node set problem, (8) the feedback arc set problem, (9) the directed Hamilton circuit problem, (10) the undirected Hamilton circuit problem, (11) the satisfiability with at most 3 literals per clause problem, (12) the chromatic number problem, (13) the clique cover problem, (14) the exact cover problem, (15) the hitting set problem, (16) the Steiner tree problem, (17) the three-dimensional matching problem, (18) the knapsack problem, (19) the job sequencing problem, (20) the partition problem, and (21) the Maximum Cut problem. The example resources and operations shown in FIG. 2 may also be useful for solving other types of optimization problems, such as, for example, optimization problems in quantum chemistry (e.g., finding the ground state energy of a molecule).

The MaxCut COP is an example of an optimization problem for which quantum programs can be synthesized using the techniques and systems described here. In the MaxCut COP, the vertices of a graph are partitioned into two sets, such that the sum over the weighted edges connecting the two partition is maximal. The MaxCut corresponds to the bitstring that maximizes the value of the following Hamiltonian:

$$H_{MaxCut} = \sum_{i,j \in E} w_{ij}(I - Z_i Z_j)$$

Applying a deep reinforcement learning framework to produce a quantum program that solves the MaxCut problem on a quantum computer, the desired Hamiltonian, and a set of quantum logic gates from which the agent can choose are specified.

Figure 3:
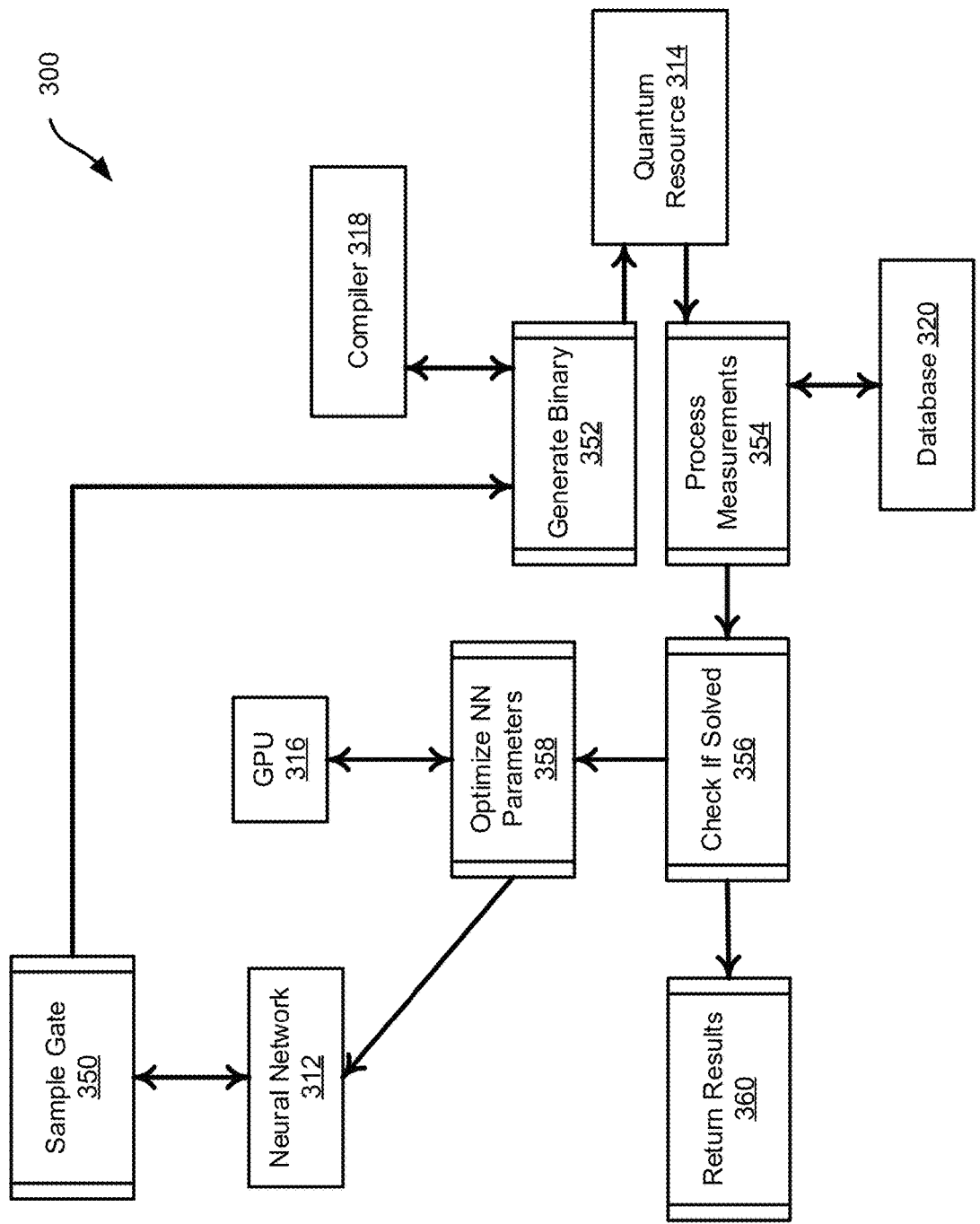
FIG. 3 is a flow diagram of an example training process for synthesizing quantum logic circuits.

FIG. 3 is a flow diagram of an example process 300 for synthesizing quantum logic circuits. The example process 300 includes example operations (represented by the boxes with sidebars in FIG. 3) that are executed by a computer system (e.g., a CPU or another type of computer resource) acting as an agent in a deep reinforcement learning process. As shown in FIG. 3, in executing the process 300, the agent interacts with a neural network 312, a quantum resource 314, a graphics processing unit (GPU) 316, a compiler 318, and a database 320. The agent may interact with additional or different systems or components, and may perform additional or different operations in some instances.

The example process 300 in FIG. 3 can be used to train the agent. In the training process, the agent is allowed to choose from a finite set of discrete quantum logic gates, and the process 300 is run for many different graphs, each sampled from a large training dataset of random graphs. Each graph represents a specific optimization problem to be solved by a quantum program. Running this process for many graph types will typically help with generalizability to arbitrary unseen graphs.

At a high level, on each iteration, the agent selects a quantum logic gate from the set of allowable quantum logic gates and appends this quantum logic gate to the end of the current program (which specifies a quantum logic circuit). The set of allowable quantum logic gates may include any combination of parametric gates, non-parametric gates, single-qubit gates, two-qubit gates, etc. The selection of the quantum logic gate on each iteration is determined by the agent's policy, which is given by the classical neural network 312. In some examples, this selection is initially uniform over the gate set (e.g., in the initial iteration); other initialization conditions may be used. Through the training process, the parameters of the neural network 312 are updated such that this selection becomes increasingly strategic.

At 350, the agent samples the neural network 312 to select a quantum logic gate. To sample the neural network, the agent operates the neural network, for example, on a classical computing resource. In some examples, the agent provides neural network input data to the neural network, the neural network then processes the neural network input data to produce neural network output data, and the agent receives the neural network output data.

In the example shown in FIG. 3, the neural network input data include the "state" and "reward" information shown in Table 1. For example, the neural network input data may include state probabilities or other quantum state information. The quantum state information represents the quantum state produced by a current version of the quantum program that is being synthesized by the process 300. The quantum state can be represented, for example, by state probabilities (e.g., an empirical probability distribution), a statistical characterization (mean, variance, high order moments, etc.), or other parameters. In some cases, on the initial iteration of the process 300, the initial version of the quantum program is the identity circuit, and the quantum state information provided to the neural network corresponds to the identity state. Other initialization conditions may be used.

The neural network input data may also include a representation of the problem to be solved by the quantum program. In some implementations, the problem to be solved is represented by an adjacency matrix or another type of data structure. The adjacency matrix corresponds to a specific optimization problem, for example, the graph representation of a specific MaxCut problem or another combinatorial optimization problem, or the geometry (e.g., connectivity and bond lengths) of a molecule or another quantum chemistry optimization problem.

The neural network input data may also include the reward computed based on the current version of the quantum program that is being synthesized by the process 300. For example, the reward can be a Hamiltonian expectation value or another type of cost function value.

In the example shown in FIG. 3, the neural network output data includes a set of values associated with the set of allowable quantum logic gates. The set of values may be viewed as a probability distribution, where the value associated with each quantum logic gate represents a probability that (or a prediction of the degree to which) the quantum program will be improved by appending that quantum logic gate to the quantum program. In some implementations, the agent uses the set of values to select one of the allowable quantum logic gates. For example, the agent may identify the maximum value (representing the maximum probability of improving the quantum program) and choose the quantum logic gate associated with the maximum value. Or the agent may introduce randomness by sampling the probability distribution stochastically, such that gates associated with higher values are chosen with higher probability.

After the agent has selected a quantum logic gate at 350, the agent updates the quantum program to include the selected quantum logic gate. For example, the quantum program may be represented as a quantum logic circuit that includes a series of quantum logic gates, and the selected quantum logic gate can be appended to the end of the series. The selected quantum logic gate may be added to the quantum program in another manner in some cases. In some instances, appending the selected quantum logic gate to the series improves the quantum program, for example, causing the quantum program to produce a higher value of the "reward" (e.g., as shown in Table 1) defined by the problem to be solved by the quantum program.

At 352, the agent compiles the current version of the quantum program. In some examples, the un-compiled quantum program includes instructions expressed in quantum machine instruction language (e.g., Quil), or instructions expressed in another language (e.g., pyQuil) that generates quantum machine instructions. In the example shown in FIG. 3, the compiled quantum program includes instructions expressed as binary machine code. The compiled quantum program may include instructions expressed in another format.

The agent then provides the compiled quantum program to the quantum resource 314, which then executes the compiled current version of the quantum program. In some cases, the quantum resource 314 is a quantum processor unit (QPU) or a quantum virtual machine (QVM). In some cases, the quantum resource 314 is a set of multiple QPUs or QVMs that run multiple instances of the quantum program (e.g., in parallel).

In some cases, the quantum resource 314 may execute the quantum program many times (e.g., hundreds, thousands, millions of times) to obtain quantum state information representing the quantum state produced by the quantum program. For example, the number of iterations may be based on the number of measurements needed to obtain a statistically meaningful representation of the quantum state.

At 354, the agent receives and processes quantum processor output data from the quantum resource 314. In the example shown, the agent receives measurements generated by the quantum resource 314 executing the current version of the quantum program, and computes "state" and "reward" information (e.g., according to Table 1 or otherwise) from the measurements. The reward information can be computed by evaluating a cost function (e.g., a cost function based on the Hamiltonian specified by the problem to be solved). For example, the agent may compute the empirical probability distribution in order to update the state; and the agent may evaluate the empirical expectation value of the MaxCut Hamiltonian. In some cases, the reward value can be computed faster, for example, by looking up the bitstring to precomputed reward values in the database 320.

At 356, the agent checks if the reward satisfies the "solved" criteria (e.g., as specified in Table 1 or otherwise). For example, the agent may check to see if the reward value is greater than a threshold (for a maximization problem) or less than a threshold (for a minimization problem). As an example, the agent may check to see if the Hamiltonian expectation value is exactly one, which occurs when the quantum program gives the optimal bitstring with 100% certainty (e.g., each bitstring sampled is the MaxCut). Other, less onerous conditions may be used. If the reward does satisfy the "solved" criteria at 356, then the agent returns the results at 360. The results returned by the agent may include the version of the quantum program produced by the final iteration of the process 300.

If the reward does not satisfy the "solved" criteria at 356, then at 358, the agent modifies the parameters of the neural network 312. The neural network is updated based on the "state" and "reward" data computed from the quantum processor output data at 354. Various techniques may be used to update the neural network 312. In some cases, the neural network 312 is updated according to a deep reinforced learning (DRL) algorithm used by the process 300. Examples of DRL algorithms include A2C, A3C ACER, ACKTR, DDPG, DQN, GAIL, HER, PPO, SAC, TRPO and others.

In some examples, the PPO algorithm described in "Proximal Policy Optimization Algorithms" (by J. Schulman, et al., arXiv:1707.06347v2 [cs.LG] 28 Aug. 2017) is used to update the neural network 312. Using the PPO algorithm in the process 300, an input vector (state, reward) that includes the "state" and "reward" data from the last n steps (where n is an integer greater than or equal to 1) is provided as input for updating the neural network 312. The input vector can be of length one (i.e., n=1), specifying the most recent (state, reward) pair, or it can be longer (n>1) and include a "memory" over the last several (state, reward) pairs. The input vector is used to compute a loss function, and derivatives of the loss function are taken with respect to each parameter of the neural network. The derivatives are used to update the parameters of the neural network, for example, according to an optimization technique such as stochastic gradient descent or otherwise.

In many cases, one or more GPUs are used to update the neural network. In the example shown in FIG. 3, the GPU 316 is used to compute updated parameters for the neural network, and the agent updates the neural network 312 based on the new parameters computed by the GPU 316. GPUs often provide greater computational speed and efficiency in the context of updating a neural network. For example, GPUs may be useful because the update process typically involves many computationally expensive operations, such as pushing significant amounts of data through the neural network and computing many derivatives. In addition, some existing software packages for updating neural networks (TensorFlow, pytorch, etc.) have been optimized to run on GPUs.

After the parameters of the neural network 312 have been modified, the agent executes another iteration of the process 300. For example, each iteration of the iterative process may include: operating the updated neural network to produce neural network output data for the iteration based on the current "state" and "reward" information (at 350); selecting a quantum logic gate for the iteration based on the neural network output data (at 350); generating an updated version of the quantum program that includes the selected quantum logic gate for the iteration (at 350); compiling the quantum program for the iteration (at 352); generating quantum processor output data for the iteration by executing the quantum program; computing quantum state information and reward information for the iteration based on the quantum processor output data (at 354); and updating the neural network (at 358) if the "solved" criteria are not met. As such, in each iteration, a new version of the quantum program is generated based on the updated neural network, and the quantum resource 314 executes the new version of the quantum program.

Figure 4:
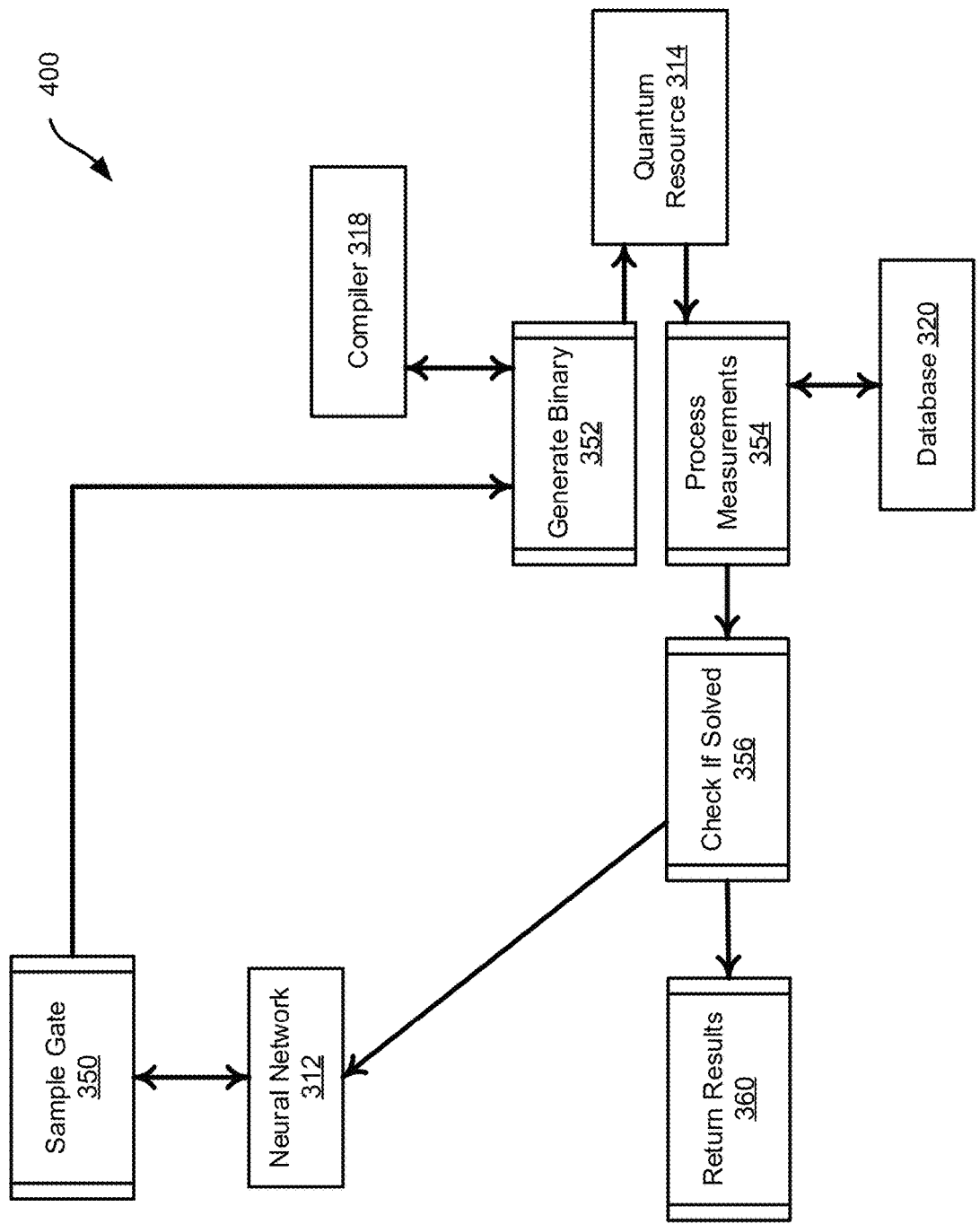
FIG. 4 is a flow diagram of an example sampling process for synthesizing quantum logic circuits.

FIG. 4 is a flow diagram of another example process 400 for synthesizing quantum logic circuits. The example process 400 in FIG. 4 is similar to the example process 300 in FIG. 3, except that operation 358 is omitted and therefore the neural network 312 is not trained (or otherwise modified) by the process 400. Accordingly, the process 400 in FIG. 4 can be used to sample the neural network 312 after the neural network 312 has been trained (e.g., by the process 300 in FIG. 3 or otherwise). As shown in FIG. 4, if the reward does not satisfy the "solved" criteria at 356, then the agent provides the "state" and "reward" information to the neural network 312 for the next iteration of the process 400.

Figure 5:
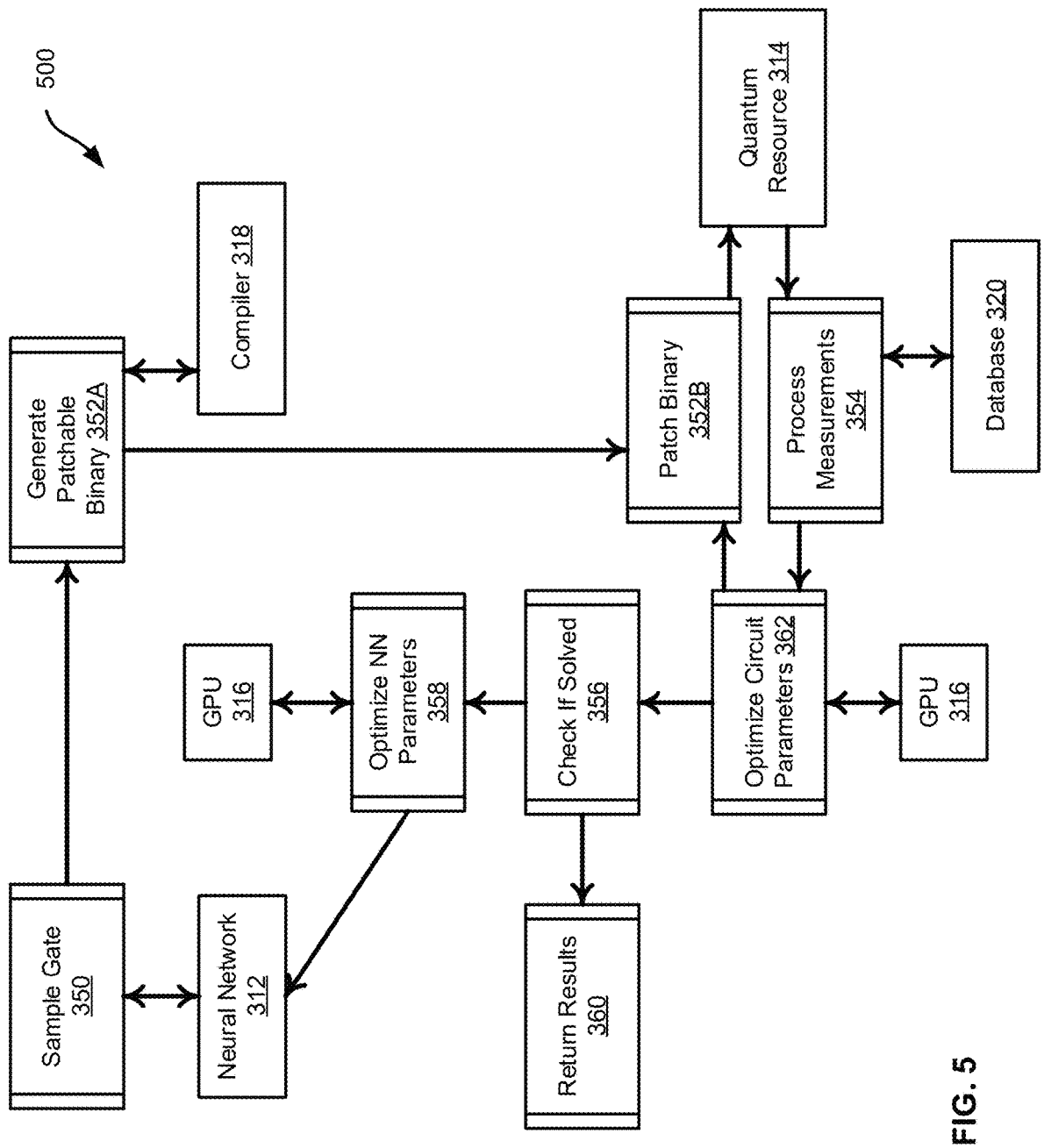
FIG. 5 is a flow diagram of another example training process for synthesizing quantum logic circuits.

FIG. 5 is a flow diagram of another example process 500 for synthesizing quantum logic circuits. The example process 500 in FIG. 5 is similar to the example process 300 in FIG. 3, except that the operation 352 (in FIG. 3) is divided into two operations 352A, 352B (in FIG. 5) and an additional operation 362 is included to allow the agent to use parametric quantum logic gates. Accordingly, the process 500 in FIG. 5 can be used to train the neural network 312 in cases where the set of allowed quantum logic gates includes parametric gates.

In the example shown in FIG. 5, at 350 the agent can choose from a set of quantum logic gates that includes one or more parametric gates. The parametric gates are quantum logic gates that are defined in terms of a variable parameter. For instance, a rotation gate $R_x(\theta)$ rotates a qubit about the x-axis by an angle $\theta$, which is a variable parameter of the gate. As another example, a controlled-rotation gate rotates a target qubit conditionally on the state of a control qubit about an axis by an angle $\theta$, which is a variable parameter of the gate. As such, the updated version of the quantum program may be generated at 350 with a variable parameter (e.g., a variable rotation angle or another type of variable parameter).

At 352A, the quantum program with unspecified values for one or more variable parameters is compiled by the compiler 318. In the example shown, the compiler 318 generates a patchable binary machine code, which is an example of a compiled quantum program in which definite values of the variable parameters have not yet been specified. At 352B, definite values of the variable parameters are selected, and the patchable binary machine code is patched to generate the full, compiled quantum program.

At 362, the agent optimizes the variable parameters in the quantum program. For example, the agent may use the GPU 316 to determine an updated value for one or more variable parameters to improve performance of the quantum program. In some cases, the agent iterates an optimization loop (352B, 354, 362) to modify the value of the variable parameter until a terminating condition is reached (e.g., threshold number of iterations has been reached, and incremental improvement between iterations is below a threshold, or otherwise). On each iteration of the internal optimization loop, the patchable binary machine code (from 352A) is patched based on new values for the variable parameters (from 362) to generate a new compiled version of the quantum program. The agent then obtains (at 354) additional quantum processor output data generated by the quantum resource 314 executing the new compiled version of a quantum program, and the agent the selects (at 362) new values for the variable parameters based on the additional quantum processor output data.

Figure 6:
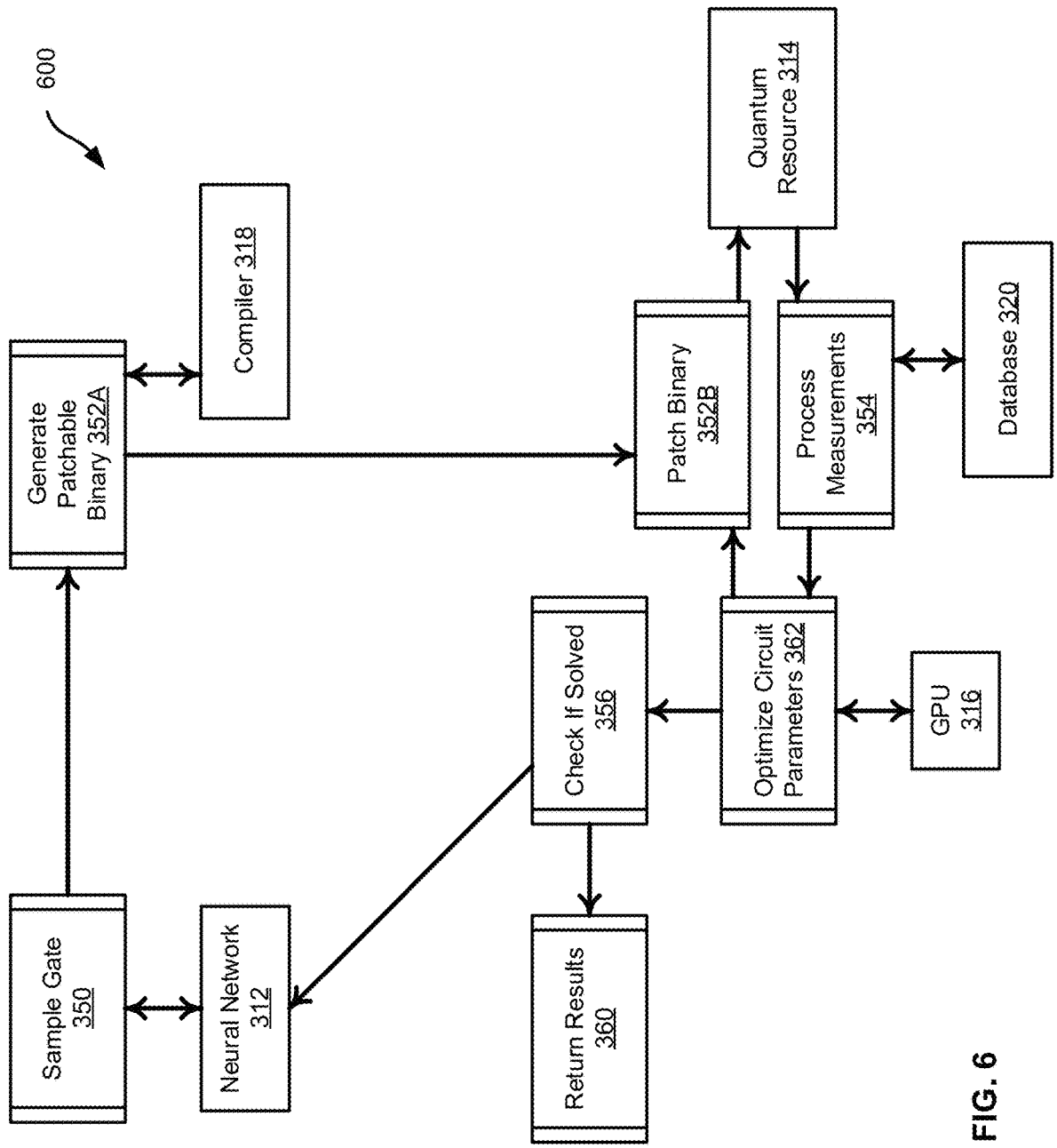
FIG. 6 is a flow diagram of another example sampling process for synthesizing quantum logic circuits.

FIG. 6 is a flow diagram of another example process 600 for synthesizing quantum logic circuits. The example process 600 in FIG. 6 is similar to the example process 500 in FIG. 5, except that operation 358 is omitted and therefore the neural network 312 is not trained (or otherwise modified) by the process 600. Accordingly, the process 600 in FIG. 6 can be used to sample the neural network 312 after the neural network 312 has been trained (e.g., by the process 500 in FIG. 5 or otherwise). As shown in FIG. 6, if the reward does not satisfy the "solved" criteria at 356, then the agent provides the "state" and "reward" information to the neural network 312 for the next iteration or the process. Also shown in FIG. 6, the internal optimization loop (362, 352B, 354) is preserved so that the parameters of parametric gates can be optimized upon each iteration, as in the example process 500.

Figure 7:
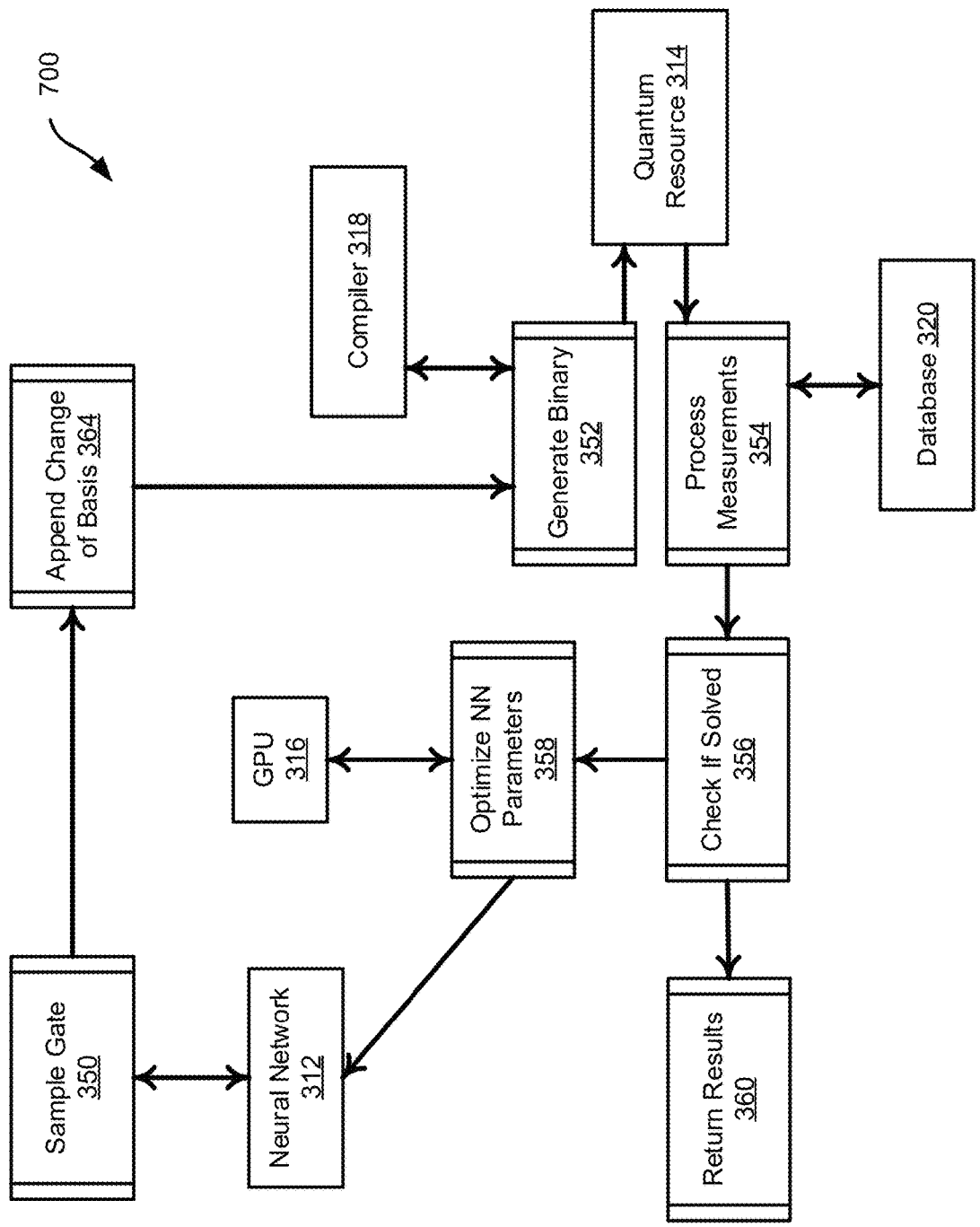
FIG. 7 is a flow diagram of another example training process for synthesizing quantum logic circuits.

FIG. 7 is a flow diagram of another example process 700 for synthesizing quantum logic circuits. The example process 700 in FIG. 7 is similar to the example process 300 in FIG. 3, except that an additional operation 364 is included to allow the agent to solve problems expressed in an arbitrary basis. Accordingly, the process 700 in FIG. 7 can be used to train the neural network 312 for problems where the relevant Hamiltonian is not diagonal in the computational basis of the quantum resource 314.

Typically, the MaxCut Hamiltonian can be represented as a diagonal operator in a computational basis, and therefore, the change of basis operator would not typically be necessary for quantum programs synthesized to solve the MaxCut problem. However, the change of basis operator may be needed in certain quantum chemistry applications, or other optimization problems that cannot conveniently be expressed as a diagonal operator in the computational basis.

As shown in FIG. 7, at 364, a change of basis operation is appended to the updated version of the quantum program in each iteration. The change of basis operation is determined by the Hamiltonian associated with the problem that the quantum program is being synthesized to solve, and therefore, the same change of basis operation can be appended to the quantum program in each iteration for the same problem. When a new problem is defined, the change of basis operation can be updated accordingly.

FIG. 8 is a diagram showing hardware elements in an example computing system 800. The example computing system 800 includes two QPU systems 810, a high-speed interconnect 812, and two control racks 814. Each control rack 814 includes a hybrid blade 816 and several classical blades 818. The computing system 800 may include additional or different features and components, and they may be configures as shown or in another manner.

The example computing system 800 in FIG. 8 shows example hardware components that may be used to implement the computing system 200 in FIG. 2. For example, the QPU systems 810 in FIG. 8 may be used as the quantum resource 214 in FIG. 2, and the control racks 814 in FIG. 8 may be used to implement the host system 210 and the neural network 212 in FIG. 2. The hardware elements shown in FIG. 8 can be used, in some instances, to execute various operations of a quantum program synthesis process in parallel.

Accordingly, the example computing system 800 in FIG. 8 may be used to perform one or more operations represented in the example processes 300, 400, 500, 600, 700 shown in FIGS. 3, 4, 5, 6, and 7. For example, the hybrid blade 816 (e.g., the CPU included in the hybrid blade 816) may perform the operations of the agent shown in FIGS. 3, 4, 5, 6, and 7. In addition, the hybrid blade 816 (e.g., the CPU included in the hybrid blade 816) may perform the operations of the compiler 318 and the neural network 312 in FIGS. 3, 4, 5, 6, and 7; the GPUs included in the hybrid blade 816 may perform the operations of the GPU 316 shown in FIGS. 3, 4, 5, 6, and 7; and the memory (RAM) included in the hybrid blade 816 may perform the operations of the database 320 shown in FIGS. 3, 4, 5, 6, and 7. In addition, the QPU systems 810 may perform operations of the quantum resource 314 shown in FIGS. 3, 4, 5, 6, and 7; and/or the classical blades 818 (e.g., operating as one or more QVMs) may perform operations of the quantum resource 314 shown in FIGS. 3, 4, 5, 6, and 7.

The example QPU systems 810 each include dual 32-qubit quantum processor units (QPUs). A dual 32-qubit QPU includes two independently operated QPUs in the same controlled environment (e.g., on the same chip, in the same cryostat, or in another type of shared environment). The two independently operated QPUs can be operated independently of each other, for example, to execute two instances of a quantum program in parallel.

Each of the QPU systems 810 is controlled by a hybrid blade 816 in a respective control rack 814. In particular, each hybrid blade 816 includes a high-band QPU link that communicates with the associated QPU system 810 through the high-speed interconnect 812. Each hybrid blade 810 also includes one or more CPUs (in the example shown, 4× Intel Platinum CPU [112/223 core/thread]), memory (in the example shown, 6144 GIB ECC RAM), and one or more GPUs (in the example shown, 4× NVidia T1 GPGPUs).

The classical blades 818 may be used to perform one or more operations of the agent in a training or sampling process in some instances. Additionally or alternatively, the classical blades 818 may be operated as one or more QVMs to perform operations of the quantum resource in a training or sampling process in some instances.

In some aspects of operation, the hybrid blade 816 picks a quantum logic gate from a set of allowable gates and appends the quantum logic gate to the end of the current program (e.g., operation 350 in FIGS. 3, 4, 5, 6, 7). The hybrid blade 816 may then compile the current program, for example, into binary machine code (e.g., operation 352 in FIGS. 3, 4, 7) or into patchable binary machine code (e.g., operation 352A in FIGS. 5, 6) and then patch the patchable binary machine code (e.g., operation 352B in FIGS. 5, 6). The hybrid blade 816 may then dispatch the compiled program to multiple QPUs, collect the quantum processor output data from the QPUs, and process the QPU measurements (e.g., operation 354 in FIGS. 3, 4, 5, 6, 7). In some cases, the hybrid blade 816 may dispatch the compiled program to QVMs provided by the classical blades 818, collect the quantum processor output data from the QVMs, and process the data (e.g., operation 354 in FIGS. 3, 4, 5, 6, 7). In some cases, the hybrid blade 816 may run a classical optimizer to update variable parameters of parametric gates (e.g., operation 362 in FIGS. 5, 6). The hybrid blade 816 or a classical blade 818 may then check if a reward satisfies the "solved" criteria and, if so, return a result (e.g., operations 356, 360 in FIGS. 3, 4, 5, 6, 7). The GPU of the hybrid blade 816 may be used to compute updated neural network parameters (e.g., operation 358 in FIGS. 3, 4, 5, 6, 7) for a subsequent iteration, for example, if the reward does not satisfy the "solved" criteria.

The two parallel QPU systems 810 and respective control racks 814 may be operated independently, for example, in parallel. For instance, each system may be used to train distinct neural networks in parallel, and the two neural networks may then be combined to form a larger neural network.

Figure 9:
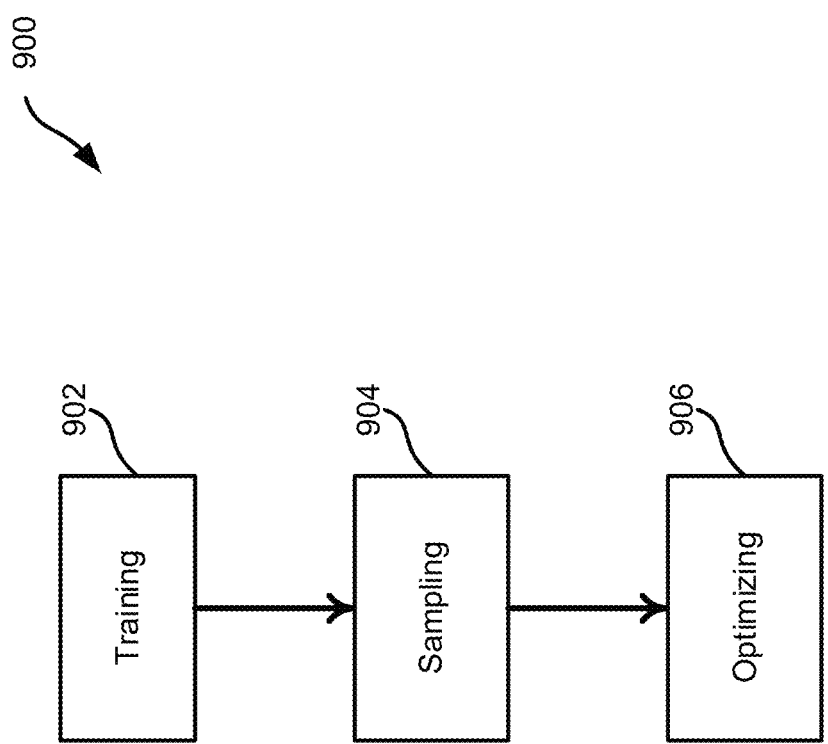
FIG. 9 is a flow diagram of an example process for synthesizing quantum logic circuits.

FIG. 9 is a flow diagram of an example process 900 for synthesizing quantum logic circuits. The example process 900 can be performed, for example, by the example computing system 200 shown in FIG. 2, the example computing system 800 shown in FIG. 8, or by another type of computing system.

At 902, a neural network is trained for synthesizing quantum programs. For example, the neural network may be trained using the example process 300 shown in FIG. 3, the example process 500 shown in FIG. 5, the example process 700 shown in FIG. 7, or another type of training process. The neural network may be trained based on one or more specific problems selected from a class of optimization problems (e.g., multiple MaxCut graphs may be used to train the neural network).

At 904, the neural network that was trained at 902 is sampled to synthesize a quantum program for a specific problem (e.g., a specific MaxCut graph). For example, the neural network may be sampled using the example process 400 shown in FIG. 4, the example process 600 shown in FIG. 6, or another type of sampling process.

At 906, further optimization may be applied to quantum programs or problem solutions generated at 902, at 904, or both. In some cases, a problem solution generated by the quantum program synthesized at 904 is further optimized. For example, the problem solution or the quantum program may be finely tuned using a cluster of QVMs or another type of quantum resource that has a low noise profile. Additionally or alternatively, the same type of fine tuning may be applied to problem solutions or quantum programs generated during the training process at 902.

In some cases, a "last mile optimization" applied at 906 may be useful, for example, in a computing environment where the low-noise quantum resources have a higher computational cost (e.g., longer processing time), and therefore, the low-noise quantum resources are deployed selectively for fine-tuning. The optimization process at 906 may be applied to improve parameters of the neural network, to improve accuracy of the quantum state information or expectation values (or any other "reward" or "state" information) generated by a quantum program, values of parameters for parametric gates in the quantum program, or other attributes of the quantum programs or problem solutions.

Figure 10:
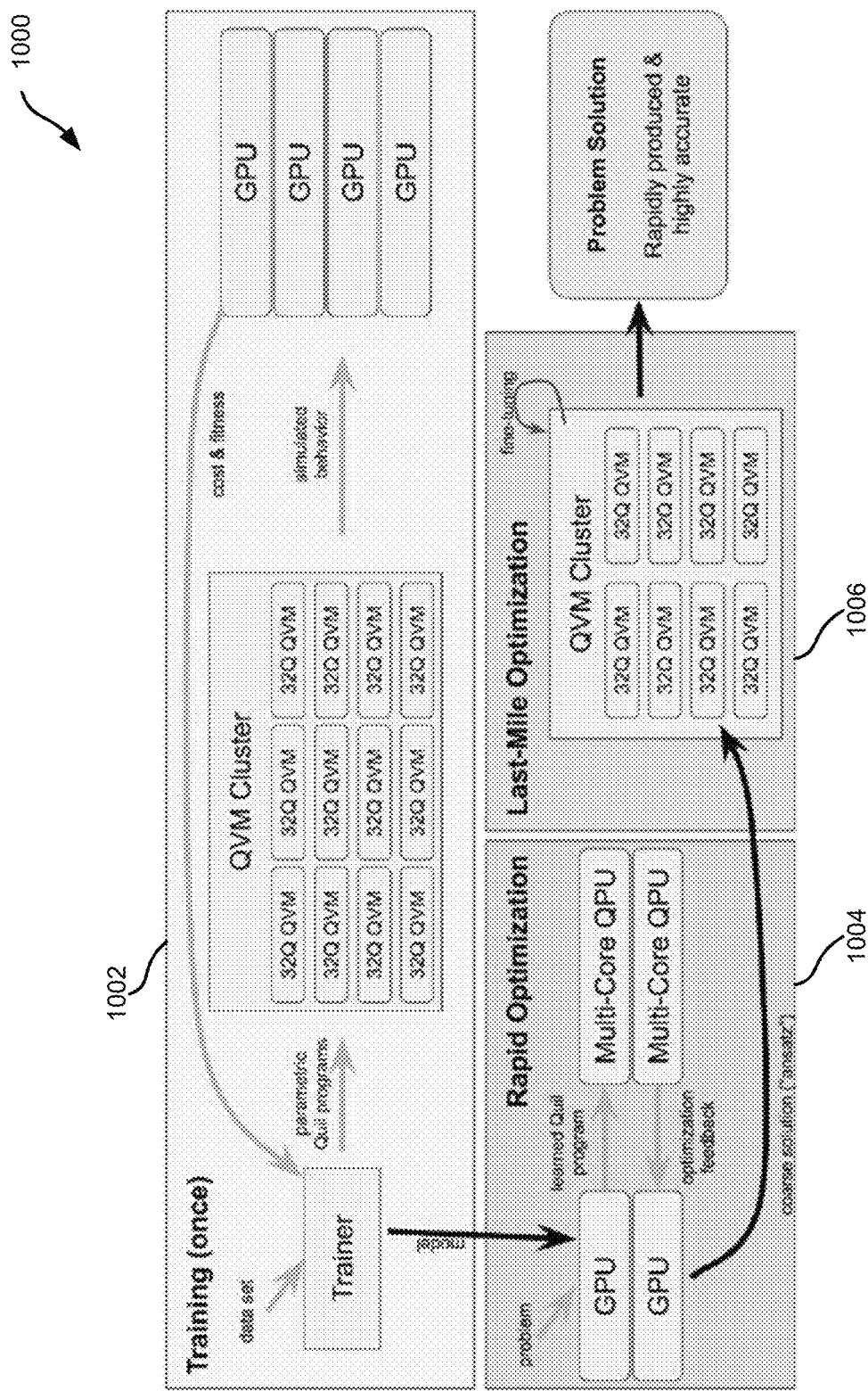
FIG. 10 is a flow diagram of another example process for synthesizing quantum logic circuits.

FIG. 10 is a flow diagram of an example process 1000 for synthesizing quantum logic circuits. The example process 1000 shown in FIG. 10 is an example implementation of the process 900 shown in FIG. 9.

At 1002, the agent uses a training process to train a neural network. The training process is executed based on a data set that includes one or more optimization problems (e.g., one or more MaxCut graphs). In the example shown, a trainer module generates a quantum program (e.g., a Quil program) based on a current version of the neural network, and a QVM cluster (which includes sixteen 32-qubit QVMs) is used as the quantum resource (e.g., as the quantum resource 314 in the processes 300, 500, 700) to simulate the behavior of the quantum program. The simulated behavior of the quantum program is then evaluated (e.g., using the "reward" criterion discussed above) and a set of GPUs are used to generate updated parameters for the neural network. The trainer may then update the neural network based on the updated parameters and generate an updated quantum program based on the updated neural network.

At 1004, the agent uses a rapid optimization process to improve a quantum program for a specific optimization problem. The rapid optimization process can sample one or more neural networks that were trained at 1002. In the example shown, a quantum program is provided as input; a group of GPUs and a group of multi-core QPUs are used to improve the quantum programs by sampling the one or more neural networks iteratively. In the example shown, the improved version of the quantum program produces an initial solution to the specific optimization problem.

At 1006, the agent uses a last-mile optimization process to fine-tune the initial solution. Because the initial solution is generated by QPUs that may be subject to noise, the initial solution may contain errors that can be eliminated by reducing the level of noise. In the example shown, a QVM Cluster (which includes eight 32-qubit QVMs) is used to execute the quantum program in a virtual (noise-free) environment. Therefore, a refined solution to the specific problem may provide an improvement over the initial solution generated at 1004. The last-mile optimization process may provide varying levels of improvement, depending, for example, on the level of noise affecting the quantum resources used at 1004.

In some implementations, a neural network policy or value function can be initialized for a training process (e.g., reinforcement learning implemented using classical, quantum or hybrid computing resources) using a set of exemplars and classically computable values. The initialization process may be deployed, for example, as a quick first step in a reinforcement learning process or another type of training process.

One of the basic challenges in the use of artificial intelligence systems to generate quantum programs is the cost of the training processes—the time cost as well as the cost of utilizing classical and quantum computing resources. In some examples, reinforcement learning agents work by estimating, through experience, either a policy function $\pi$ or a state-action value function Q. Both work with the space O of observations (e.g., measurements of the quantum state as well as a numerical description of the problem instance) and actions $\mathcal{A}$ (e.g., corresponding to specific quantum gates).

Typical policy based algorithms (e.g., "Proximal Policy Optimization" or PPO) seek to find an optimal policy, which is a function $\pi: \mathcal{O} \to \mathcal{A}$ from the observation space to the action space. This policy can be optimized by the algorithm, and then used directly to construct new programs (e.g., a sequence of actions, determined by an intermediate sequence of observations).

Typical value function methods (such as "Deep Q Learning") seek to find a function $Q: \mathcal{O} \times \mathcal{A} \to \mathbb{R}$ which represents, for a given observation and a candidate action, the value of this action. This function Q is estimated directly from experience. The construction of new programs however uses Q indirectly, by considering the associated policy $$\pi_Q(o) = \mathrm{argmax}_a(o, a).$$

In other words, the policy $\pi_Q$ selects the action of the highest value.

In either approach (policy based methods and value function methods), the "truly optimal" choice of $\pi$ or Q is unknown. One instead works with neural network realizations $\pi(\bullet;\theta)$ or $Q(\bullet,\bullet;\theta)$, where $\theta$ is the set of neural network weights. These weights are typically optimized using machine learning or other related techniques. This involves an initial choice $\theta_0$ of weights (e.g. randomly selected weights), a problem-dependent cost or reward function, and a numerical optimization routine such as stochastic gradient descent. The routine involves updating the weights from experience, yielding (hopefully improving) a sequence of weights $\theta_1, \theta_2, \ldots$.

Given the cost of training, starting with a random choice of weights $\theta_0$ can place a heavy burden on the model. Indeed, empirical observation suggests that, at least in some cases, a substantial amount of training time may be used to update the initial choice of $\theta_0$ to some values $\theta_k$ corresponding to a reasonable algorithm.

One approach to alleviating the burden of training is to begin with an initialization process to initialize the policy or value function. The initialization process can be implemented as an initial optimization of the weights $\theta$ based on the behavior of a classical algorithm. In other words, the initial weights $\theta_0$ can be selected so that the corresponding policy x or value function Q corresponds to a known classical algorithm. Then, training may proceed as usual, thus improving upon the classical algorithm (embodied by the initial weights $\theta_0$) with the usage of quantum resources.

Figure 11:
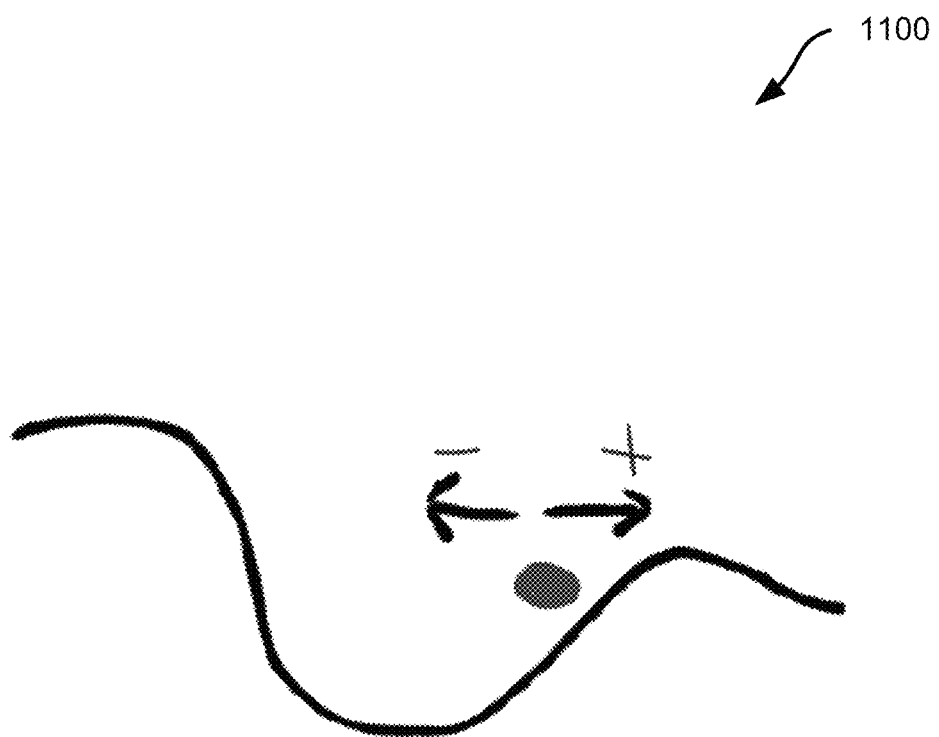
FIG. 11 is a schematic diagram showing an example function that measures an immediate value of an action.

In some cases, the initialization process can compute the initial weights $\theta_0$ using a function. For example, FIG. 11 is a schematic diagram showing an example function 1100 that can be used in an initialization process. For instance, the example function 1100 may be used by a classical computer system to initialize a neural network or another type of policy before a training process that uses a quantum resource. For a training process that utilizes value function methods, the function 1100 used for initialization can be defined as $$Q_{Greedy}(o,a) := \mathbb{E}[r(o,a)],$$

which is the expected one-step reward associated with action a and observation o, relative to a reward function r. Note that this differs from the so-called "episode reward," which involves a sequence of actions over time. The example function $Q_{Greedy}$ is a measurement of the immediate value of an action. In the cartoon version of $Q_{Greedy}$ shown in FIG. 11, the actions are "move left" and "move right", with negative and positive values respectively. As shown in FIG. 11, seemingly greedy moves ("move right" or "move uphill") can position the network weights in what amounts to a local optimum. The cartoon version in FIG. 11 shows only a single weight (along the x axis) for purposes of illustration, but typically there would be orders of magnitude more weights (e.g., hundreds, thousands, millions, etc.).

In some implementations, the example function 1100 or another type of function may be used to initialize the neural network 212 in FIG. 2 before the quantum resource 214 is used to train the neural network 212. Similarly, the example function 1100 or another type of function may be used to initialize the neural network 312 shown in FIGS. 3, 4, 5, 6, 7 before the quantum resource 314 is used to train the neural network 312.

The algorithm that computes actions by optimizing $Q_{Greedy}$ is sometimes known as "local search" or "hill climbing search." Supposing the expected rewards can be computed adequately, one may choose initial neural network weights $\theta_0$ by solving the following optimization problem $$\underset{\Theta}{\text{minimize}} \sum_{i=1}^{m} \sum_{j=1}^{l} |Q(o_i, a_j; \Theta) - Q_{Greedy}(o_i, a_j)|^2,$$

where $\{o_i\}_{i=1}^{m}$ is a set of training observations and $\{a_j\}_{j=1}^{l}$ is a set of training actions.

For a training process that utilizes policy function methods, which seek to find an optimal policy $\pi(\cdot;\theta)$, the function 1100 used for initialization can be defined as $\pi_{Greedy}(o_i)$, which is the policy associated with the greedy value function $Q_{Greedy}$, and $\{o_i\}_{i=1}^{m}$, is a set of training observations. The initial weights $\theta$ may then be initialized by solving the following optimization problem $$\underset{\Theta}{\text{minimize}} \sum_{i=1}^{m} |\pi(o_i; \Theta) - \pi_{Greedy}(o_i)|^2.$$

Accordingly, the initialization process may proceed with the following steps, in some implementations: (1.) Pick a set of quantum observations $\{o_i\}_{i=1}^{m}$ and candidate actions $\{a_j\}_{j=1}^{l}$; (2.) Precompute the values of $Q_{Greedy}(o_i,a_j)$, using either classical or quantum resources; and (3.) Choose $\theta$ by solving the appropriate optimization problem (e.g., either of the two examples above), depending on whether the reinforcement learning algorithm is based on value function estimation or policy optimization. This step may be executed by classical resources, for example, using standard optimization procedures.

As a concrete example, consider the MaxCut problem using Q-learning. Observations o of the form o=(|b⟩,g) can be used, where |b⟩ is a basis state represented by bitstring b, an g is a random graph. Then for quantum gates a, the result of applying a to |b⟩ results in an easily-computed distribution over bitstrings, and hence the right hand side of the equation for $Q_{Greedy}(o,a)$ above may be computed classically. The initial weights $\theta$ are thus fit to a classical "local search" algorithm.

Figure 12:
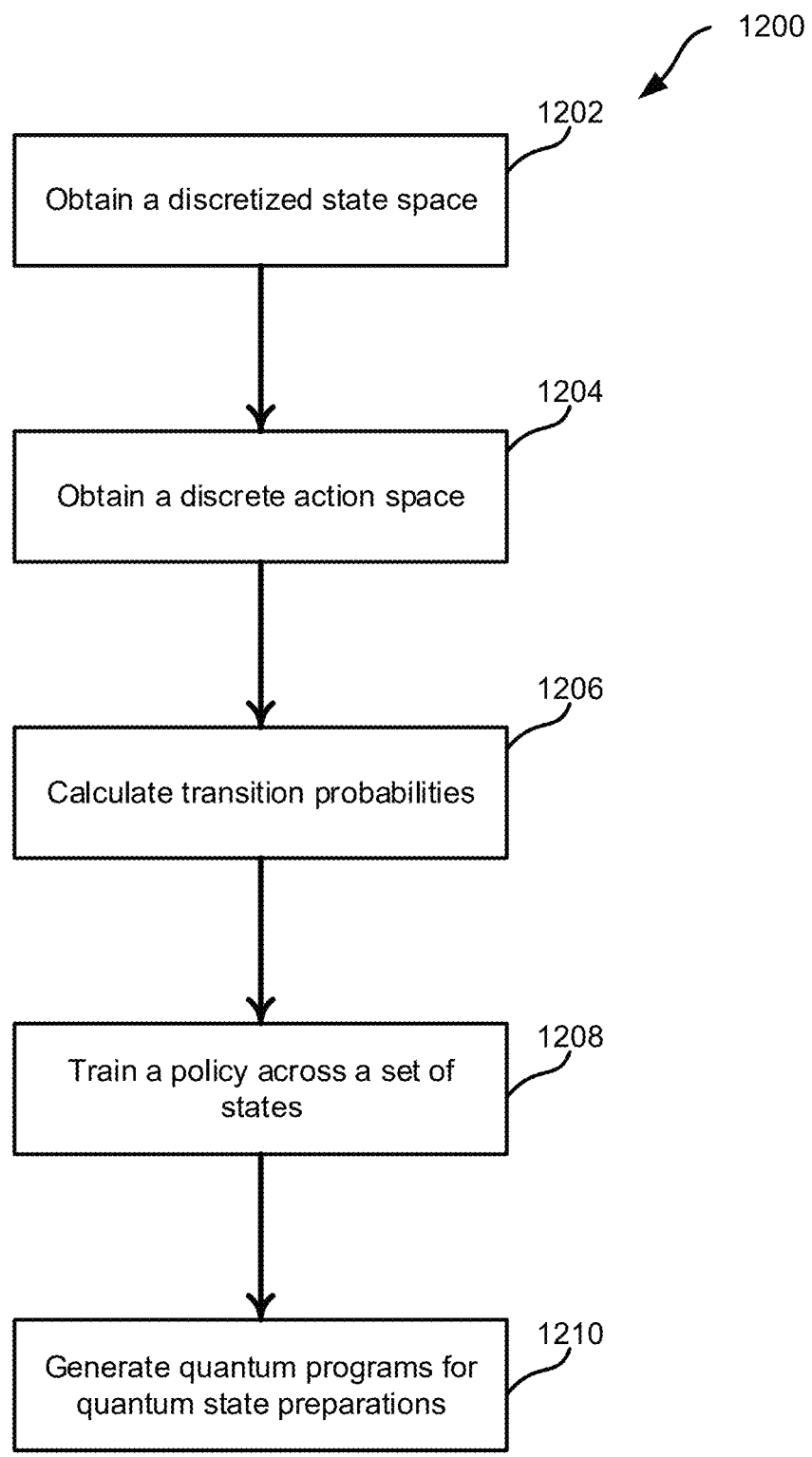
FIG. 12 is a flow diagram of an example process for initializing a neural network.

FIG. 12 is a flow diagram of an example process 1200 for computing a quantum logic circuit for quantum state preparation. In some implementations, the example process 1200 can be combined with the techniques described above or implemented using other techniques. The example process 1200 can be performed, for example, by the example computing system 200 shown in FIG. 2, the example computing system 800 shown in FIG. 8, or by another type of computing system. In some implementations, the example process 1200 can be used for producing a target quantum state from an initial quantum state on one or more qubits of a quantum processor (e.g., the quantum processor cell 102A).

At 1202, a state space is discretized. In some implementations, the state space containing pure single-qubit states has a one-to-one correspondence with points on the Bloch sphere, which can be used for characterizing the state space of pure single-qubit states, e.g., a single-qubit state space. An arbitrary pure single-qubit state can be represented as $$|\psi\rangle = \cos\left(\frac{\theta}{2}\right)|0\rangle + e^{i\phi}\sin\left(\frac{\theta}{2}\right)|1\rangle,$$

wherein $\theta \in [0,\pi]$ is the polar angle and $\phi \in [0,2\pi]$ is the azimuthal angle in the Bloch sphere. Therefore, the state space of pure single-qubit states is a continuous state space, and in order to implement a dynamic programming process (e.g., using Markov Decision Processes as described below at 1208), discretization of the continuous state space is required. In some implementations, the discretization of the state space can be implemented as a discretization of the Bloch sphere such that no two discrete regions overlap, and the entire set of regions cover the entire Bloch sphere, e.g., forming a partition. In some implementations, the discretization of a continuous state space may be performed on a classical computing resource or another resource.

In some implementations, in order to discretize the Bloch sphere, a small number $\epsilon = \pi/k$ is fixed for a positive integer k. In some instances, polar caps around the north ($\theta=0$) and south ($\theta=\pi$) poles in the Bloch sphere can be then identified. The northern polar cap is identified as a subset of all single-qubit (pure) states for which $\theta < \epsilon$ for some fixed $\epsilon$, regardless of the value of $\phi$. Similarly, the southern polar cap is identified as a subset of all single-qubit (pure) states for which $\theta > \pi - \epsilon$, independent of $\phi$. Apart from these special regions, the set of points $n\epsilon \leq \theta \leq (n+1)\epsilon$ and $m\epsilon \leq \phi \leq (m+1)\epsilon$ for positive integers n, m≤k are identified as the same region.

In some implementations, each discretized region on the Bloch sphere is considered as equivalent as a discrete "state" in the dynamic programming process in the example process 1200, e.g., a finite Markov Decision Process (MDP). In some instances, the discretized state space includes a finite number of discrete states for one or more qubits of a quantum process. As a result, pure single-qubit states are mapped onto a discrete set of regions (e.g., a discrete set of states) on the Bloch sphere and each state in the discretized state space (e.g., each region in the discretized Bloch sphere) includes a subset of pure single-qubit states. In certain instances, single-qubit states can be identified up to some threshold fidelity. For instance, the quantum state |0⟩ is identified as the northern polar cap with fidelity $$\cos^2\left(\frac{\pi}{2k}\right).$$

Similarly, the quantum state |1⟩ is identified with the southern polar cap with fidelity $$\sin^2\left(\frac{(k-1)\pi}{2k}\right) = \cos^2\left(\frac{\pi}{2k}\right).$$

In other words, if these quantum states (e.g., the quantum states |0⟩ and |1⟩) are target quatum states to be prepared using the example process 1200, the target quantum states can be obtained up to the respective fidelities. In certain instances, if the target quantum states are another single-qubit state (θ,ϕ) in another discrete state of the Bloch sphere other than the polar caps, a lower bound of the fidelity for obtaining such single-qubit state is given by $$\min_{\theta',\phi'} \left\{ \cos^2\left(\frac{\theta}{2}\right)\cos^2\left(\frac{\theta'}{2}\right) + \sin^2\left(\frac{\theta}{2}\right)\sin^2\left(\frac{\theta'}{2}\right) + \cos(\phi - \phi')\frac{\sin\theta}{2}\frac{\sin\theta'}{2} \right\}.$$

In some implementations, the discretization of the state space can be provided by the recursive zonal equal area algorithm described in the publication entitled, "A partition of the unit sphere into regions of equal area and small diameter," by P. Leopardi (accessible at https://pdfs.semanticscholar.org/e7ac/0a69e5e1f525304580a09511a649b925fe7e.pdf) or in another manner.

At 1204, a discrete action space is obtained. In some implementations, a discrete action space contains a finite number of unitary operations, for example, a discrete set of gates for the one or more qubits of the quantum processor. In some instances, the discrete set of gates includes a finite number of quantum logic gates. For example, the discrete action space can be a single-qubit action space including a finite number of single-qubit unitary operations. In some examples, the discrete action space can be a multi-qubit action space including a finite number of multi-qubit unitary operations. In some instances, the discrete action space includes the Hadamard (H) gate and the T gate. In certain instances, the discrete action space may be obtained by discretizing continuous rotation gates. For example, the continuous rotation gates RZ(β) and RY(γ) can be discretized by discretizing angles β, γ∈ [0,2π]. In some implementations, discretization of the action space may be performed on a classical computing resource or another resource.

The particular details of how the Bloch sphere is discretized at 1202 may inform how to choose the gate set. In some instances, a first resolution of the discretized action space (δ=π/l) may be sufficiently smaller than a second resolution of the discretized state space $\epsilon$ =π/k such that all the states(s) in the discretized state space (e.g., s∈ $\mathcal{S}$) are accessible from all others via the discreet set of gates (a) in the action space (e.g., a∈ $\mathcal{A}$). In some instances, a resolution ratio ($\epsilon$/δ) of about O(10) or another resolution ratio may be used.

At 1206, transition probabilities are calculated. Generally, a unitary operation deterministically evolves a quantum state. In some implementations, the action of a gate a can lead from some state s to more than one state s' in the discretized Bloch sphere, where a single state s in the discretized state space corresponds to a family of pure single-qubit states. This non-determinism of the actions may occur because the discrete states contain entire families of quantum states, which are mapped deterministically to other quantum states under the actions of the quantum gates. However, since different quantum states map to different quantum states under the same action, the same discrete state could map to more than one discrete state under the same action.

In some implementations, the transition probabilities are computed across the discrete set of states under the actions of the discrete set of gates. In terms of the Bellman equation described in the MDP process at 1208, conditional probabilities p(s',r|s,a) are computed, where s' is a next state obtained as a result of taking action a in state s, while r refers to a reward obtained as a result of obtaining state s'. In some implementations, the conditional probabilities capture a specification of environment dynamics and can be computed using a model of environment dynamics for the quantum processor.

In some implementations, the reward is a function of the state and the conditional probabilities reduce to p(s'|s,a). For example, if a target state is found, the reward r=1 and if otherwise, the reward r=0. In some instances, a discount factor between 0 and 1 may be also included to ensures that an optimal policy favors shorter quantum circuits over longer ones. In some instances, the conditional probabilities may be estimated by uniformly sampling points on the Bloch sphere, mapping these to their respective discrete states s as prescribed earlier, and then iterating over all the actions a, identifying a next state s'. The frequency of the occurrences of the state s' resulting from taking an action a in the state s may be used as an estimate for the conditional probability p(s'|s,a).

In some instances, instead of iterating over all the actions a in the discrete action space $\mathcal{A}$, the actions a may be sampled. For example, sampling is performed uniformly across the Bloch sphere, instead of uniformly over the angles θ,ϕ. In certain cases, the family of pure single-qubit states in a discrete state on the discretized Bloch sphere are equally likely to be found within the discrete state. In some examples, the conditional probabilities p(s'|s,a) can be estimated via a Monte Carlo simulation and further used to compute the optimal policy at 1208. In some implementations, the conditional probabilities can be computed on either a classical processor, in which case one is using a classical simulator of a quantum processor, or a quantum processor.

In some implementations, in addition to the non-determinism introduced by the discretization of the Bloch sphere, a non-determinism of an action (e.g., noisy channels describing probabilities of application of gates) on the underlying quantum states themselves may be introduced. For example, the noisy channels may include noise present in the processor or another source of noise. In some instances, this non-determinism may affect the conditional probabilities p(s'|s,a). In some instances, the adjusted conditional probabilities in the presence of such noisy channels may be further used to determine a policy and thus a quantum program to prepare the target state in the presence of noise.

At 1208, a policy is trained across a set of states. In some implementations, a policy can be defined by the discretized state space obtained at 1202 and the discrete action space obtained at 1204 for generating quantum programs for quantum state preparation for the one or more qubits in the quantum process. For example, a policy may designate a unitary operation from the discrete action space that can be taken when in a discrete state in the discretized state space. Dynamic programming can be used to train and improve a policy, for example, to determine an optimal policy, that can maximize certain cumulative function for every state. In some implementations, a dynamic programming process may be implemented using policy iteration, value iteration, and another process. In some instances, the policy is a non-parametric policy. When a policy is derived from a function that depends on a number of continuous parameters, it is referred to as a "parametric policy". Typically, the number of the continuous parameters is smaller than the total number of states in a problem, and is meant to avoid spanning over the entire state space before (approximately)

arriving at an optimal policy. Arxiv 1908.08054v1 provides an example in which a parametric policy can be modeled by a neural network described by several parameters tuned via a training process. When an optimal policy is derived from a function that does not rely on any continuous parameters or when a policy is not modeled by a function that relies on a training process of some continuous parameters, it is referred to as a "non-parametric policy".

In some implementations, Markov Decision Processes (MDPs) providing a convenient framing of problems involving an agent interacting with an environment can be used to compute a policy. Generally, at discrete time steps t, an agent receives a representation of a state $s_t \in \mathcal{S}$ of the environment, takes an action $a_t \in \mathcal{A}$, and then receives a scalar reward $r_{t+1} \in \mathcal{R}$. The policy $\pi(a|s)$ of the agent, describing the conditional probability of taking action a given the state s, is independent of the state at previous time steps and therefore satisfies the Markov property. The discounted return that an agent receives from the environment after time step t is defined as $$G_t = \sum_{k=0}^{\infty} \gamma^k r_{t+k+1}$$

where $\gamma \in [0,1]$ is the discount factor. The goal of the agent is then to find the optimal policy $\pi^*(a|s)$ that maximizes the state-value function (hereinafter "value function"), defined as the expectation value of the discounted return received from starting in state $s_t \in \mathcal{S}$ and thereafter following the policy $\pi(a|s)$, and expressed as $V_\pi(s) = \mathbb{E}_\pi[G_t|S_t=s]$. In some instances, a reward can be used to train the policy to use one or more actions (e.g., unitary operations) in the discrete action space to prepare any one of the states in the discretized state space. In some implementations, the reward can be evaluated based samples from the quantum processor. For example, after identifying an initial state for the one or more qubits, the reward is evaluated by collecting output states from the one or more qubits for each action in the discrete action space and comparing with the target state. For example, a reward may return a value of 1 when the output state is the target state and may return a value of 0, when the output state is different from the target state. In some implementations, the optimal policy $\pi^*$ satisfies the inequality $V_{\pi^*}(s) \geq V_\pi(s)$ for all $s \in \mathcal{S}$ and all policies $\pi$. The value function for the optimal policy is defined as the optimal value function $V^*(s) = V_{\pi^*}(s) = \max_\pi V_\pi(s)$ for all $s \in \mathcal{S}$.

In some implementations, the value function satisfies a recursive relationship known as the Bellman equation, $$V_\pi(s) = \sum_a \pi(a|s) \sum_{s',r} p(s', r|s, a)[r + \gamma V_\pi(s')],$$

which relating the value of the current state to that of the possible successor states following the policy $\pi$. This equation can be turned into an iterative procedure known as iterative policy evaluation, described as:

$$V_{k+1}(s) = \sum_a \pi(a|s) \sum_{s',r} p(s', r|s, a)[r + \gamma V_k(s')],$$

which converges to the fixed point $V_k = V_\pi$ when $k \to \infty$, and can be used to obtain the value function corresponding to the given policy $\pi$. Convergence is defined as $|V_{k+1} - V_k| < \epsilon$ for some sufficiently small $\epsilon$.

In some implementations, after determining the value function using the Bellman equation, a possibility to further improve the policy that produces this value function may be evaluated. A state action value function $Q_\pi(s,a)$, defined as the expected return by carrying out action a in state s and thereafter following the policy $\pi$, can be determined, e.g., $Q_\pi(s,a) = \mathbb{E}_\pi[G_t|S_t=s, A_t=a]$. According to the policy improvement theorem, given deterministic policies $\pi$ and $\pi'$, the inequality $Q_\pi(s, \pi'(s)) \geq V_\pi(s)$ implies $V_{\pi'}(s) \geq V_\pi(s)$ where $\pi'(s) = a$, and in general $\pi'(s) \neq \pi(s)$, for all $s \in \mathcal{S}$. In some instances, after determining a value function corresponding to a policy, improvement upon the policy to determine a better policy than the current one can be iterated through the action space $\mathcal{A}$ while maintaining the next-step value functions ($V_k(s')$).

In some implementations, alternating between policy evaluation and policy improvement in a process known as policy iteration to obtain an optimal policy. Schematically, this process involves evaluating the value function for a policy up to some small convergence factor, followed by the improvement of the policy that produced this value function. The process terminates when the improved policy stops differing from the policy in the previous iteration. Of course, this procedure to identify the optimal policy for an MDP relies on the finiteness of the state and action spaces. By discretizing the space of pure single-qubit states, as well as identifying a finite gate set, the MDP in the example presented here can be used for determining optimal policies in the form of optimal quantum circuits for quantum state preparation.

At 1210, quantum programs for quantum state preparations are generated. In some implementations, the quantum programs are generated using a policy. In some instances, the policy used for generating the quantum programs is the optimal policy determined using the policy iteration process at 1208. The optimal policy computed at 1208 can determine the best choice of action, or quantum gate, to apply in any discrete state of the Bloch sphere. An initial state and a target state can be identified for one or more qubits in a quantum processor. For example, a qubit in a quantum processor may be first initialized to some arbitrary quantum state within a discrete state on the discretized Bloch sphere. A quantum program is used to prepare a qubit from the initial state to the target state (e.g., |1⟩). In some implementations, a quantum program includes one or more unitary operations in the discrete action space, for example, a subset of the discrete set of quantum logic gates or another unitary operation. In some implementations, a quantum program may include multiple instances of the same unitary operation. For example, the same unitary operation or the same set of unitary operations may be repeated within a quantum program.

As described above, the same action, or gate, applied to different quantum states in general leads to different quantum states, and can also lead to different discrete states on the discretized Bloch sphere. In order to account for this, K samples of sequences of optimal actions/gates that lead us from the initial state to the target state may be collected. In some implementations, a program that has the minimum length among the K samples is then determined. Note that each time when State←s is assigned in an algorithm described below, the underlying quantum state is initialized to some arbitrary point within the respective discrete state of the discretized Bloch sphere. Therefore, if K is too large, the minimum may not be for some "typical" quantum state belonging to that discrete state, even though the optimal policy for that state works best on average across all quantum states for that discrete state. In practice, the value of K may be determined using trial and error, and computation time/resource in order to obtain optimal quantum programs with a sufficiently small length.

In some implementations, there may exist certain pathological points within the discrete states that end up in a non-convergent or cyclical path along the optimal policies. In order to account for these, another inner while loop can be included in the algorithm and performed to avoid such non-convergent paths, and terminates the search if the program length it is attempting to find exceeds a predetermined threshold value (e.g., Counter>50 in the example algorithm shown in pseudo code below).

```
Initialize empty dictionary DICT-PROGRAMS
    for s ∈ S do
    Initialize empty list OPTIMAL-PROGRAMS
    for i = 1 to K do
        Converged ← False
        while not Converged
            State ← s
            Prog ← Empty Program list
            Done ← False
            Counter ← 0
            while not Done
                Action ← OPTIMAL-POLICY[State]
                Prog.append(Action)
                Next-State ← Env.Step(Action)
                State ← Next-State
                Counter ← Counter + 1
                if Counter > 50
                    break
            if Done
                Converged ← True
                OPTIMAL-PROGRAMS.append(Prog)
        end for
        Optimal-Prog ← Program with Min length in
            OPTIMAL-PROGRAMS
        DICT-PROGRAMS[s] ← Optimal-Prog
end for
```

In some implementations, this algorithm is used to generate optimal quantum programs for any given (universal) single-qubit gate set in the single-qubit action space for single-qubit state preparation. In the case of discretized RZ and RY gates, the optimal quantum program containing a single RZ rotation followed by a single RY rotation can be used to start from any discrete state on the Bloch sphere to the (discrete)|1⟩ state. For (discrete) states lying along the X-axis, the optimal quantum program containing a single RY rotation can be used. In some implementations, the optimal programs determined via the preceding algorithm for this gate set contain quantum programs with lengths of either 1 or 2.

In some instances, the length of these optimal programs are directly related to the value function corresponding to the optimal policy. For the target state |1⟩, the optimal policy is to just apply the identity, e.g., RZ(0) or RY(0). This action can continue to keep this state in the target state, while yielding+1 reward at every time step.

This yields an infinite series $$V_{\pi^*}(s_{target}) = \sum_{k=0}^{\infty} \gamma^k,$$

which can be trivially summed to obtain $(1-\gamma)^{-1}$. For $\gamma=0.8$, $V_{\pi^*}(s_{target})=5.0$ can be obtained, which is the highest value of any state on the discretized Bloch sphere. Using the Bellman equation for states that are removed by a single non-identity instruction from the target state $s_{one} \in \mathcal{S}$, the value function can be expressed as $$V_{\pi^*}(s_{one}) = p_t(1-\gamma)^{-1} + \sum_{s'} p_{s'} \gamma V_{\pi^*}(s'),$$

where $p_k$ denotes the probability of obtaining state k upon taking the optimal policy $\pi^*(s)$. Since the states s' are non-target states, $$V_{\pi^*}(s') \leq \sum_{k=1}^{\infty} \gamma^k r_{t+k+1} = \gamma/(1-\gamma).$$

Since $p_t + \Sigma_{s'} p_{s'} = 1$, and $0 \leq \gamma \leq 1$, $p_t + \Sigma_{s'} \gamma^2 p_{s'} \leq 1$. From this, it follows that the value function in the expression above is bounded by $V_{\pi^*}(s_{target}) = (1-\gamma)^{-1}$. Thus, the optimal value function for states removed by a single program instruction from the target state has less than the optimal value for the target state. For states that are removed by two program instructions from the target state, $s_{two} \in \mathcal{S}$, $V_{\pi^*}(s_{two}) \leq \gamma \Sigma_{s_{one}} V_{\pi^*}(s_{one})$ can be obtained, and so (for $|\gamma|<1$), has even less of an optimal value than those removed by a single program instruction from the target state. The optimal value function $V_{\pi^*}(s)$ is the value function $V_{\pi}(s)$ for the optimal policy $\pi^*(s)$. The optimal value function $V_{\pi^*}(s)$ is a function of state. The number of gate applications needed to reach a target state is related to the value of $V_{\pi^*}(s)$ in that state. For example, if a target state ($s_T$) is reached, $V_{\pi^*}(s_T)$ takes its maximum possible value. If a first state ($s_{one}$) is reached that is one gate application away from the target state $s_T$, $V_{\pi^*}(s_{one})$ for the first state is less than or equal to $V_{\pi^*}(s_T)$, e.g., $V_{\pi^*}(s_{one}) \leq V_{\pi^*}(s_T)$. Similarly, if a second state ($s_{two}$) that is two gate applications away from the target state $s_T$ is reached, $V_{\pi^*}(s_{two})$ for the second state is less than or equal to $V_{\pi^*}(s_{one})$ for the first state, e.g., $V_{\pi^*}(s_{two}) \leq V_{\pi^*}(s_{one})$. In some instances, N gate applications away from a state means there are N gates applied to a current state in order to reach the state. This intimately relates the length of the optimal program with the optimal value function. For the gate set consisting of discrete RZ and RY gates, the optimal value landscape across the Bloch sphere is shown in FIG. 13A.

Figure 13A:
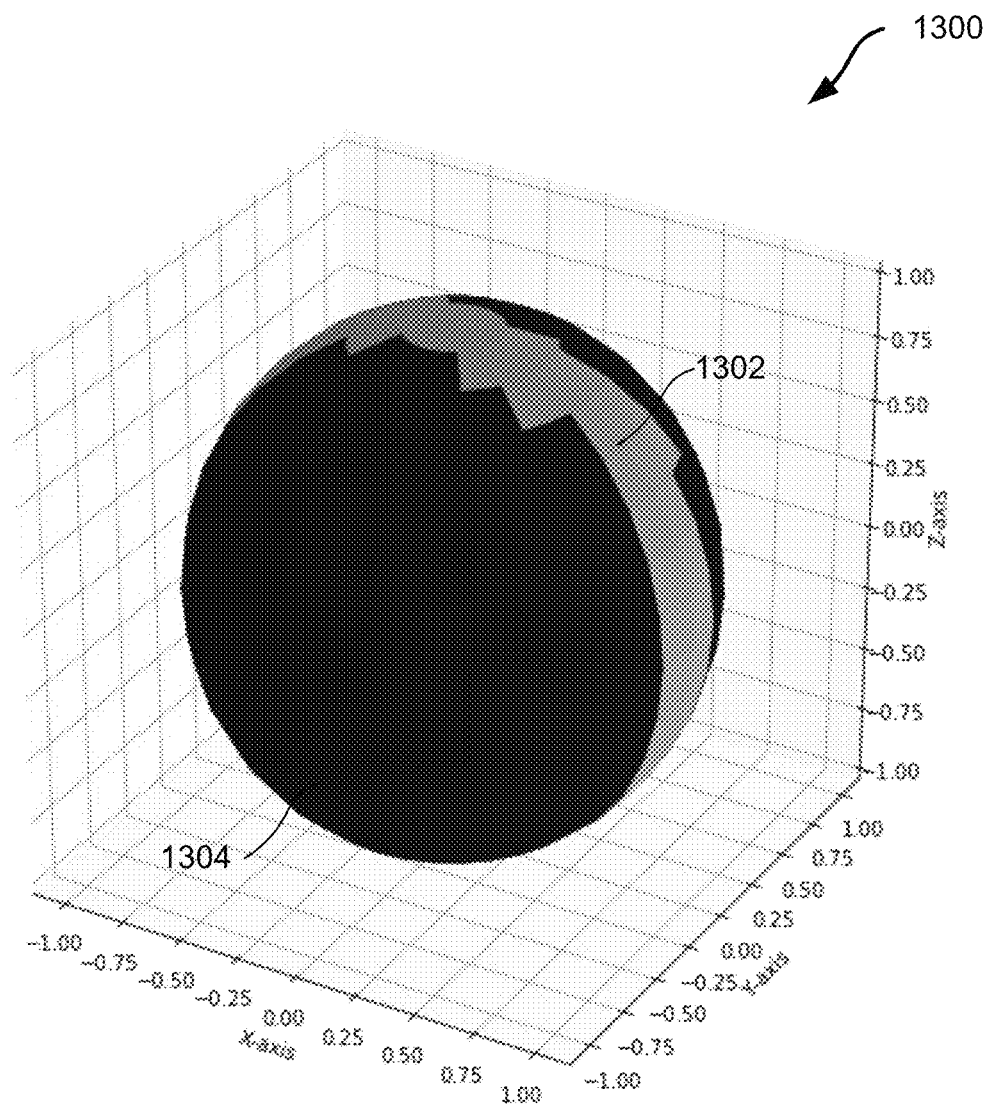
FIG. 13A is diagram showing a landscape of optimal values across the Bloch sphere using discrete RZ and RY gates.

FIG. 13A is diagram 1300 showing a landscape of optimal values across the Bloch sphere using the discrete RZ and RY gates, with a discount factor $\gamma=0.8$. States 1302 colored in light gray on the Bloch sphere are those for which $V_{\pi'} \geq 4.0$, while states 1304 colored in black are those for which $V_{\pi'} < 4.0$. The states 1302 colored in light gray represent the states whose optimal circuits to prepare the discrete |1⟩ state contain a single RY rotation, while the states 1304 colored in black are the states whose optimal circuits contain an RZ rotation followed by an RY rotation.

In some implementations, discrete quantum gates in the discrete action space, e.g., including {I, H, S, T}, may be used for generation of optimal quantum circuits for quantum state preparation. In some instances, the S gate may be removed from the gate set since $T^2=S$. A resolution of the discretized state space is $\epsilon=\pi/16$ or another value.

Using the discrete |1⟩ state as the target state, the pure |1⟩ state can be achieved with $$\cos^2\left(\frac{\pi}{32}\right) \sim 99\%$$

fidelity. For example, an optimal gate sequence HSSH=HZH=X for the discrete state |0⟩ is determined following the example algorithm shown above. Similarly, for the discrete state containing the |+⟩ state, an optimal gate sequence SSH=ZH can be also determined. With this gate set, optimal programs with various lengths can be determined, unlike the case of the discrete RZ and RY gates, where the optimal programs of only lengths 1 or 2 are determined. There is no local region, such as a ring along the X-axis, that is particularly advantageous to start from, e.g., has a relatively smaller optimal program, in order to reach the target state.

Figure 13B:
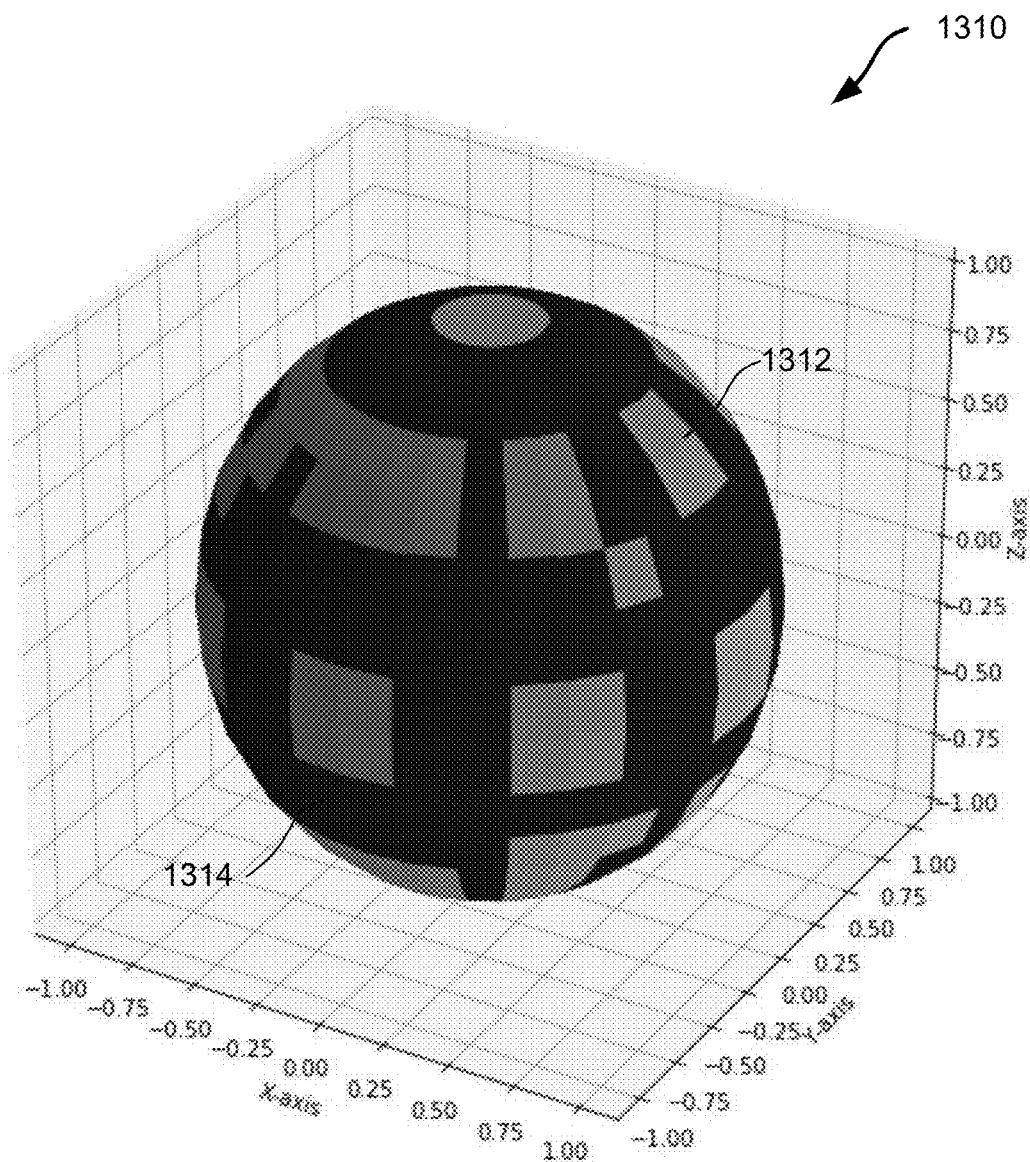
FIG. 13B is diagram showing a landscape of optimal values across the Bloch sphere using discrete gates I, H, S, and T.

FIG. 13B is diagram 1310 showing a landscape of optimal values across the Bloch sphere using the gates I, H, S, and T, with a discount factor γ=0.95. States 1312 colored in light gray are those for which $V_{\pi'} \geq 1.0$, while states 1314 colored in black are those for which $V_{\pi'} < 1.0$. As shown in FIG. 13B, there is no clear region in the Bloch sphere that is especially advantageous to start from in order to reach the target |1⟩ state.

In the example algorithm for optimal program generation discussed above, when the environment carries out a step, as in Env.Step (Action), it non-deterministically evolves the discrete states according to some probabilities p(s'|s,a), which can be estimated using Monte Carlo simulation. However, the underlying quantum state may still evolve deterministically under the action of the quantum gate. The deterministic evolution of the quantum state, but the non-deterministic evolution of the discrete state can be used to produce the optimal programs for the gate set {I, H, S, T}. In some instances, it is necessary for one state (with resolution π/16) to evolve the underlying quantum state non-deterministically. Specifically, once a certain discrete state is obtained upon taking some action, the underlying quantum state within this discrete state can be shuffled before evolving again under a new action. In some implementations, performing this step justifies the state preparation procedure to be more accurately modeled as an MDP, and not a partially observed MDP, but it could lead to quantum circuits including sub-optimal sequences such as two H gates in a row. In some instances, for almost all states, such shuffling may be unnecessary considering the environment steps to be deterministic on the underlying quantum state, but non-deterministic on the discrete state. In certain instances, when considering noise, this assumption can be relaxed.

In some implementations, the S gate in the gate set {I, H, S, T} can be replace with a noisy channel defined by the Kraus operators $K_S=\sqrt{p_S}S$, $K_X=\sqrt{p_X}X$, $K_Y=\sqrt{p_Y}Y$ and $K_Z=\sqrt{p_Z}Z$, where the parameters pc is probabilities of applying the gate G across the noisy channel. A universal gate set can be retained even with just the H and T gates, and the discrete target |1⟩ state can be obtained from any other starting state. In some instances, $p_Y=p_Z=0$, and the optimal policy for the discrete |0⟩ changes as a function of $p_X$. For $p_X=p_Y=p_Z=0$, the H gate is identified as the optimal action to take in state |0⟩, which results in an optimal program/gate sequence (e.g., HSSH) for the state. For non-zero and sufficiently large $p_X$, and $p_Y=p_Z=0$, both the optimal policy and the optimal program for the discrete |0⟩ state are expected to switch instead to the S gate, since the latter is the noisy channel described above with some probability of applying the X operator, resulting more immediately in the target discrete |1⟩ state. This transition in the optimal policy for the |0⟩ occurs quickly, for $p_X \sim 0.1$, in which a discrete resolution of π/16 is used.

Even though the optimal policy for the discrete |0⟩ state may be noisy S, for $p_X \geq 0.1$, it should nevertheless be more advantageous to apply the noisy channel S the higher the value of $p_X$. This qualitative intuition is made more precise and affirmed through the observation that the optimal state value function for the |0⟩ increases as a function of $p_X$ in the scenario where the target state is the discrete |1⟩ state, as depicted in FIG. 13C.

Figure 13C:
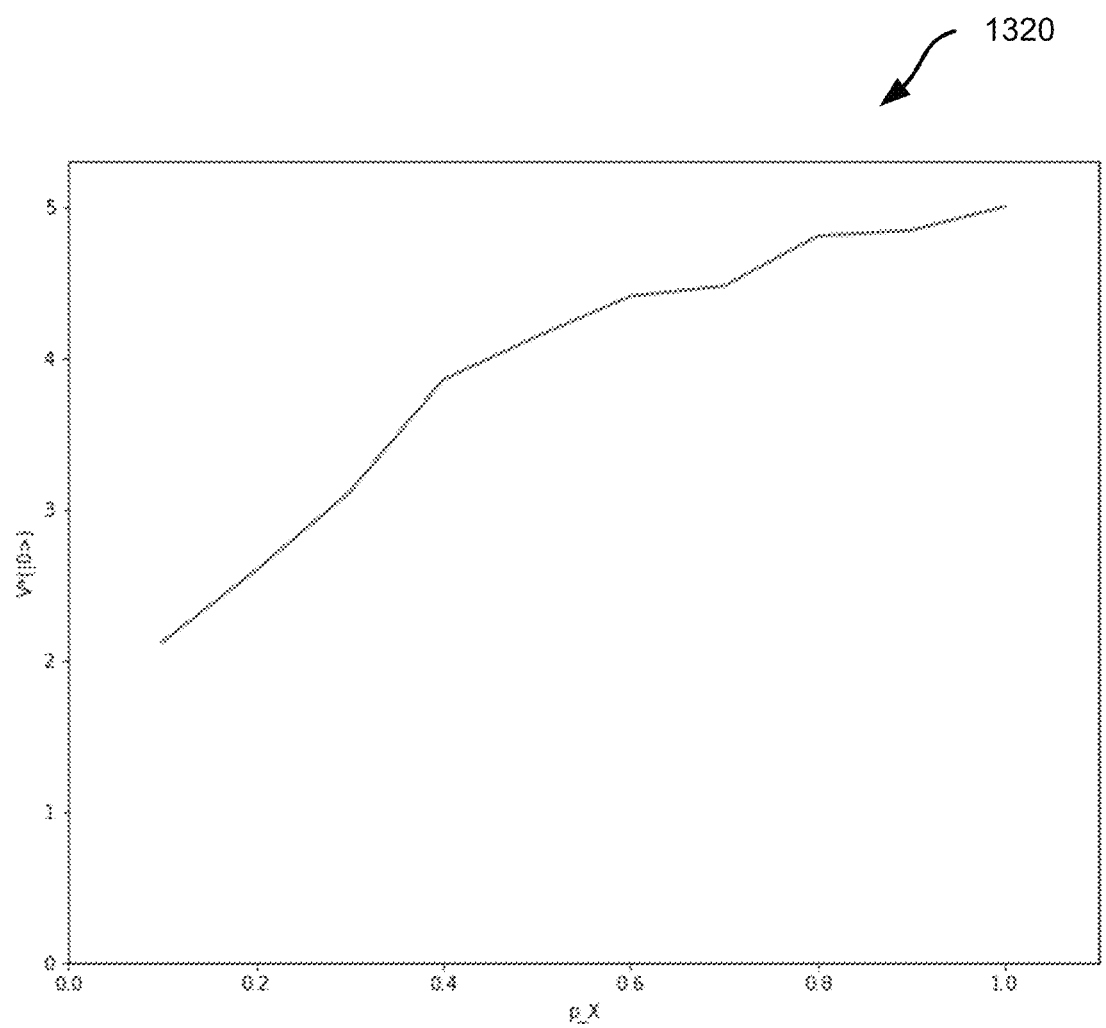
FIG. 13C is a plot showing an optimal state value function for a discrete $|0\rangle$ state as a function of a bit-flip probability $p_x$ in a noisy channel S.

FIG. 13C is a plot 1320 showing an optimal state value function for the discrete |0⟩ state as a function of a bit-flip probability $p_X$ in the noisy channel S, for values of $p_X$ for which the optimal policy of the discrete |0⟩ is the noisy channel S. The target state is the discrete |1⟩ state. As shown in FIG. 13C, the optimal state value function increases with the increasing $p_X$ value suggesting that a likelihood of the noisy channel S acting as a bit-flip operator increases as the optimal state value function of the |0⟩ state increases.

In some implementations, the process 1200 described here can be used to obtain approximations to the states $(HT)^n|0\rangle$ for integers n≥1. The unitary HT can be thought of as a rotation by an angle $$\theta = 2\arccos\left(\frac{\cos(7\pi/8)}{\sqrt{2}}\right)$$

about an axis $$\vec{n} = (n_x, n_y, n_z) = \sqrt{\frac{1}{17}}\left(5 - 2\sqrt{2}, 7 + 4\sqrt{2}, 5 - 2\sqrt{2}\right).$$

The angle θ has the continued fraction representation $$\theta = \pi + \cfrac{\cos\left(\frac{\pi}{8}\right)\sqrt{2-\cos^2\left(\frac{\pi}{8}\right)}}{1 + K_{k=1}^{\infty} \cfrac{-\cos^2\left(\frac{\pi}{8}\right)\left\lfloor\frac{1+k}{2}\right\rfloor\left(-1+2\left\lfloor\frac{1+k}{2}\right\rfloor\right)}{1+2k}}$$

which is infinite, and thus the angle θ is irrational. It follows that the states $(HT)^n|0\rangle$ are dense in the equatorial ring about the axis $\vec{n}$, and no two states $(HT)^n|0\rangle$ and $(HT)^m|0\rangle$ are equal for n≠m. Although as their form makes explicit, these states can be reproduced exactly using the gates H and T, and can be obtained up to some fidelity controlled by the discretization as described above. In some implementations, the method and technique described above can provide technical advantages. For example, such approximation can be obtained using a short gate sequence.

FIG. 13D is a table 1330 showing gate sequences to produce states $(HT)^n|0\rangle$ up to ~99% fidelity at different n values. As shown in FIG. 13D, short gate sequences can reproduce states of the form $(HT)^n|0\rangle$ for very large values of n (e.g., $n=10^8$ or $10^9$). In principle, the value of n may be further increased, and would only be preparing some state from among a finite set of states that span the equatorial ring about the axis of rotation. In some instances, a maximum value of $n=10^{10}$ or another value may be used.

As discussed in 1202, the resolution of the discretized state space determines the fidelity bound. Initializing a discrete state amounts to initializing to some arbitrary point on the Bloch sphere lying within that discrete state. This means that when a starting state is set to the discrete |0⟩ state, the quantum state is initialized to some state that is close but not necessarily equal to |0⟩. Although it remains true that for some quantum state within the discrete northern polar cap, the gate sequences shown above result in their respective states with at least 99% fidelity using a discrete resolution of $\pi/16$, it is not a priori necessary that the same holds true if the starting state is truly the |0⟩. In some instances, the lower bound of 99% is not always respected, but that the gate sequences above nevertheless still converge to their target states with approximately 99% fidelity. In some implementations, the quantum program generated using the policy can then be executed on the quantum processor to prepare the target state from the initial state.

The example process 1200 as described above considers the example of single-qubit state preparation. This entire analysis can be extended to a higher number of qubits. The space of n-qubit pure states defines a high-dimensional sphere, which can be parametrized, and therefore discretized, in terms of spherical coordinates. The methodology described in the example process 1200 can be used to identify optimal quantum circuits for state preparation involving a large number of qubits, which is in general an open problem. However, is not in general efficient to solve for such state preparation problems involving a large number of qubits, since the state space quickly grows in dimensionality as a function of the number of qubits.

Furthermore, the example process 1200 as described above for the problem of state preparation uses a simple reward structure with r=1 if the target state is found, and r=0 if otherwise. Other, more complex reward structures that are less sparse may be used. For example, the reward structure may include the expectation value of some observable. Such reward structures could help solve problems other than state preparation. For example, in chemistry, such reward structures may be used to compute the ground state energy of a molecule. A popular method to solve this problem on near-term quantum processors is the use of the Variational Quantum Eigensolver. However, the VQE algorithm may not necessarily produce optimal quantum circuits to solve this problem, whereas the techniques and methods described here can potentially lead to optimal quantum circuits to solve such problems.

In some implementations, another dynamic programming and reinforcement learning technique can be used to identify optimal quantum circuits for a variety of problems. In some implementations of the process 1200, the probability distribution capturing the environment dynamics is computed (at 1206) before policy iteration computes the optimal policy (at 1208). However, the optimal policy may be computed in another manner. For instance, in many reinforcement learning techniques, a model of the environment dynamics need not be provided as an input and can be learned during the learning process. Therefore, these probability distributions may also be computed/estimated simultaneously with the optimal policy. An example of such a method is Q-learning, a standard algorithm in the theory of reinforcement learning that does not need a model of the environment dynamics before beginning to compute the optimal policy.

Dynamic programming today refers to a large variety of algorithms that rely on some "greedy" mechanism in the underlying technique. Historically, one of the first problems it is applied to is the problem of Markov Decision Processes (MDPs). This refers to the problem of evaluating what is the best action to take in a certain state for some agent, independent of the past history of that agent. In the case of finite MDPs, the optimal policy may be computed given knowledge of the environment dynamics, through a method known as policy iteration. Reinforcement learning generally includes a large collection of techniques devoted to solving MDPs (not necessarily finite) without explicitly being given knowledge of the environment dynamics. This reflects many real-world scenarios where a perfect knowledge of the environment is impractical to pre-compute, and instead must be learned on the fly.

However, to illustrate the idea that reinforcement learning may be used to compute optimal quantum circuits to solve some problem, the relatively simple problem of single-qubit state preparation is modeled as an MDP and solved using policy iteration. Because the problem and its accompanying environment is simple enough, the environment dynamics may be accurately estimated, so that reinforcement learning may not be relied on. Moreover, in this problem, it is already well known what the optimal quantum circuits are. For the case of the gate set consisting of discrete RZ and RY gates, well known optimal quantum circuits for single-qubit state preparation can be reproduced. This affirms the idea that reinforcement learning techniques may be used for optimal quantum circuit generation, even for problems involving a larger number of qubits where the optimal quantum circuits may not be independently known.

Figure 14:
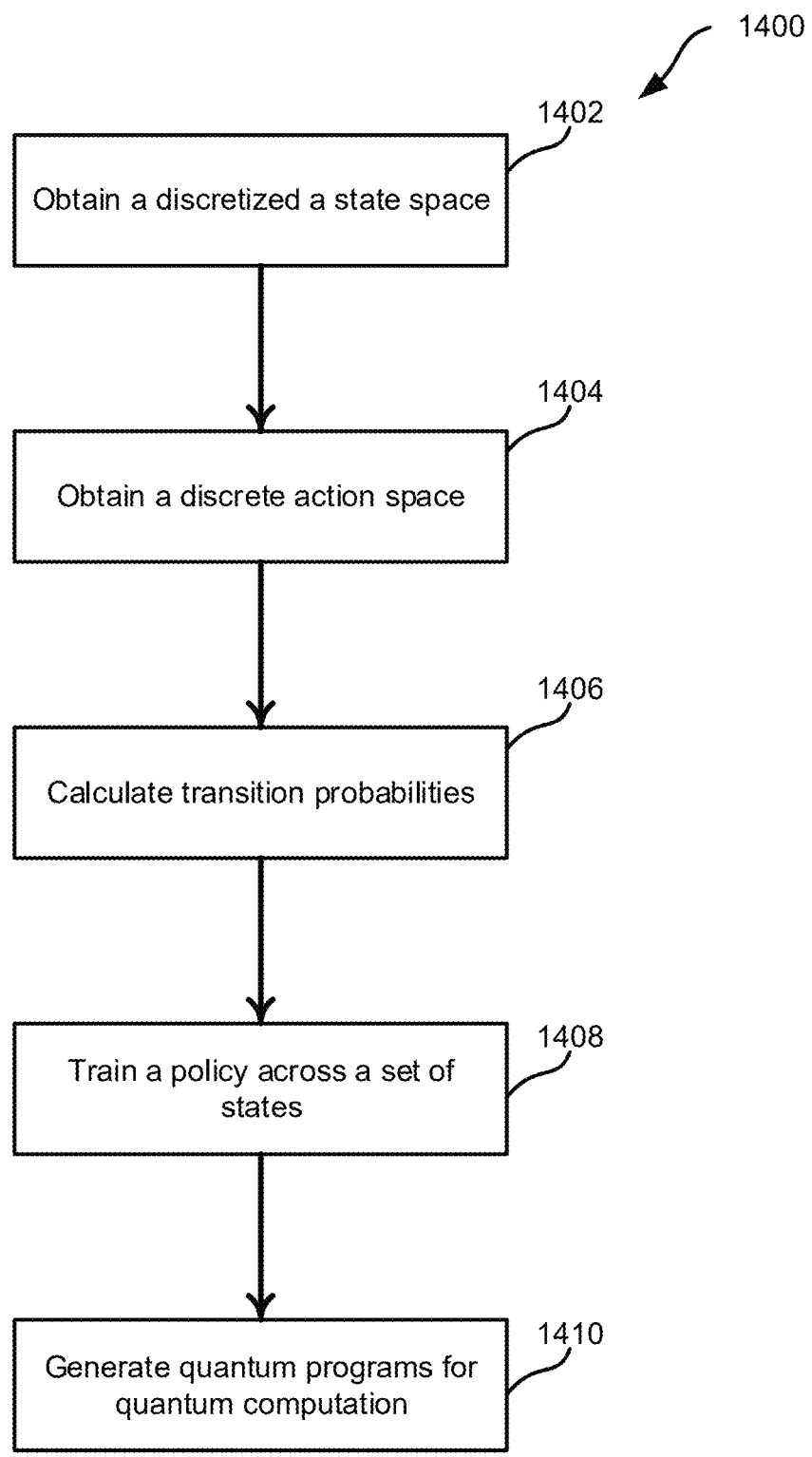
FIG. 14 is a flow diagram of an example process for computing a quantum logic circuit for quantum compilation.

FIG. 14 is a flow diagram of an example process 1400 for computing a quantum logic circuit for quantum compilation. In some implementations, the example process 1400 can be implemented using or combined with the techniques described above, or other techniques. The example process 1400 can be performed, for example, by the example computing system 200 shown in FIG. 2, the example computing system 800 shown in FIG. 8, or by another type of computing system.

At 1402, a state space is discretized. In some implementations, the state space is a space of a special unitary (SU) group of degree n (e.g., SU(2) matrices). The state space characterizes a space of single-qubit gates, ignoring an overall phase. In some implementations, the discretization of the SU(2) matrices can be implemented such that no two discrete regions overlap and the entire set of regions cover the entire space of SU(2) matrices. The discretization of the state space may be performed on a classical computing resource. In some implementations, the discretized state space includes a plurality of high-level unitary operations. For instances, the discretized state space includes all unitary operations that can be directly expressed in the Quil programming language or another high-level quantum programming language.

In some instances, a gate set {I, H, T} can be considered. The identity gate (I) in the gate set is included allowing a target state to possess the highest value, and have the agent do nothing in the target state under an optimal policy. In some instances, in order to remain in the space of SU(2) matrices, unitary gates in the gate set are defined, e.g., $H=RY(\pi/2)RZ(\pi)$, and $T=RZ(\pi/4)$. It is noted that the unitary gate H differs from the usual definition by an overall factor of t. In some instances, a coordinate system is then selected. For example, an arbitrary $U \in SU(2)$ can be parameterized using the ZYZ-Euler angle decomposition. Under this parametrization, given some $U \in SU(2)$ $$U = U(a, b, c, d) = \begin{pmatrix} a+ib & c+id \\ -c+id & a-ib \end{pmatrix},$$

such that $a^2+b^2+c^2+d^2=1$, the arbitrary U can be expressed as $$U=RZ(\alpha)RY(\beta)RZ(\gamma),$$

where $$\alpha = \alpha(a, b, c, d) = \arctan\left(-\frac{b}{a}\right) + \arctan\left(-\frac{d}{c}\right),$$

$$\beta = \beta(a, b, c, d) = 2\arccos\left(\sqrt{a^2+b^2}\right), \text{ and}$$

$$\gamma = \gamma(a, b, c, d) = \arctan\left(-\frac{b}{a}\right) - \arctan\left(-\frac{d}{c}\right),$$

for some angles $\alpha$, $\beta$ and $\gamma$. Note that for $\beta=0$, a continuous degeneracy of choices in $\alpha$ and $\gamma$ exists to specify some $RZ(\delta)$ with $\alpha+\gamma=\delta$. In some instances, $\alpha=\gamma=\delta/2$.

Under the action of T, e.g., $T:U=\rightarrow U'=TU=RZ(\alpha')RY(\beta')RZ(\gamma')$, or equivalently $T:(\alpha,\beta,\gamma)\rightarrow(\alpha',\beta',\gamma')$, the ZYZ-coordinates can be transformed as $\alpha'=\alpha+\pi/4$, $\beta'=\beta$, $\gamma'=\gamma$. Under a similar action of H, however, the coordinates can be transformed non-trivially. The matrix entries, on which these parameters depend, can be transformed as $$a' = \frac{1}{\sqrt{2}}\left[\sin\left(\frac{\alpha-\gamma}{2}\right)\sin\left(\frac{\beta}{2}\right) - \sin\left(\frac{\alpha+\gamma}{2}\right)\cos\left(\frac{\beta}{2}\right)\right],$$

$$b' = \frac{-1}{\sqrt{2}}\left[\cos\left(\frac{\alpha-\gamma}{2}\right)\sin\left(\frac{\beta}{2}\right) + \cos\left(\frac{\alpha+\gamma}{2}\right)\cos\left(\frac{\beta}{2}\right)\right],$$

$$c' = \frac{1}{\sqrt{2}}\left[\sin\left(\frac{\alpha-\gamma}{2}\right)\sin\left(\frac{\beta}{2}\right) + \sin\left(\frac{\alpha+\gamma}{2}\right)\cos\left(\frac{\beta}{2}\right)\right], \text{ and}$$

$$d' = \frac{1}{\sqrt{2}}\left[\cos\left(\frac{\alpha-\gamma}{2}\right)\sin\left(\frac{\beta}{2}\right) - \cos\left(\frac{\alpha+\gamma}{2}\right)\cos\left(\frac{\beta}{2}\right)\right].$$

This is a non-volume preserving operation for which $$\det(J) = \frac{\sin(\beta)}{\sqrt{1-\cos^2(\alpha)\sin^2(\beta)}}$$

where J denotes the Jacobian of the transformation from $(\alpha,\beta,\gamma)$ to $(\alpha',\beta',\gamma')$ under the action of H, and which diverges for values of $\alpha$ and $\beta$ such that $\cos(\alpha)\sin(\beta)=\pm 1$. This implies that for such pathological values, a unit hypercube in the discretized $(\alpha,\beta,\gamma)$ space gets mapped to a region that covers indefinitely many unit hypercubes in the discretized $(\alpha',\beta',\gamma')$ space. In turn, this means that a single state s gets mapped to an unbounded number of possible states s', causing p(s'|s,a=H) to be arbitrary small. In some instances, this may prevent the agent from recognizing an optimal path to valuable states as described in 1208, since even if the quantity $(r+\gamma V_\pi(s'))$ is particularly large for some states s', this quantity gets multiplied by the negligible factor p(s'|s, a=H), and therefore has a very small contribution to obtaining an improved policy during the policy iteration.

In some implementations, quaternions can be used as the coordinate system. Unlike the ZYZ-Euler angles, the space of quaternions is in a one-to-one correspondence with the space of the SU(2) matrices. Given some $U \in SU(2)$ as described above, the corresponding quaternion is given as q=(a, b, c, d). Under the action of the gate T, four components of the quanternion can be transformed as $$a' = a\cos\left(\frac{\pi}{8}\right) + b\sin\left(\frac{\pi}{8}\right),$$

-continued $$b' = b\cos\left(\frac{\pi}{8}\right) - a\sin\left(\frac{\pi}{8}\right),$$

$$c' = c\cos\left(\frac{\pi}{8}\right) + d\sin\left(\frac{\pi}{8}\right), \text{ and}$$

$$d' = d\cos\left(\frac{\pi}{8}\right) - c\sin\left(\frac{\pi}{8}\right).$$

Similarly, under the action of the gate H, the four components can be transformed as $$a' = \frac{b+d}{\sqrt{2}},$$

$$b' = \frac{c-a}{\sqrt{2}},$$

$$c' = \frac{d-b}{\sqrt{2}},$$

$$d' = -\frac{a+c}{\sqrt{2}},$$

and $\det(J_{(T)})=\det(J_{(H)})=1$ for the Jacobians associated with both transformations, so that these operations are volume-preserving on this coordinate system. In turn, this implies that a hypercube with unit volume in the discretized quaternionic space gets mapped to a region with unit volume.

For the purposes of the learning agent, this means that the total number of states that can result from acting with either the gate T or H is bounded above. In some instances, discretization of the state space is selected such that the spacing along each of the 4 axes of the quaternionic space is the same. Then, since a d-dimensional hypercube can intersect with at most $2^d$ equal-volume hypercubes, a state s can be mapped to at most 16 possible states s'.

In some implementations, in order to make the environment dynamics completely deterministic, a natural discretization of the quaternions into equal bins, e.g., q=($n_1\Delta$, $n_2\Delta$, $n_3\Delta$, $n_4\Delta$), can be used, where $n_1$, $n_2$, $n_3$, $n_4 \in \mathbb{Z}$, , and $\Delta$ can be selected such that the transformed quaternion can also be described similarly as q'=($n_1'\Delta$, $n_2'\Delta$, $n_3'\Delta$, $n_4'\Delta$). For this transformation under the action of the gate H, $\Delta=\sqrt{2}k$ can be determined, for some $k \in \mathbb{Z}^+$, which places an undesirable lower bound of $\sqrt{2}$ to the accuracy that can be obtained in the target state. In some implementations, environment dynamics can be varied as described below. In certain implementations, discretization of the state space can be performed using another coordinate system or another discretization method. For example, a discretization method described in "Discretization of SU(2) and the orthogonal group using icosahedral symmetries and the golden numbers" (by V. Moody and Morita, arXiv:1705.04910v2 [math.GR] 23 Aug. 2017) can be used to discretize a state space.

At 1404, a discrete action space is obtained. Obtaining a discrete action space is distinct from the discretization of the SU(2) state space during operation 1402, even though both are discretization of the space of single-qubit gates (e.g., a single-qubit action space), ignoring an overall phase. The discretization at 1404 specifies the elements of SU(2) that can act via left multiplication on the elements of SU(2) specified via the discretization at 1402. In some instances, operation 1404 may be implemented as the operation 1204 or in another manner. In some implementations, the discrete action space includes a finite number of unitary operations, for example, a universal subset of SU(2). In some instances, the discrete action space includes a plurality of low-level unitary operations. For instances, the discrete action space includes all the gates that are permitted on a specific hardware system, e.g., in Native Quil or another low-level quantum program prepared for the specific hardware system. In some instances, the discrete action space includes a finite number of discrete quantum logic gates.

At 1406, transition probabilities are calculated. Here, the transition probabilities are computed across the discrete states for each action. For example, the transition probabilities are computed across the high-level unitary operations in the discretized state space for each of the low-level unitary operations in the discrete action space. In terms of the Bellman equation described in the process 1200, the conditional probabilities p(s',r|s,a) are computed, where s' refers to the next state obtained as a result of taking action a in state s, while r refers to the reward obtained as a result of obtaining state s'. In some examples, the reward described in operation 1206 may be implemented or in another manner in the dynamic programming process to improve the policy.

At 1408, a policy is trained across a set of states. In some implementations, a policy can be defined by the discretized state space obtained at 1402 and the discrete action space obtained at 1404 for compiling quantum programs. In some implementations, a dynamic programming process can be used to train and improve a policy, for example, to determine an optimal policy, which include one or more low-level unitary operations in the discrete action space that can maximize the expected return for every high-level unitary operation in the discretized state space. For example, a policy can be trained and improved using parameters, such as the transition probabilities and the reward, in a dynamic programming process described in 1208 or in another manner. In some instances, the policy is a non-parametric policy.

In some implementations, a method to "freeze out" the dynamics across the entire environment except along the optimal path can be used to obtain the shortest possible program through the policy iteration. In some instances, the optimal path may be pre-computed through some other algorithm, such as breadth first search or in another manner. After identifying an initial unitary operation (e.g., the identity state) and a target unitary operation (e.g., a target state), each of the actions I, H and T is applied in each of the states along the optimal path between the initial state and the target state, and the resultant state for each of those actions is recorded. These provide deterministic dynamics for the states found along the optimal path. For the rest of the states in the environment, the identity action which causes V* (s)=0 for all such states s is allowed, so that it is never optimal for the agent to move off the optimal path.

Some natural measures of overlap between two unitaries include the Hilbert-Schmidt inner product tr(U$^\dagger$V), and the quaternion distance |q−q'|. However, neither does the Hilbert-Schmidt inner product monotonically increase, nor does the quaternion distance monotonically decrease, along the shortest ({H,T}) gate sequence. As an example, consider the target quaternion q*=[−0.52514−0.382170.724160.23187] from FIG. 15A with a shortest compilation sequence HTTTTHTHHH (read right to left) satisfying |q−q*|<0.3, where q is the prepared quaternion via the sequence. After the first H application, |q−q*|~1.34, which drops after the second H application to |q−q*|~0.97, and then rises again after the third H application to |q−q*|~1.49, before eventually falling below the threshold error. Similarly, the Hilbert-Schmidt inner product starts at ~0.21, rises to ~1.05, then falls to ~−0.21 before eventually becoming ~1.96.

In some implementations, instead of the reward structure presented in the process 1200, a reward of +1 can be assigned when the underlying unitary has evolved to within an $\in$-net approximation of the target unitary operation, e.g., when the evolved quaternion q satisfies |q−q*|<$\in$, for some $\in$>0 and q* is the target quaternion, and a reward of 0 can be assigned when otherwise. In some instances, the Euclidean distance between two vectors (a, b, c, d) and (a+$\Delta_{bin}$, b+$\Delta_{bin}$, c+$\Delta_{bin}$, d+$\Delta_{bin}$) equals 2$\Delta$bin however both those vectors cannot represent quaternions, since only either one of them can have unit norm. A size of discrete states can be determined by the Euclidean distance, and e may be comparable to the size of the discrete states, e.g., $\in$=2$\Delta_{bin}$. This requirement comes from the fact that in general, the e-net could cover more than one state, so that the conditional probabilities p(s',r|s,a) can be estimated, in contrast to the scenario where a state uniquely specifies the reward. In some implementations, $\in$~$\Delta_{bin}$ ensures that the conditional probabilities p(s',r=1|s,a) do not become negligibly small. In some implementations, another parameter can be used when evaluating the reward, for example, the Hilbert-Schmidt inner product between two unitaries, or another measure constructed based on a trace distance.

In some implementations, an environment dynamics may be estimated by uniformly, randomly sampling quaternions, track which discrete state the sampled quaternions belong to, evolve them under the actions and track the resultant discrete state and the obtained reward. In some instances, the environment dynamics can be estimated by simply rolling out gate sequences. Each rollout can be defined as starting from the identity gate, then successively applying either the H or T gate with equal probability until some fixed number K of actions are performed. The conditional probabilities for the identity action p(s',r|s,a=1) are simply estimated by recording that (s',a=1) led to (s',r) at each step when (s',r) is sampled when performing some other action a≠1 in some other state s≠s'. The number of actions per rollout K is set by the desired accuracy, which the Solovay-Kitaev theorem informs us is O(polylog(1/$\in$)). Estimating the environment dynamics in this manner is similar to off-policy learning in typical reinforcement learning algorithms, such as Q-learning.

With the identification of the discrete state and action spaces, and the reward structure, and an estimation of the environment dynamics, one could then solve for the optimal policy using policy iteration (e.g., operations 1208) or in another manner.

At 1410, quantum programs for quantum computation are generated. In some implementations, the quantum programs are generated using the policy trained by the training process at 1408. For example, an optimal policy computed at 1408 can determine the best choice of action, or quantum gate, to apply in any discrete state of SU(2). In some implementations, each of the quantum programs is expressed in low-level quantum program language. In some implementations, a quantum program includes one or more low-level unitary operations in the discrete action space, for example, a subset of the discrete set of quantum logic gates or another unitary operation. In some implementations, a quantum program may include multiple instances of the same unitary operation. For example, the same unitary operation or the same set of unitary operations may be repeated within a quantum program.

In some implementations, the optimal sequence of actions to arrive at an optimal compilation sequence for some target unitary operation can be chained according to the optimal policies obtained at 1408. An example algorithm for starting with the identity gate and terminating, with some accuracy, at the target state is outlined in pseudo-code below.

Initialize empty list ACTION-ROLLOUTS
Specify number of rollouts
for each rollout do
   Initialize empty list ACTION-SEQUENCE
   Initialize STATE to Identity gate
   while STATE≠TARGET-STATE
     ACTION←OPTIMAL-POLICY[STATE]
     ACTION-SEQUENCE.append(ACTION)
     Sample NEXT-STATE from estimated p(s'|s,a)
     STATE←NEXT-STATE
     ACTION-ROLLOUTS.append (ACTION-SEQUENCE)
end for
OPTIMAL-SEQUENCE←Minimum length ACTION-SEQUENCE in ACTION-ROLLOUTS As shown above in the example algorithm, the underlying unitaries are not explicitly referred to. Instead, the discrete space my be evolved according to the optimal policy and the estimated environment dynamics. Once the target state is reached, the steps taken to reach this state can be traced back to find the sequence of actions that resulted in this terminal path. The shortest sequence could then be applied to the identity gate to obtain some approximation of the target unitary operation that can be compiled.

In some instances, the optimal policies can be chained together to form optimal gate compilation sequences, accounting for the fact that while the dynamics of constructed MDP are stochastic, the underlying evolution of the unitary states are deterministic. The algorithm for executing the MDP (e.g., the MDP algorithm) is outlined in pseudo-code below.

Initialize empty list ACTION-ROLLOUTS
Specify number of rollouts
for each rollout do
   Initialize empty list ACTION-SEQUENCE
   Initialize STATE to Identity gate
   COUNTER←0
   while COUNTER<some large number
     ACTION←OPTIMAL-POLICY[STATE]
     ACTION-SEQUENCE.append(ACTION)
     Sample (NEXT-STATE, REWARD) from estimated p(s',r|s,a)
     STATE <NEXT-STATE
     if REWARD=1
       break
     if ACTION-SEQUENCE is not empty
       ACTION-ROLLOUTS.append(ACTION-SEQUENCE)
end for
OPTIMAL-SEQUENCE←Minimum length ACTION-SEQUENCE in ACTION-ROLLOUTS that satisfies precision bound The accuracy for obtaining the minimum length action sequence in the MDP algorithm need not necessarily satisfy the bound e set by the reward criterion, r=1 for $|q-q^*|<\epsilon$, for reasoning similar to the shuffling discussed in the process 1200. The algorithm described above is also required to satisfy the precision bound. In some instances, the MDP algorithm is not required to satisfy the precision bound. It should be emphasized that due to the shuffling effect, there is no a priori guarantee that optimal-sequence returned by the algorithm need even exist, since the precision bound is not guaranteed to exist, and $|q-q^*|\leq\Delta_{bin}k$, where k is the number of actions in the sequence that prepares the target quaternions $q^*$.

To benchmark the compilation sequences found by this procedure, a brute-force search can be used to determine the smallest gate sequence that satisfies $|q-q^*|<\epsilon$ for some $\epsilon>0$ with the smallest value of $|q-q^*|$, where q is the prepared quaternion and $q^*$ is the target quaternion. In some instances, an algorithm for executing the brute-force search (e.g., the brute-force algorithm) can be described in pseudo-code as follows.

FOUND=FALSE
Specify target accuracy ∈
n=1
while not FOUND
   Initialize empty list QUATERNION-DISTANCES
   SEQUENCES←$2^n$ sequences of {H,T}
   for SEQ in SEQUENCES
     Evolve quaternion according to SEQ
     QUATERNION-DISTANCES.append($|q-q^*|$)
   if MIN (QUATERNION-DISTANCES)<E
     FOUND←TRUE
     SHORTEST-SEQUENCE←SEQ with MIN (QUATERNION-DISTANCES)
   else
     n←n+1

FIG. 15A is a table 1500 showing compilation gate sequences determined using a Markov Decision Process and a brute-force search with ∈=0:3.30 (Haar) random SU(2) matrices are drew, and compilation sequences can be determined. For example, when $\epsilon=2\Delta_{bin}=0.3$, the environment dynamics can be estimated using 1000 rollouts, in which each rollout is 50 actions long, and each action is a uniform draw between H and T. In the example shown in FIG. 15A, the two algorithms (e.g., MDP and the brute-force search) can produce different sequences. For example, at $q^*$=[−0.52514,−0.38217, 0.72416, 0.23187], the compilation sequence from the MDP algorithm is HTTTTHHHTH while the compilation sequence from the brute-force algirithm is HTTTTHTHHH. The two different compilation sequences from the two algorithms agree in their length (e.g., 10 gates) and produce quaternions that fall within ∈ of the target quaternion ($|q-q^*|$=0.18812). The two algorithms can produce compilation sequences with comparable length and target fidelities. In some instances, the compilation sequences from the two algorithms may not be equal.

In some implementations, the Euclidean distance between two vectors (a, b, c, d) and $(a+\Delta_{bin}, b+\Delta_{bin}, c+\Delta_{bin}, d+\Delta_{bin})$ equals $2\Delta_{bin}$, however both those vectors cannot represent quaternions, since only either one of them can have unit norm. Nevertheless, this provides an upper bound to the Euclidean distance between any two quaternions sharing the same discrete state. While the discretization enforces this upper bound, this bound may not necessarily be respected by the stochastic state-level (as opposed to quaternion-level) evolution as outlined above. In some implementations, the fidelities, as measured by quaternion distance, obtained using this method are distributed around $2\Delta_{bin}$ or in another range.

Figure 15B:
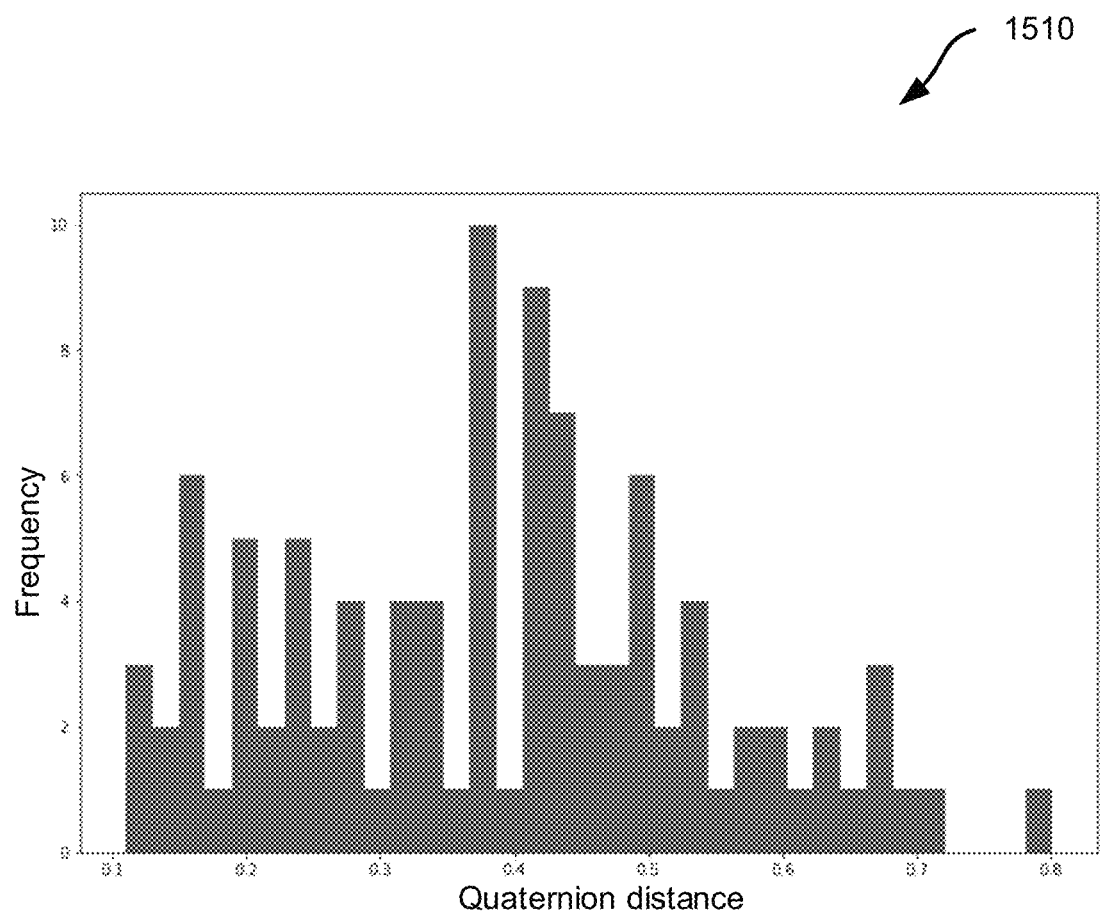
FIG. 15B is a histogram of Euclidean distances $|q_{prepared} - q_{target}|$ between prepared and target quaternions across 100 (Haar) randomly sampled SU(2) matrices.

In some implementations, the example process 1400 can be used to generate short approximate compilation gate sequences for 100 Haar random SU(2) elements using the {H,T} gateset, using $\Delta_{bin}$=0.2. FIG. 15B is a histogram 1510 of Euclidean distances $|q_{prepared}-q_{target}|$ between the prepared and target quaternions across 100 (Haar) randomly sampled SU(2) matrices. Using $\Delta_{bin}$=0.2, the distances are roughly centered around $2\Delta_{bin}$, e.g., at the quaternion distance of about 0.4

Figure 15C:
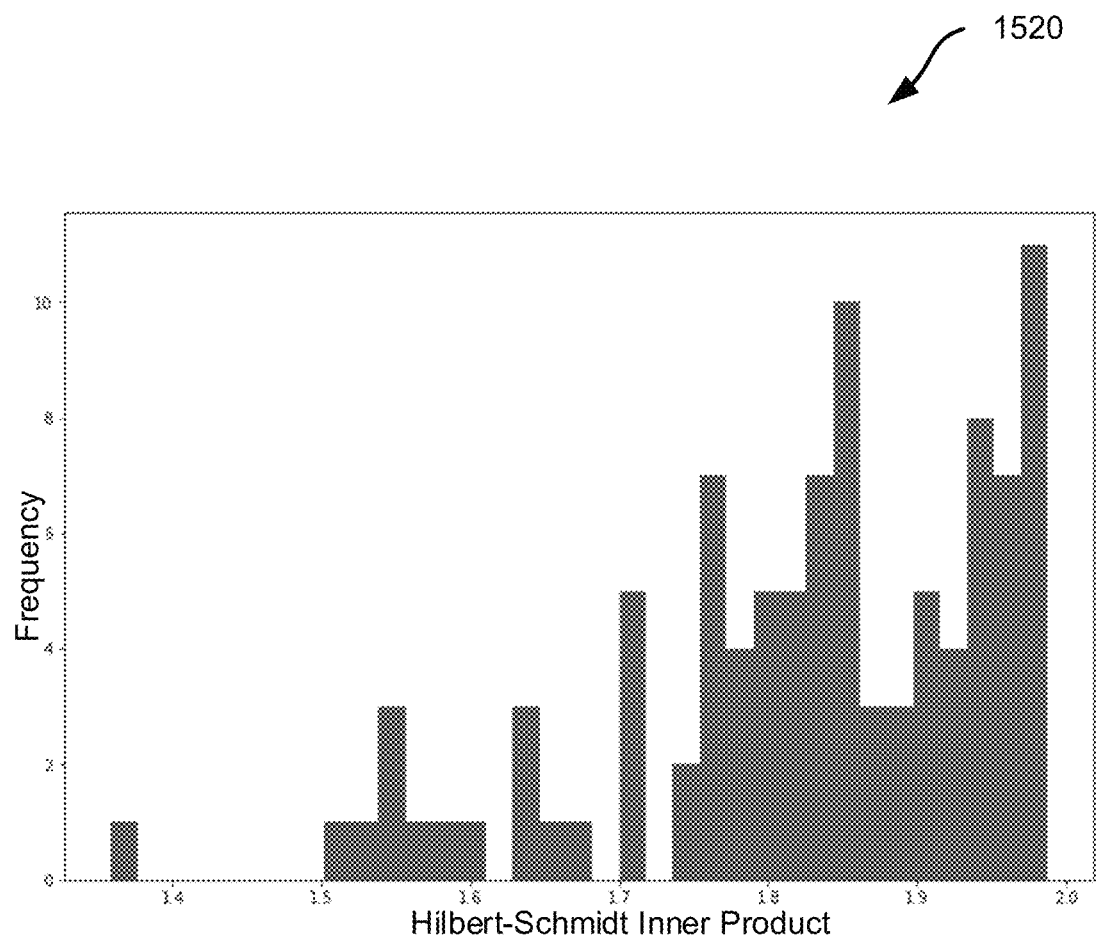
FIG. 15C is a histogram of Hilbert-Schmidt inner products $tr(U_{prepared}^\dagger U_{target})$ between the prepared and target quaternions across 100 (Haar) randomly sampled SU(2) matrices.

In some implementations, the example process 1400 can be used to generate short approximate compilation gate sequences for 100 Haar random SU(2) elements using Hilbert-Schmidt inner products tr $(U_{prepared}^{\dagger}U_{target})$, using $\Delta_{bin}=0.2$. FIG. 15C is a histogram 1520 of Hilbert-Schmidt inner products tr $(U_{prepared}^{\dagger}U_{target})$ between the prepared and target quaternions across 100 (Haar) randomly sampled SU(2) matrices, using a discretization of the quaternionic state space such that each quaternion element is binned in sizes of 0.2.

Figure 15D:
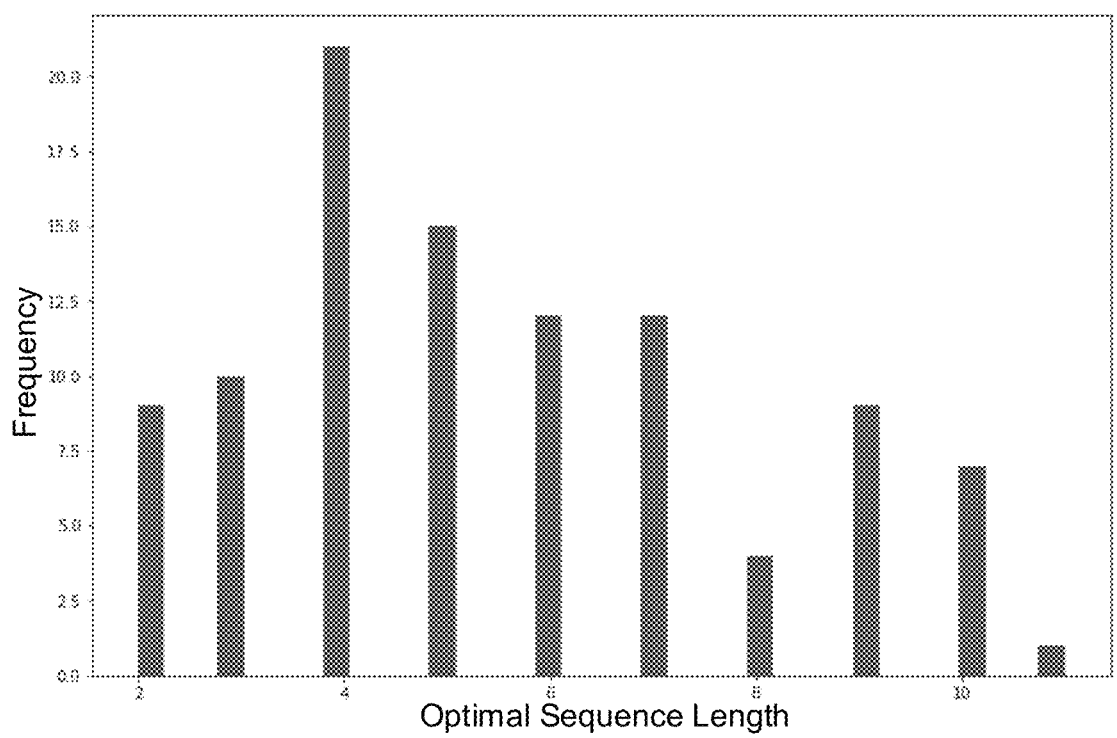
FIG. 15D a histogram of optimal approximate compilation sequences across 100 (Haar) randomly sampled SU(2) matrices.

FIG. 15D is a histogram 1530 of optimal compilation sequence length across 100 (Haar) randomly sampled SU(2) matrices, using a discretization of the quaternionic state space such that each quaternion element is binned in sizes of 0.2. As shown in FIG. 15D, an optimal sequence lengths are roughly centered around 4.

The example process 1400 as described above considers the example of single-qubit gate compilation. This entire analysis can be extended to a higher number of qubits. The space of n-qubit gates, ignoring an overall phase, is given by the special unitary group $SU(2^n)$, which can be discretized in terms of its matrix entries. The methodology described in the process 1400 can be used to identify optimal quantum circuits for gate compilation involving a large number of qubits, which is in general an open problem. However, it is not in general efficient to solve for such gate compilation problems involving a large number of qubits, since the state space quickly grows in dimensionality as a function of the number of qubits.

Furthermore, the example process 1400 as described above for the problem of state preparation uses a simple reward structure with r=1 if the target state is found, and r=0 if otherwise. Other, more complex reward structures that are less sparse may be used. For example, the reward structure may include the Hilbert-Schmidt inner product, or trace distance.

In some implementations of the process 1400, the probability distribution capturing the environment dynamics is computed (at 1406) before policy iteration computes the optimal policy (at 1408). However, the optimal policy may be computed in another manner. For instance, in many reinforcement learning techniques, a model of the environment dynamics need not be provided as an input, and can be learned during the learning process. Therefore, these probability distributions may also be computed/estimated simultaneously with the optimal policy. An example of such a method is Q-learning, a standard algorithm in the theory of reinforcement learning that does not need a model of the environment dynamics before beginning to compute the optimal policy.

In some aspects of what is described above, artificial intelligence systems (e.g., reinforcement learning systems) are configured to program a quantum computer to solve certain problems which a priori have no relationship with quantum computing (e.g., combinational optimization problems, etc.). For instance, the artificial intelligence systems can be configured with application-specific reward functions (e.g., the MAXCUT weight) and application-specific data (e.g., edge weights of a weighted graph) as input to the policy. The quantum programs synthesized by the artificial intelligence system represent computed solutions to these computational problems. Moreover, to solve these problems in a practically efficient manner, constraints can be imposed on the policy network and measurement protocols. In the examples described above, such constraints are manifest in the "state space" of the reinforcement learning agents (to keep the size tractable) and the training protocol (to allow for pure-QPU training, as would be necessary in larger systems). For example, the learning agents described above do not rely on unmeasurable data or classical training, so that the learning agents can scale to larger systems (larger problem sizes, to be solved with quantum computers with larger numbers of qubits) without intractable scalability problems.

Some of the subject matter and operations described in this specification can be implemented in circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

In a general aspect, quantum programs are automatically synthesized or compiled.

In a first example, a discretized state space is obtained. The discretized state space includes a plurality of states for one or more qubits of a quantum processor. A discrete action space is obtained. The discrete action space includes a plurality of unitary operations for the one or more qubits of the quantum processor. A policy that uses the discretized state space and the discrete action space to generate quantum programs for quantum state preparation is defined. A dynamic programming process is used to improve the policy. An initial state and a target state of the one or more qubits is identified. The policy is used to generate a quantum program to produce the target state from the initial state. The quantum program include a subset of the unitary operations in the discrete action space.

Implementations of the first example may include one or more of the following features. For each unitary operation in the discrete action space, transition probabilities between the states in the discretized state space are computed. The transition probabilities are used in the dynamic programming process to improve the policy. The transition probabilities are computed using a model of environment dynamics for the quantum processor. When the dynamic programming process is used to improve the policy comprises a reward is evaluated based on samples from the quantum processor. The reward is configured to train the policy to use one or more of the unitary operations in the discrete action space to prepare any one of the states in the discretized state space. The policy is a non-parametric policy. The quantum program is executed on the quantum processor to prepare the target state from the initial state.

Implementations of the first example may include one or more of the following features. A single-qubit state space is discretized to obtain a discretized state space. A single-qubit action space is discretized to obtain a discrete action space. An optimal policy for single-qubit state preparation is generated when the dynamic programming process is used to improve the policy. The unitary operations in the discrete action space include discrete quantum logic gates. The discretized state space has a first discretization resolution, and the discrete action space has a second discretization resolution. The second discretization resolution is less than the first discretization resolution. The policy is used to generate a plurality of quantum programs to produce the target state from the initial state. The quantum program having a shortest length is selected from the plurality of quantum programs. The selected quantum program is provided for execution on the quantum processor. Using the dynamic programming process to improve the policy includes finding an optimal policy.

In a second example, a computing system includes one or more processors, and memory storing instructions that are configured, when executed by the one or more processors to perform one or more operations of the first example.

In a third example, a discretized state space is obtained. The discretized state space includes a first plurality of unitary operations for one or more qubits of a quantum processor. A discrete action space is obtained. The discrete action space includes a second plurality of unitary operations for the one or more qubits of the quantum processor. A policy that uses the state space and the action space to compile quantum programs is defined. A dynamic programming process is used to improve the policy. A target unitary operation in the discretized state space is identified. The policy is used to generate a quantum program to perform the target unitary operation. The quantum program includes a subset of the unitary operations in the discrete action space.

Implementations of the third example may include one or more of the following features. A quaternion of each of the first plurality of unitary operations of the discretized state space is determined. The quaternion is discretized to obtain the discretized state space. Four elements of the quaternion are discretized when the quaternion is discretized.

The four elements equal $n_i \cdot \Delta$, in which i is a positive integer, and i=1, 2, 3, 4, $\Delta$ equals $\sqrt{2}k$, k is a number of unitary operations in the quantum program, and is a positive integer. Transition probabilities between unitary operations in the first plurality of unitary operations are computed for each action in the discrete action space. The transition probabilities are used in the dynamic programming process to improve the policy.

Implementations of the third example may include one or more of the following features. A reward is evaluated in the dynamic programming process based on a Euclidean distance. The reward is configured to train the policy to use one or more of the unitary operations in the second plurality of unitary operations in the discrete action space to perform the target unitary operation in the discretized state space. The Euclidean distances is defined as an absolute difference between a target quaternion and an evolved quaternion. The target quaternion corresponds to the target unitary operation, and the evolved quaternion is prepared via one or more unitary operations in the second plurality of unitary operations. A single-qubit action space is discretized to obtain the discrete action space. The second plurality of unitary operations in the discrete action space includes discrete quantum logic gates.

Implementations of the third example may include one or more of the following features. The policy is used to generate a plurality of quantum programs to produce evolved quaternions. The quantum program having a shortest length is selected from the plurality of quantum programs. The selected quantum program is used to perform the target unitary operation. The evolved quaternions are offset from a target quaternion by respective Euclidean distances. The Euclidean distances are less than a predetermined maximum distance. A plurality of optimal quantum programs is generated to perform respective target unitary operations. Gate compilation sequences is formed by chaining the plurality of optimal quantum programs. The gate compilation sequences are provided for execution on the quantum processor.

In a fourth example, a computing system includes one or more processors, and memory storing instructions that are configured, when executed by the one or more processors to perform one or more operations of the third example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
obtaining, by one or more processors, a discretized state space, the discretized state space comprising a first plurality of unitary operations for one or more qubits of a quantum processor, wherein the first plurality of unitary operations are expressed in a high-level quantum programming language, and the quantum processor permits only a specified set of quantum logic gates;
obtaining, by one or more processors, a discrete action space, the discrete action space comprising a second plurality of unitary operations for the one or more qubits of the quantum processor, wherein the second plurality of unitary operations are expressed in a low-level quantum programming language and correspond to the specified set of quantum logic gates that are permitted by the quantum processor;
defining, by one or more processors, a neural network that uses the discretized state space and the discrete action space to compile quantum programs;
training, by one or more processors, the neural network using a dynamic programming process;
identifying, by one or more processors, a target unitary operation in the discretized state space;
generating, by one or more processors, a quantum program using the trained neural network, the quantum program being configured to perform the target unitary operation using a subset of the second plurality of unitary operations in the discrete action space; and
causing the quantum processor to execute the quantum program.

2. The method of claim 1, wherein obtaining the discretized state space comprises:
determining a quaternion of each of the first plurality of unitary operations of the discretized state space; and
discretizing the quaternion.

3. The method of claim 2, wherein discretizing the quaternions comprises:
discretizing four elements of the quaternion, wherein the four elements equal $n_i \cdot \Delta$, $n_i$ is an integer, i is a positive integer, and i=1, 2, 3, 4, 4 equals $\sqrt{2}k$, k is a number of unitary operations in the quantum program, and is a positive integer.

4. The method of claim 1, comprising:
for each unitary operation in the discrete action space, computing transition probabilities between unitary operations in the first plurality of unitary operations in the discretized state space; and
using the transition probabilities in the dynamic programming process to train the neural network.

5. The method of claim 1, wherein training the neural network using the dynamic programming process comprises evaluating a reward based on a Euclidean distance, wherein the reward is configured to train the neural network to use one or more of the unitary operations in the second plurality of unitary operations in the discrete action space to perform the target unitary operation in the discretized state space.

6. The method of claim 5, wherein the Euclidean distance is defined as an absolute difference between a target quaternion and an evolved quaternion, the target quaternion corresponds to the target unitary operation, and the evolved quaternion is prepared via one or more unitary operations in the second plurality of unitary operations.

7. The method of claim 1, wherein obtaining the discrete action space comprises discretizing a single-qubit action space.

8. The method of claim 1, comprising:
generating a plurality of quantum programs using the trained neural network to produce evolved quaternions;
selecting, from the plurality of quantum programs, the quantum program having a shortest length; and
using the selected quantum program to perform the target unitary operation, wherein the evolved quaternions are offset from a target quaternion by respective Euclidean distances, the Euclidean distances being less than a predetermined maximum distance.

9. The method of claim 1, comprising:
generating a plurality of optimal quantum programs to perform respective target unitary operations;
forming gate compilation sequences by chaining the plurality of optimal quantum programs; and
providing the gate compilation sequences for execution on the quantum processor.

10. The method of claim 1, wherein:
the quantum processor comprises a superconducting circuit comprising a plurality of qubit devices each comprising one or more Josephson junctions;
the second plurality of unitary operations correspond to quantum logic gates that are executable by specific hardware of the quantum processor; and
the method comprises executing the quantum program using the specific hardware of the quantum processor, wherein executing the quantum program comprises delivering control signals to the superconducting circuit to perform one or more of the second plurality of unitary operations.

11. A computing system comprising:
one or more processors; and
memory storing instructions that are configured, when executed by the one or more processors, to perform operations comprising:
obtaining a discretized state space, the discretized state space comprising a first plurality of unitary operations for one or more qubits of a quantum processor, wherein the first plurality of unitary operations is expressed in a high-level quantum programing language, and the quantum processor permits only a specified set of quantum logic gates;
obtaining a discrete action space, the discrete action space comprising a second plurality of unitary operations for the one or more qubits of the quantum processor, wherein the second plurality of unitary operations are expressed in a low-level quantum programing language and correspond to the specified set of quantum logic gates that are permitted by the quantum processor;
defining a neural network that uses the discretized state space and the discrete action space to compile quantum programs;
training the neural network using a dynamic programming process;
identifying a target unitary operation in the discretized state space;
generating a quantum program using the trained neural network, the quantum program being configured to perform the target unitary operation using a subset of the second plurality of unitary operations in the discrete action space; and
causing the quantum processor to execute the quantum program.

* * * * *

UNITED STATES PATENT AND TRADEMARK OFFICE
CERTIFICATE OF CORRECTION

Page 1 of 2

PATENT NO. : 12,387,130 B1
APPLICATION NO. : 16/988298
DATED : August 12, 2025
INVENTOR(S) : Alam et al.

It is certified that error appears in the above-identified patent and that said Letters Patent is hereby corrected as shown below:

In the Specification

Column 12, Detailed Description, Line 49 Delete "n." and insert -- $\pi$. -- therefor Column 12, Detailed Description, Line 51 Delete "π*(als;0)≈π*(als)" and insert -- $\pi^*(a|s; \theta) \approx \pi^*(a|s)$ -- therefor Column 16, Detailed Description, Line 7 Delete "ρ=tan h)." and insert -- ρ=tanh). -- therefor Column 23, Detailed Description, Line 50 Delete "810" and insert -- 816 -- therefor Column 26, Detailed Description, Line 41 Delete "x" and insert -- $\pi$ -- therefor Column 28, Detailed Description, Line 66 Delete "quatum" and insert -- quantum -- therefor Column 29, Detailed Description, Line 43 Delete "states(s)" and insert -- states (s) -- therefor Column 35, Detailed Description, Line 54 Delete "pc" and insert -- $p_G$ -- therefor Column 36, Detailed Description, Line 5 Delete "p$_x$≥0.1," and insert -- $p_X \gtrsim 0.1$, -- therefor Column 38, Detailed Description, Line 58 Delete "t." and insert -- *l.* -- therefor Column 39, Detailed Description, Line 62 Delete "quanternion" and insert -- quaternion -- therefor Column 40, Detailed Description, Line 40 Delete "∈$\mathbb{Z}$, , and" and insert -- $\in \mathbb{Z}$, and -- therefor Column 42, Detailed Description, Line 7 Delete "2Δbin" and insert -- 2Δ$_{bin,}$ -- therefor Signed and Sealed this
Twenty-eighth Day of October, 2025

John A. Squires
*Director of the United States Patent and Trademark Office*

Column 42, Detailed Description, Line 10 Delete "e" and insert -- $\epsilon$ -- therefor Column 42, Detailed Description, Line 12 Delete "e-net" and insert -- $\epsilon$-net -- therefor Column 43, Detailed Description, Line 57 Delete "e" and insert -- $\epsilon$ -- therefor Column 43, Detailed Description, Line 65 Delete "|q–q*|≤$\Delta_{bin}$k," and insert -- $|q - q^*| \lesssim \Delta_{bin} k,$ -- therefore Column 44, Detailed Description, Line 18 Delete "<E" and insert -- <$\epsilon$ -- therefor Column 45, Detailed Description, Line 2 Delete "tr ($U_{prepared}^\dagger U_{target}$)," and insert -- $tr(U_{prepared}^\dagger U_{target})$, -- therefor Column 45, Detailed Description, Line 4 Delete "tr ($U_{prepared}^\dagger U_{target}$)" and insert -- $tr(U_{prepared}^\dagger U_{target})$ -- therefor Column 47, Detailed Description, Line 62 After "discretized," delete "¶"

In the Claims

Column 49, Line 41 In Claim 3, delete "4, 4" and insert -- 4, $\Delta$ -- therefor